United States Patent
Schowengerdt et al.

(10) Patent No.: US 10,453,258 B2
(45) Date of Patent: Oct. 22, 2019

(54) ADJUSTING PIXELS TO COMPENSATE FOR SPACING IN AUGMENTED OR VIRTUAL REALITY SYSTEMS

(71) Applicant: Magic Leap, Inc., Dania Beach, FL (US)

(72) Inventors: Brian T. Schowengerdt, Seattle, WA (US); Samuel A. Miller, Hollywood, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 14/702,736

(22) Filed: May 3, 2015

(65) Prior Publication Data

US 2015/0235583 A1 Aug. 20, 2015

Related U.S. Application Data

(63) Continuation of application No. 14/212,961, filed on Mar. 14, 2014, now Pat. No. 9,417,452.
(Continued)

(51) Int. Cl.
 *G06T 19/00* (2011.01)
 *G09G 3/00* (2006.01)
 (Continued)

(52) U.S. Cl.
 CPC ........ *G06T 19/006* (2013.01); *G02B 27/0093* (2013.01); *G02B 27/01* (2013.01);
 (Continued)

(58) Field of Classification Search
 CPC .................................................. G09G 3/007
 (Continued)

(56) References Cited

U.S. PATENT DOCUMENTS

| 3,632,865 A | 1/1972 | Haskell et al. |
| 4,204,742 A | 5/1980 | Johnson |

(Continued)

FOREIGN PATENT DOCUMENTS

| JP | 2006293604 A | 10/2006 |
| JP | 2011175439 A | 9/2011 |
| WO | WO 2012020527 | 2/2012 |

OTHER PUBLICATIONS

Roscher, Low cost projection device with a 2-dimensional resonant micro scanning mirror, MOEMS Display and Imaging Systems II, edited by Hakan Urey, David L. Dickensheets, Proceedings of SPIE vol. 5348, pp. 22-31, 2004.*

(Continued)

*Primary Examiner* — Hai Tao Sun
(74) *Attorney, Agent, or Firm* — Vista IP Law Group LLP

(57) ABSTRACT

One embodiment is directed to a user display device comprising a housing frame mountable on the head of the user, a lens mountable on the housing frame and a projection sub system coupled to the housing frame to determine a location of appearance of a display object in a field of view of the user based at least in part on at least one of a detection of a head movement of the user and a prediction of a head movement of the user, and to project the display object to the user based on the determined location of appearance of the display object.

22 Claims, 24 Drawing Sheets

Related U.S. Application Data

(60) Provisional application No. 61/801,219, filed on Mar. 15, 2013.

(51) Int. Cl.
*G06F 3/01* (2006.01)
*G02B 27/01* (2006.01)
*G02B 27/00* (2006.01)
*G06T 7/70* (2017.01)
*G06T 1/60* (2006.01)

(52) U.S. Cl.
CPC ....... *G02B 27/017* (2013.01); *G02B 27/0172* (2013.01); *G06F 3/011* (2013.01); *G06F 3/012* (2013.01); *G06F 3/013* (2013.01); *G06T 1/60* (2013.01); *G06T 7/70* (2017.01); *G06T 19/00* (2013.01); *G09G 3/007* (2013.01); *G02B 2027/014* (2013.01); *G02B 2027/0178* (2013.01); *G02B 2027/0187* (2013.01); *G06T 2219/024* (2013.01); *G09G 2320/0266* (2013.01)

(58) Field of Classification Search
USPC ........................................................ 345/633
See application file for complete search history.

(56) References Cited

U.S. PATENT DOCUMENTS

| | | | |
|---|---|---|---|
| 4,984,179 A | 1/1991 | Waldern | |
| 5,138,555 A | 8/1992 | Albrecht | |
| 5,271,093 A | 12/1993 | Hata | |
| 5,311,897 A | 5/1994 | Yamada | |
| 5,422,653 A * | 6/1995 | Maguire, Jr. ...... | G02B 27/2228 345/9 |
| 5,526,042 A | 6/1996 | Ozawa et al. | |
| 5,742,264 A | 4/1998 | Inagaki et al. | |
| 5,933,125 A | 8/1999 | Fernie et al. | |
| 6,011,526 A | 1/2000 | Toyoshima et al. | |
| 6,151,179 A | 11/2000 | Poss | |
| 6,441,811 B1 | 8/2002 | Sawada | |
| 6,917,370 B2 | 7/2005 | Benton | |
| 6,947,219 B1 | 9/2005 | Ou | |
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,386,799 B1 | 6/2008 | Clanton et al. | |
| 7,474,809 B2 | 1/2009 | Carl et al. | |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 8,223,024 B1 | 7/2012 | Petrou | |
| 8,508,830 B1 | 8/2013 | Wang | |
| 8,542,219 B2 | 9/2013 | Carl et al. | |
| 8,553,935 B2 | 10/2013 | Mandella et al. | |
| 8,730,129 B2 | 5/2014 | Solomon | |
| 8,757,812 B2 | 6/2014 | Melville et al. | |
| 8,831,278 B2 | 9/2014 | Fedorovskaya | |
| 8,832,233 B1 | 9/2014 | Din et al. | |
| 8,879,155 B1 | 11/2014 | Teller | |
| 8,897,494 B2 | 11/2014 | Mandella et al. | |
| 8,970,709 B2 | 3/2015 | Gonzalez-Banos et al. | |
| 9,189,856 B1 | 11/2015 | Gonzalez-Banos et al. | |
| 9,229,540 B2 | 1/2016 | Mandella et al. | |
| 9,235,934 B2 | 1/2016 | Mandella et al. | |
| 2001/0035870 A1 | 11/2001 | Takeuchi | |
| 2003/0014212 A1 | 1/2003 | Ralston | |
| 2003/0137449 A1 | 7/2003 | Vashisth et al. | |
| 2003/0156253 A1 | 8/2003 | Watanabe et al. | |
| 2003/0158654 A1 | 8/2003 | Morita | |
| 2004/0119715 A1 | 6/2004 | Everett et al. | |
| 2004/0130520 A1 * | 7/2004 | Maeda ................ | G09G 3/20 345/100 |
| 2004/0178894 A1 | 9/2004 | Janssen | |
| 2004/0258314 A1 | 12/2004 | Hashimoto | |
| 2005/0046953 A1 | 3/2005 | Repetto et al. | |
| 2005/0110732 A1 * | 5/2005 | Kim ................ | G09G 3/3406 345/87 |
| 2005/0148388 A1 | 7/2005 | Vayra | |
| 2005/0248852 A1 | 11/2005 | Yamasaki | |
| 2005/0253055 A1 | 11/2005 | Sprague | |
| 2005/0254135 A1 | 11/2005 | Ou | |
| 2006/0007056 A1 | 1/2006 | Ou | |
| 2006/0105838 A1 | 5/2006 | Mullen | |
| 2006/0109280 A1 | 5/2006 | Dawson | |
| 2006/0132915 A1 | 6/2006 | Yang et al. | |
| 2006/0214911 A1 | 9/2006 | Miller | |
| 2006/0226231 A1 | 10/2006 | Johnston | |
| 2006/0227151 A1 | 10/2006 | Bannai et al. | |
| 2006/0256110 A1 | 11/2006 | Okuno et al. | |
| 2006/0267889 A1 | 11/2006 | Kimura | |
| 2006/0284791 A1 | 12/2006 | Chen et al. | |
| 2007/0086668 A1 | 4/2007 | Ackley et al. | |
| 2008/0005702 A1 | 1/2008 | Skourup et al. | |
| 2008/0058629 A1 | 3/2008 | Seibel | |
| 2008/0059578 A1 | 3/2008 | Albertson et al. | |
| 2008/0062131 A1 * | 3/2008 | Chan ................ | G06F 3/0317 345/166 |
| 2008/0071559 A1 | 3/2008 | Arrasvuori | |
| 2008/0186255 A1 | 8/2008 | Cohen et al. | |
| 2008/0199049 A1 | 8/2008 | Daly | |
| 2008/0215974 A1 | 9/2008 | Harrison et al. | |
| 2008/0215975 A1 | 9/2008 | Harrison et al. | |
| 2008/0215994 A1 | 9/2008 | Harrison et al. | |
| 2008/0276178 A1 | 11/2008 | Fadell | |
| 2008/0278480 A1 | 11/2008 | Katano | |
| 2009/0003662 A1 | 1/2009 | Joseph et al. | |
| 2009/0066690 A1 | 3/2009 | Harrison | |
| 2009/0089685 A1 | 4/2009 | Mordecai | |
| 2009/0147331 A1 | 6/2009 | Ashkenazi | |
| 2009/0164916 A1 | 6/2009 | Jeong | |
| 2009/0177042 A1 | 7/2009 | Johnston | |
| 2009/0187389 A1 | 7/2009 | Dobbins | |
| 2009/0213114 A1 | 8/2009 | Dobbins | |
| 2009/0222424 A1 | 9/2009 | Van | |
| 2009/0225001 A1 * | 9/2009 | Biocca ................ | G02B 27/0172 345/8 |
| 2009/0285484 A1 | 11/2009 | Mallinson et al. | |
| 2009/0293012 A1 | 11/2009 | Alter et al. | |
| 2009/0316116 A1 | 12/2009 | Melville et al. | |
| 2009/0322671 A1 | 12/2009 | Scott et al. | |
| 2010/0020216 A1 | 1/2010 | Christian et al. | |
| 2010/0060647 A1 | 3/2010 | Brown et al. | |
| 2010/0085462 A1 | 4/2010 | Sako et al. | |
| 2010/0110368 A1 | 5/2010 | Chaum | |
| 2010/0137684 A1 | 6/2010 | Shibaski | |
| 2010/0141555 A1 | 6/2010 | Rorberg | |
| 2010/0149073 A1 | 6/2010 | Chaum | |
| 2010/0197390 A1 | 8/2010 | Craig | |
| 2010/0260426 A1 | 10/2010 | Huang et al. | |
| 2010/0287500 A1 | 11/2010 | Whitlow | |
| 2011/0075902 A1 | 3/2011 | Song | |
| 2011/0096337 A1 | 4/2011 | Hirose | |
| 2011/0227812 A1 | 9/2011 | Haddick et al. | |
| 2011/0234879 A1 | 9/2011 | Kashitani | |
| 2011/0246908 A1 | 10/2011 | Akram | |
| 2011/0267361 A1 | 11/2011 | Kurozuka | |
| 2011/0313653 A1 | 12/2011 | Linder | |
| 2012/0050140 A1 | 3/2012 | Border et al. | |
| 2012/0068913 A1 | 3/2012 | Bar-Zeev et al. | |
| 2012/0086728 A1 | 4/2012 | Mcardle et al. | |
| 2012/0087580 A1 | 4/2012 | Woo | |
| 2012/0089949 A1 | 4/2012 | Chen et al. | |
| 2012/0092328 A1 | 4/2012 | Flaks | |
| 2012/0113092 A1 | 5/2012 | Bar-Zeev et al. | |
| 2012/0120103 A1 | 5/2012 | Border | |
| 2012/0127062 A1 | 5/2012 | Bar-Zeev et al. | |
| 2012/0127136 A1 | 5/2012 | Schneider | |

(56) References Cited

U.S. PATENT DOCUMENTS

| | | |
|---|---|---|
| 2012/0127284 A1 | 5/2012 | Bar-Zeev |
| 2012/0154277 A1 | 6/2012 | Bar-Zeev et al. |
| 2012/0154557 A1 | 6/2012 | Perez |
| 2012/0169752 A1* | 7/2012 | Kurozuka ............ G02B 26/101 345/545 |
| 2012/0182313 A1 | 7/2012 | Ahn et al. |
| 2012/0183137 A1 | 7/2012 | Laughlin |
| 2012/0188148 A1* | 7/2012 | DeJong ............. G02B 27/0093 345/8 |
| 2012/0194554 A1 | 8/2012 | Kaino |
| 2012/0200600 A1 | 8/2012 | Demaine |
| 2012/0206452 A1 | 8/2012 | Geisner et al. |
| 2012/0212399 A1 | 8/2012 | Border et al. |
| 2012/0218301 A1 | 8/2012 | Miller |
| 2012/0236262 A1 | 9/2012 | Johansson |
| 2012/0242560 A1* | 9/2012 | Nakada ................ G09G 3/3406 345/8 |
| 2012/0244939 A1 | 9/2012 | Braun |
| 2012/0249586 A1 | 10/2012 | Wither et al. |
| 2012/0249797 A1 | 10/2012 | Haddick et al. |
| 2012/0327116 A1 | 12/2012 | Liu et al. |
| 2013/0021373 A1 | 1/2013 | Vaught et al. |
| 2013/0042296 A1 | 2/2013 | Hastings |
| 2013/0044128 A1 | 2/2013 | Liu et al. |
| 2013/0050186 A1 | 2/2013 | Large et al. |
| 2013/0050258 A1 | 2/2013 | Liu et al. |
| 2013/0050260 A1 | 2/2013 | Reitan |
| 2013/0050432 A1 | 2/2013 | Perez et al. |
| 2013/0050642 A1 | 2/2013 | Lewis et al. |
| 2013/0083011 A1 | 4/2013 | Geisner et al. |
| 2013/0083173 A1 | 4/2013 | Geisner et al. |
| 2013/0093788 A1 | 4/2013 | Liu et al. |
| 2013/0117377 A1 | 5/2013 | Miller |
| 2013/0120224 A1 | 5/2013 | Cajigas et al. |
| 2013/0120706 A1 | 5/2013 | Kakinuma et al. |
| 2013/0141419 A1 | 6/2013 | Mount et al. |
| 2013/0156266 A1 | 6/2013 | Horii |
| 2013/0194164 A1 | 8/2013 | Sugden et al. |
| 2013/0215230 A1 | 8/2013 | Miesnieks et al. |
| 2013/0249946 A1 | 9/2013 | Kimura |
| 2013/0257748 A1 | 10/2013 | Ambrus et al. |
| 2013/0286004 A1 | 10/2013 | McCulloch et al. |
| 2013/0293468 A1 | 11/2013 | Perez et al. |
| 2013/0307875 A1 | 11/2013 | Anderson |
| 2013/0342564 A1 | 12/2013 | Kinnebrew et al. |
| 2013/0342569 A1 | 12/2013 | Karkkainen |
| 2013/0342571 A1 | 12/2013 | Kinnebrew et al. |
| 2014/0002496 A1 | 1/2014 | Lamb |
| 2014/0064557 A1 | 3/2014 | Hara |
| 2014/0071163 A1 | 3/2014 | Kinnebrew |
| 2014/0098137 A1 | 4/2014 | Fein et al. |
| 2014/0098425 A1 | 4/2014 | Schon et al. |
| 2014/0132484 A1 | 5/2014 | Pandey et al. |
| 2014/0139551 A1 | 5/2014 | McCulloch |
| 2014/0145997 A1 | 5/2014 | Tiruvuru |
| 2014/0178029 A1 | 6/2014 | Raheman et al. |
| 2014/0192085 A1 | 7/2014 | Kim |
| 2014/0204077 A1 | 7/2014 | Kamuda et al. |
| 2014/0218361 A1 | 8/2014 | Abe |
| 2014/0222432 A1 | 8/2014 | Ahn |
| 2014/0267402 A1 | 9/2014 | Hing |
| 2014/0306866 A1 | 10/2014 | Miller |
| 2014/0354685 A1 | 12/2014 | Lazarow et al. |
| 2014/0368532 A1 | 12/2014 | Keane et al. |
| 2015/0097865 A1 | 4/2015 | Subramanian |
| 2015/0254793 A1 | 9/2015 | Hastings et al. |
| 2016/0063706 A1 | 3/2016 | Gonzalez-Banos et al. |
| 2016/0093106 A1 | 3/2016 | Black |
| 2016/0179336 A1 | 6/2016 | Ambrus et al. |

OTHER PUBLICATIONS

Aronoff et al. "Collaborative Augmented Reality for Better Standards"; Complex Systems Concurrent Engineering; Publication [online], Aug. 15, 2007, [retrieved Apr. 16, 2014], Retrieved from the Internet: <URL: http://www.nist.gov/customcf/get_pdf.cfm?pub_id-32632> pp. 479-486.

Freeman et al. "Scanned Laser Pico-Projectors: Seeing the Big Picture with a Small Device"; Optics and Photonics News, vol. 20, Issue 5; Publication [online]. May 2009. [retrieved Sep. 4, 2014]. Retrieved from the Internet; ,URL: http://www.microvision.com/wp-content/uploads/2014/07/OPN_Article.pdf> pp. 28-34.

International Search Report and Written Opinion dated Sep. 9, 2014 in International Application No. PCT/US14/23739 filed Mar. 11, 2014 (15 pages).

Non-Final Rejection dated Jul. 7, 2015 for U.S. Appl. No. 14/205,126, filed Mar. 3, 2014 (14 pages).

Response to non-final rejection dated Jul. 7, 2015, response submitted Jan. 7, 2016, for U.S. Appl. No. 14/205,126 (10 pages).

Non-Final Rejection dated Jul. 17, 2015 for U.S. Appl. No. 14/702,707, filed May 2, 2015 (13 pages).

Response to Non-Final Rejection dated Jul. 17, 2015, response submitted on Jan. 19, 2016 for U.S. Appl. No. 14/702,707, filed May 2, 2015 (13 pages).

Non-Final Rejection dated Jul. 8, 2015 for U.S. Appl. No. 14/702,709, filed May 2, 2015 (12 pages).

Response to Non-Final Rejection dated Jul. 8, 2015, response submitted on Jan. 8, 2016 for U.S. Appl. No. 14/702,709, filed May 2, 2015 (13 pages).

Non-Final Rejection dated Jul. 2, 2015 for U.S. Appl. No. 14/703,854, filed May 4, 2015 (9 pages).

Response to Non-Final Rejection dated Jul. 2, 2015, response submitted on Nov. 2, 2015 for U.S. Appl. No. 14/703,854, filed May 4, 2015 (8 pages).

Non-final office action for U.S. Appl. No. 14/703,863, dated Jul. 2, 2015 (9 pages).

Response to Non-final office action for U.S. Appl. No. 14/703,863, dated Jul. 2, 2015, response submitted Nov. 2, 2015 (12 pages).

Final office action for U.S. Appl. No. 14/703,863, dated Dec. 11, 2015 (15 pages).

Non-Final Rejection dated Jul. 6, 2015 for U.S. Appl. No. 14/703,867, filed May 4, 2015 (11 pages).

Response to Non-Final Rejection dated Jul. 6, 2015 for U.S. Appl. No. 14/703,867, response submitted Jan. 6, 2016 (12 pages).

Non-Final Rejection dated Jun. 11, 2015 for U.S. Appl. No. 14/703,871, filed May 4, 2015 (10 pages).

Response to Non-Final Rejection dated Jun. 11, 2015 for U.S. Appl. No. 14/703,871, response submitted on Dec. 11, 2015 (9 pages).

Non-Final Rejection dated Jul. 8, 2015 for U.S. Appl. No. 14/702,710, filed May 2, 2015 (11 pages).

Response to Non-Final Rejection dated Jul. 8, 2015 for U.S. Appl. No. 14/702,710, response filed Jan. 8, 2016 (10 pages).

Non-Final Rejection dated Oct. 30, 2015 for U.S. Appl. No. 14/212,961, filed Mar. 14, 2014 (56 pages).

Non-Final Rejection dated Oct. 30, 2015 for U.S. Appl. No. 14/702,734, filed May 3, 2015 (21 pages).

Non-Final Rejection dated Dec. 15, 2015 for U.S. Appl. No. 14/704,975, filed May 6, 2015 (17 pages).

Non-Final Rejection dated Nov. 17, 2015 for U.S. Appl. No. 14/702,739, filed May 3, 2015 (21 pages).

International Search Report and Written Opinion dated Nov. 3, 2014 in International Application No. PCT/US14/28977 filed Mar. 14, 2014 (14 pages).

Final Rejection dated Feb. 12, 2016 for U.S. Appl. No. 14/703,854, filed May 4, 2015 (20 pages).

Final Rejection dated Feb. 16, 2016 for U.S. Appl. No. 14/205,126, filed Mar. 11, 2014 (20 pages).

Response to the Non-Final Rejection filed Feb. 29, 2016 for U.S. Appl. No. 14/212,961 8 pages.

Response to Non-Final Rejection filed Feb. 29, 2016 for U.S. Appl. No. 14/702,734 8 pages.

Response to Final office action filed Feb. 12, 2016 U.S. Appl. No. 14/703,863, 10 pages.

Response to Non-Final Rejection filed Mar. 17, 2016 for U.S. Appl. No. 14/702,739, 10 pages.

(56) References Cited

OTHER PUBLICATIONS

Final Rejection dated Apr. 22, 2016 for U.S. Appl. No. 14/702,709, 14 pages.
Non-Final Rejection dated Feb. 26, 2016 for U.S. Appl. No. 14/703,863, 30 pages.
Final Rejection dated Mar. 24, 2016 for U.S. Appl. No. 14/703,871, 15 pages.
Final Rejection dated Apr. 4, 2016 for U.S. Appl. No. 14/702,739, 25 pages.
Notice of Allowance dated Mar. 28, 2016 for U.S. Appl. No. 14/212,961, 19 pages.
Notice of Allowance dated Apr. 6, 2016 for U.S. Appl. No. 14/702,734, 27 pages.
Final Rejection dated May 12, 2016 for U.S. Appl. No. 14/702,707, 30 pages.
Final Rejection dated May 12, 2016 for U.S. Appl. No. 14/702,710, 13 pages.
Response to Final Rejection filed May 12, 2016 for U.S. Appl. No. 14/703,854, 9 pages.
Response to Non-Final Rejection filed May 16, 2016 for U.S. Appl. No. 14/704,975, 15 pages.
Response to Final Rejection filed May 16, 2016 for U.S. Appl. No. 14/205,126, 11 pages.
Final Rejection dated May 20, 2016 for U.S. Appl. No. 14/703,867, 21 pages.
Final Rejection dated Jun. 13, 2016 for U.S. Appl. No. 14/704,975, 16 pages.
Non Final Rejection dated Jun. 16, 2016 for U.S. Appl. No. 14/205,126, 17 pages.
Non-Final Rejection dated Jun. 16, 2016 for U.S. Appl. No. 14/703,854, 16 pages.
Response to Non-Final Rejection filed May 26, 2016 for U.S. Appl. No. 14/703,863, 14 pages.
Response to Final Rejection filed Jul. 5, 2016 for U.S. Appl. No. 14/702,739 12 pages.
Non-final Rejection dated Jul. 12, 2016 for U.S. Appl. No. 14/704,979, 25 pages.
Response to Final Rejection filed Aug. 10, 2016 for U.S. Appl. No. 14/702,710 10 pages.
Response to Final Rejection filed Jul. 25, 2016 for U.S. Appl. No. 14/703,871, 10 pages.
Response to Final Rejection filed Aug. 9, 2016 for U.S. Appl. No. 14/702,707, 14 pages.
Final rejection dated Jul. 29, 2016 for U.S. Appl. No. 14/703,863, 15 pages.
Non-final rejection dated Aug. 1, 2016 for U.S. Appl. No. 14/702,739, 22 pages.
Response to Final Rejection filed Jul. 22, 2016 for U.S. Appl. No. 14/702,709, 11 pages.
Non-final rejection dated Aug. 23, 2016 for U.S. Appl. No. 14/704,976, 20 pages.
Non-final rejection dated Aug. 30, 2016 for U.S. Appl. No. 14/704,971, 21 pages.
Communication Pursuant to Rule 164 1 EPC for EP Application No. 14764114.6, based on PCT/US2014/028977, dated Sep. 7, 2016 6 pages.
Non-Final rejection dated Sep. 9, 2016 for U.S. Appl. No. 14/703,871 23 pages.
Response to Non-Final rejection filed Jan. 9, 2017 for U.S. Appl No. 14/703,871, 8 pages.
Non-Final rejection dated Sep. 13, 2016 for U.S. Appl. No. 14/707,981 25 pages.
Non-Final rejection dated Aug. 26, 2016 for U.S. Appl. No. 14/702,710 13 pages.
Response to Non final office action filed Jan. 25, 2017 for U.S. Appl. No. 14/702,710 11 pages.
Response to Final Rejection filed Sep. 28, 2016 for U.S. Appl. No. 14/703,863 14 pages.
Non-Final rejection dated Sep. 23, 2016 for U.S. Appl. No. 14/702,707 25 pages.
Non-Final rejection dated Sep. 22, 2016 for U.S. Appl. No. 14/702,709 18 pages.
Response filed Oct. 5, 2016 for Non Final Rejection for U.S. Appl. No. 14/205,126, 13 pages.
Non-Final rejection dated Oct. 4, 2016 for U.S. Appl. No. 14/704,974 18 pages.
Response filed Oct. 10, 2016 to to Non-Final Rejection for U.S. Appl. No. 14/703,854, 9 pages.
Response filed Oct. 12, 2016 to Non-final Rejection for U.S. Appl. No. 14/704,979, 10 pages.
Communication pursuant to Rule 164 1 EPC and partial supplementary European Search Report dated Oct. 4, 2016 for EP application No. 14778352.6, Applicant Magic Leap, Inc., 8 pages.
Non-Final Rejection dated Oct. 21, 2016 for U.S. Appl. No. 14/703,867, 23 pages.
Response filed Oct. 31, 2016 to Non-final rejection for U.S. Appl. No. 14/702,739, 10 pages.
Final Rejection dated Oct. 31, 2016 for U.S. Appl. No. 14/704,979, 21 pages.
Response to Final Rejection filed with RCE dated Oct. 31, 2016 for U.S. Appl. No. 14/703,863 12 pages.
Response to final rejection filed Oct. 13, 2016 for Final Rejection for U.S. Appl. No. 14/704,975, 9 pages.
Final Rejection dated Nov. 7, 2016 for U.S. Appl. No. 14/205,126, 17 pages.
Response to Final Rejection filed Oct. 5, 2016 for U.S. Appl. No. 14/703,867 14 pages.
Supplemental response filed Nov. 15, 2016 for U.S. Appl. No. 14/702,739 10 pages.
Non final office action dated Nov. 21, 2016 for U.S. Appl. No. 14/703,863, 14 pages.
Response to Non-final office action filed Nov. 22, 2016 for U.S. Appl. No. 14/704,976, 17 pages.
Final office action dated Nov. 28, 2016 for U.S. Appl. No. 14/702,739 27 pages.
Response to Non-Final rejection filed Dec. 21, 2016 for U.S. Appl. No. 14/702,709 12 pages.
Final rejection dated Dec. 27, 2016 for U.S. Appl. No. 14/704,976, 24 pages.
Final rejection dated Jan. 13, 2017 for U.S. Appl. No. 14/703,854 18 pages.
Extended European Search Report for European Application No. 14778352.6, Applicant Magic Leap, Inc., dated Jan. 11, 2017 13 pages.
Response to Non-final Office action filed Feb. 6, 2017 for U.S. Appl. No. 14/704,974 29 pages.
Response to Non-final Office action filed Jan. 31, 2017 for U.S. Appl. No. 14/704,979 10 pages.
Non-final office action for U.S. Appl. No. 14/704,975, dated Feb. 8, 2017 22 pages.
Response to Non-final office action filed May 8, 2017 for U.S. Appl. No. 14/704,975.
Response to Non-final Office action filed Feb. 13, 2017 for U.S. Appl. No. 14/704,981.
Response to Non-final Office action filed Feb. 17, 2017 for U.S. Appl. No. 14/702,707.
Response to Non-final Office action filed Feb. 21, 2017 for U.S. Appl. No. 14/703,867.
Response to Non-Final Office action filed Feb. 28, 2017 for U.S. Appl. No. 14/704,971 29 pages.
Response to Non-Final Office action filed Mar. 7, 2017 for U.S. Appl. No. 14/205,126 18 pages.
Response to Non-Final Office action filed Mar. 20, 2017 for U.S. Appl. No. 14/703,863 13 pages.
Final Office Action for U.S. Appl. No. 14/704,974, dated Mar. 20, 2017 13 pages.
Response to Final Office action filed Mar. 24, 2017 for U.S. Appl. No. 14/703,976 30 pages.
Response to Final Office action filed Mar. 28, 2017 for U.S. Appl. No. 14/702,739 12 pages.
Non-Final Office Action dated Mar. 30, 2017 for U.S. Appl. No. 14/205,126 18 pages.

(56) References Cited

OTHER PUBLICATIONS

Final Office action dated Mar. 29, 2017 for U.S. Appl. No. 14/704,981 41 pages.
Final Rejection dated Apr. 7, 2017 for U.S. Appl. No. 14/702,707, 18 pages.
Final rejection dated Apr. 7, 2017 for U.S. Appl. No. 14/703,863, 15 pages.
Final Rejection dated Apr. 21, 2017 for U.S. Appl. No. 14/702,709, 30 pages.
Final Rejection dated May 1, 2017 for U.S. Appl. No. 14/704,971, 46 pages.
Response to Final Office action filed May 22, 2017 for U.S. Appl. No. 14/704,974 13 pages.
Advisory Action dated Jun. 1, 2017 for U.S. Appl. No. 14/704,974 12 pages.
Non-final Office Action dated May 4, 2017 for U.S. Appl. No. 14/703,871, 15 pages.
Final Rejection dated May 19, 2017 for U.S. Appl. No. 14/704,975, 16 pages.
Non-final Rejection dated May 31, 2017 for U.S. Appl. No. 14/704,979, 26 pages.
Final Rejection dated May 18, 2017 for U.S. Appl. No. 14/702,710, 14 pages.
Response to Final office action filed Apr. 12, 2017 for U.S. Appl. No. 14/703,854 10 pages.
Non-Final office action dated May 4, 2017 for U.S. Appl. No. 14/703,854 18 pages.
Response to Non final office action filed Jan. 23, 2017 for U.S. Appl. No. 14/702,707, 14 pages.
Response to Final Office Action filed Jun. 19, 2017 for U.S. Appl. No. 14/702,709, 10 pages.
Final office action dated Jun. 16, 2017 for U.S. Appl. No. 14/703,867, 27 pages.
Response to Final office action filed with RCE dated Jun. 26, 2017 for U.S. Appl. No. 14/704,974, 32 pages.
Response to Non final office action filed Jun. 29, 2017 for U.S. Appl. No. 14/205,126, 12 pages.
Response to Final office action filed with RCE dated Jul. 3, 2017 for U.S. Appl. No. 14/704,971, 23 pages.
Response to Final office action filed with RCE dated Jul. 7, 2017 for U.S. Appl. No. 14/702,707, 12 pages.
Response to Final office action filed with RCE dated Jul. 7, 2017 for U.S. Appl. No. 14/703,863, 13 pages.
Response to Final office action filed on Jul. 19, 2017 for U.S. Appl. No. 14/704,975, 8 pages.
Non-Final Office Action filed Jun. 23, 2017 for U.S. Appl. No. 14/702,739, 28 pages.
Non-Final Office Action filed Jul. 12, 2017 for U.S. Appl. No. 14/704,976, 43 pages.
Response to Office Action with RCE filed Jun. 28, 2017 for U.S. Appl. No. 14/704,981.
Advisory Action dated Jul. 31, 2017 for U.S. Appl. No. 14/704,975.
Response to Office Action filed Aug. 4, 2017 for U.S. Appl. No. 14/703,854.
Non Final Office action dated Aug. 10, 2017 for U.S. Appl. No. 14/702,707, 18 pages.
Response to Office Action with AFCE filed Aug. 16, 2017 for U.S. Appl. No. 14/703,867.
Response to Office Action filed Aug. 31, 2017 for U.S. Appl. No. 14/704,979.
Non Final Office action dated Aug. 24, 2017 for U.S. Appl. No. 14/702,709, 35 pages.
Advisory Action dated Oct. 6, 2016 for U.S. Appl. No. 14/703,863 4 pages.
Response to Office Action with RCE filed Sep. 22, 2017 for U.S. Appl. No. 14/703,867.
Non Final Office Action dated Sep. 25, 2017 for U.S. Appl. No. 14/703,563.
Advisory Action dated Sep. 22, 2017 for U.S. Appl. No. 14/703,867.
Response to Non final office action filed Oct. 12, 2017 for U.S. Appl. No. 14/704,976, 20 pages.
Non Final Office Action dated Sep. 27, 2017 for U.S. Appl. No. 14/704,794.
Final Office Action dated Sep. 27, 2017 for U.S. Appl. No. 14/704,979.
Non Final Office Action dated Oct. 12, 2017 for U.S. Appl. No. 14/704,981.
Non Final Office Action dated Nov. 2, 2017 for U.S. Appl. No. 14/702,710.
Non Final Office Action dated Oct. 26, 2017 for U.S. Appl. No. 14/704,971.
Final Office Action dated Oct. 25, 2017 for U.S. Appl. No. 14/702,739.
Response to Non final office action filed Nov. 10, 2017 for U.S. Appl. No. 14/702,707, 12 pages.
Response to Non Final Office Action filed Nov. 22, 2017 for U.S. Appl. No. 14/702,709, 21 pages.
Final office action dated Nov. 16, 2017 for U.S. Appl. No. 14/205,125, 18 pages.
Non-Final office action dated Nov. 16, 2017 for U.S. Appl. No. 14/703,867, 28 pages.
Final Office Action dated Nov. 30, 2017 for U.S. Appl. No. 14/703,854, 19 pages.
Final Office Action dated Nov. 30, 2017 for U.S. Appl. No. 14/703,871, 18 pages.
Final office action dated Dec. 1, 2017 for U.S. Appl. No. 14/704,976, 48 pages.
Non-Final office action dated Dec. 21, 2017 for U.S. Appl. No. 14/704,975, 28 pages.
Response to Non final office action filed Dec. 22, 2017 for U.S. Appl. No. 14/703,863, 12 pages.
Amendment and Response to Non-Final Office Action dated Sep. 27, 2017 for U.S. Appl. No. 14/704,974, filed Dec. 27, 2017, 27 pages.
Amendment and Response to Final Office Action for U.S. Appl. No. 14/704,979, filed Dec. 27, 2017, 9 pages.
Advisory Action for U.S. Appl. No. 14/704,979 dated Jan. 11, 2018.
Response to Non Final Office Action filed Jan. 11, 2018 for U.S. Appl. No. 14/704,981.
Office action for Japanese Patent Application No. 2016-501326 dated Dec. 15, 2017, in Japanese with translation provided by Foreign Associate.
Non final office action dated Jan. 11, 2018 for U.S. Appl. No. 14/702,709.
Response to Final Office Action filed Jan. 19, 2018 for U.S. Appl. No. 14/702,739.
Response to Non Final Office Action filed Jan. 25, 2018 for U.S. Appl. No. 14/704,971.
Amendment RCE and Response to Final Office Action for U.S. Appl. No. 14/704,979 filed Jan. 29, 2018.
Response to Office Action filed Jan. 29, 2018 for U.S. Appl. No. 14/703,854.
Final office action dated Feb. 6, 2018 for U.S. Appl. No. 14/704,974.
Final office action dated Feb. 12, 2018 for U.S. Appl. No. 14/704,981.
Response to Office Action filed Feb. 15, 2018 for U.S. Appl. No. 14/703,867.
Notice of Appeal filed Feb. 28, 2018 for U.S. Appl. No. 14/703,854.
Response to Office Action filed Mar. 2, 2018 for U.S. Appl. No. 14/702,710.
Final Office Action dated Mar. 1, 2018 for U.S. Appl. No. 14/702,707.
Final Office Action dated Mar. 14, 2018 for U.S. Appl. No. 14/704,971.
Non-Final Office Action dated Mar. 14, 2018 for U.S. Appl. No. 14/704,979.
Response to Non-final office action filed Mar. 21, 2018 for U.S. Appl. No. 14/704,975.
Non-final office action dated Mar. 15, 2018 for U.S. Appl. No. 14/702,739.
Non-final office action dated Mar. 28, 2018 for U.S. Appl. No. 14/205,126.
Response to Final Office Action for U.S. Appl. No. 14/703,871 dated Mar. 30, 2018.
Response to Final Office Action for U.S. Appl. No. 14/704,976, filed Apr. 2, 2018.

(56) References Cited

OTHER PUBLICATIONS

RCE and amendment filed Aug. 21, 2017 for U.S. Appl. No. 14/704,975.
Response to Non-Final Office Action filed Sep. 7, 2018 for U.S. Appl. No. 14/704,976.
Amendment after Final Office Action filed Oct. 2, 2018 for U.S. Appl. No. 14/704,979.
Final Office Action dated Sep. 27, 2018 for U.S. Appl. No. 14/704,976.
Non Final Office Action dated Sep. 27, 2018 for U.S. Appl. No. 14/704,975.
Notice of Allowance dated Oct. 3, 2018 for U.S. Appl. No. 14/702,709.
Response to Non-Final Office Action filed Oct. 15, 2018 for U.S. Appl. No. 14/704,9764.
Advisory Action dated Oct. 16, 2018 for U.S. Appl. No. 14/704,979.
Notice of Allowance dated Oct. 12, 2018 for U.S. Appl. No. 14/702,707.
Examination Report dated Sep. 28, 2018 for New Zealand Application No. 735747.
Examination Report dated Oct. 2, 2018 for New Zealand Application No. 735751.
Examination Report dated Oct. 2, 2018 for New Zealand Application No. 735752.
Examination Report dated Oct. 4, 2018 for New Zealand Application No. 735754.
Examination Report dated Oct. 8, 2018 for New Zealand Application No. 735755.
Response to Non-Final Office Action filed Nov. 1, 2018 for U.S. Appl. No. 14/704,981.
Final Office Action dated Nov. 2, 2018 for U.S. Appl. No. 14/205,126.
Response to Non-Final Office Action filed Nov. 13, 2018 for U.S. Appl. No. 14/703,854.
Response to Non-Final Office Action filed Nov. 28, 2018 for U.S. Appl. No. 14/704,971.
Final Office Action dated Nov. 23, 2018 for U.S. Appl. No. 14/704,974.
Final Office Action dated Dec. 5, 2018 for U.S. Appl. No. 14/703,871.
Response to Office Action with RCE filed Dec. 19, 2018 for U.S. Appl. No. 14/704,976.
Final Office Action dated Dec. 20, 2018 for U.S. Appl. No. 14/704,981.
Notice of Allowance dated Dec. 19, 2018 for U.S. Appl. No. 14/702,710.
Response to Non Final Office Action filed Dec. 27, 2018 for U.S. Appl. No. 14/704,975.
Final office action dated Dec. 21, 2018 for U.S. Appl. No. 14/704,971.
"Adobe Image Size and Resolution," dated Apr. 27, 2018 (15 pages).
Response to Non-final office action filed Apr. 11, 2018 for U.S. Appl. No. 14/702,709.
Response to Final Office Action for U.S. Appl. No. 14/702,707 dated Apr. 26, 2018.
Final office action dated Apr. 24, 2018 for U.S. Appl. No. 14/704,975.
Final office action dated May 2, 2018 for U.S. Appl. No. 14/702,710.
Response to Final Office Action for U.S. Appl. No. 14/704,974 dated May 7, 2018.
Response to Final office action and RCE filed May 14, 2018 U.S. Appl. No. 14/704,981.
Pre-appeal brief filed Jun. 6, 2018 for U.S. Appl. No. 14/704,974.
Response to Final office action filed with RCE dated Jun. 6, 2018 for U.S. Appl. No. 14/702,707.
Advisory Action dated Jun. 6, 2018 for U.S. Appl. No. 14/702,707.
Advisory Action dated Jun. 6, 2018 for U.S. Appl. No. 14/704,974.
Non-Final Office Action dated Jun. 7, 2018 for U.S. Appl. No. 14/704,976.
Response to Final Office Action and RCE for U.S. Appl. No. 14/704,971 dated Jun. 14, 2018.
Response to Non-final office action for U.S. Appl. No. 14/704,979, dated Jun. 14, 2018 (12 pages).
Response to Non-final office action filed Jun. 15, 2018 for U.S. Appl. No. 14/702,739.
Response to Non-Final Office Action filed Jun. 28, 2018 for U.S. Appl. No. 14/205,126.
Notice of Allowance dated Jul. 10, 2018 for U.S. Appl. No. 14/703,867.
Non final office action dated Jul. 13, 2018 for U.S. Appl. No. 14/704,974.
Final Office Action dated Jun. 26, 2018 for U.S. Appl. No. 14/703,863.
EP Examination Report dated Jul. 25, 2018 for EP Appln. No. 14778352.6.
Non-Final rejection dated Aug. 2, 2018 for U.S. Appl. No. 14/707,981 44 pages.
Final Office Action dated Aug. 2, 2018 for U.S. Appl. No. 14/704,979.
Notice of Allowance dated Aug. 1, 2018 for U.S. Appl. No. 14/702,739.
Notice of Allowance dated Aug. 6, 2018 for U.S. Appl. No. 14/702,709.
Office action for Australian Patent Application No. 2014248874, dated Jul. 25, 2018, 3 pages.
Office action for Japanese Patent Application No. 2016-501326, dated Jul. 18, 2018, including English translation provided by Japanese Associate, 10 pages.
RCE and Amendment After Final for U.S. Appl. No. 14/704,975, dated Aug. 24, 2018.
Non-Final rejection dated Aug. 10, 2018 for U.S. Appl. No. 14/703,854 14 pages.
Non-Final Office Action dated Aug. 28, 2018 for U.S. Appl. No. 14/704,971.
Response to Final Office Action and RCE for U.S. Appl. No. 14/702,710 dated Sep. 4, 2018.
Examination Report dated Jan. 9, 2019 for Australia Application No. 2017232181.
Examination Report dated Jan. 10, 2019 for Australia Application No. 2017232179.
Examination Report dated Jan. 11, 2019 for Australia Application No. 2017232176.
Final Office Action dated Jan. 24, 2019 for U.S. Appl. No. 14/704,975.
Notice of Allowance dated Mar. 11, 2019 for U.S. Appl. No. 14/703,854.
Examination Report dated Feb. 19, 2019 for Australia Application No. 2014248874.
Notice of Allowance dated Mar. 15, 2019 for U.S. Appl. No. 14/704,976.
Pre Appeal Brief filed Mar. 20, 2019 for U.S. Appl. No. 14/704,981.
Response to Final Office Action filed Mar. 21, 2019 for U.S. Appl. No. 14/704,971.
Response to Final Office Action filed Mar. 25, 2019 for U.S. Appl. No. 14/704,975.
Advisory Action dated Mar. 28, 2019 for U.S. Appl. No. 14/704,971.
Advisory Action dated Apr. 1, 2019 for U.S. Appl. No. 14/704,975.
RCE and Amendment After Final for U.S. Appl. No. 14/704,975, dated Apr. 24, 2019.
RCE and Amendment After Final for U.S. Appl. No. 14/205,126, filed May 1, 2019.
Appeal Brief filed May 20, 2019 for U.S. Appl. No. 14/704,981.
Response to the Examination Report filed Jun. 4, 2019 for Australia Application No. 2014248874.
Appeal Brief filed Jun. 24, 2019 for U.S. Appl. No. 14/704,971.
Non-Final Office Action dated Jun. 27, 2019 for U.S. Appl. No. 14/205,126.
Notice of Allowance dated Jul. 8, 2019 for U.S. Appl. No. 14/704,981.
Examiner's Answer to Appeal Brief dated Jul. 12, 2019 for U.S. Appl. No. 14/704,971.
Notice of Allowance dated Aug. 5, 2019 for U.S. Appl. No. 14/704,975.

* cited by examiner

ADJUSTING PIXELS TO COMPENSATE FOR SPACING IN AUGMENTED OR VIRTUAL REALITY SYSTEMS

RELATED APPLICATION

The present application is a continuation of U.S. application Ser. No. 14/212,961, filed on Mar. 14, 2014, which claims the benefit under 35 U.S.C § 119 to U.S. provisional patent application Ser. No. 61/801,219, filed on Mar. 15, 2013. The foregoing applications are hereby incorporated by reference into the present application in their entirety.

FIELD OF THE INVENTION

The present invention generally relates to systems and methods configured to facilitate interactive virtual or augmented reality environments for one or more users.

BACKGROUND

A number of display systems can benefit from information regarding the head pose of a viewer or user (i.e., the orientation and/or location of user's head).

For instance, head-worn displays (or helmet-mounted displays, or smart glasses) are at least loosely coupled to a user's head, and thus move when the user's head moves. If the user's head motions are detected by the display system, the data being displayed can be updated to take the change in head pose into account.

As an example, if a user wearing a head-worn display views a virtual representation of a 3D object on the display and walks around the area where the 3D object appears, that 3D object can be re-rendered for each viewpoint, giving the user the perception that he or she is walking around an object that occupies real space. If the head-worn display is used to present multiple objects with a virtual space (for instance, a rich virtual world), measurements of head pose can be used to re-render the scene to match the user's dynamically changing head location and orientation and provide an increased sense of immersion in the virtual space.

Especially for display systems that fill a substantial portion of the user's visual field with virtual elements, it is critical that the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate motion sickness or simulator sickness.

Some head-worn displays enable the concurrent viewing of real and virtual elements—an approach often described as augmented reality or mixed reality. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the user can see through transparent (or semi-transparent) elements in the display system to view directly the light from real objects in the environment. The transparent element, often referred to as a "combiner", superimposes light from the display over the user's view of the real world.

In both video and optical see-through displays, detection of head pose can enable the display system to render virtual objects such that they appear to occupy a space in the real world. As the user's head moves around in the real world, the virtual objects are re-rendered as a function of head pose, such that the virtual objects appear to remain stable relative to the real world. In the case of an optical see-through display, the user's view of the real world has essentially a zero latency while his or her view of the virtual objects has a latency that depends on the head-tracking rate, processing time, rendering time, and display frame rate. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative the "window" the scene is re-rendered to match the user's changing viewpoint. Other systems include a head-worn projection system, in which a head-worn display projects light onto the real world.

SUMMARY

Embodiments of the present invention are directed to devices, systems and methods for facilitating virtual reality and/or augmented reality interaction for one or more users.

One embodiment is directed to a method of operation in a virtual image system or an augmented reality system, the method comprising, for each of at least some of a plurality of frames being presented to an end user, determining a location of appearance of a virtual object in a field of view of the end user relative to an end user frame of reference, and adjusting a presentation of at least one subsequent frame based at least in part on the determined location of appearance of the virtual object in the field of view of the end user. The virtual object may be newly introduced in the field of view of the end user temporally relative to previous frames presented to the end user. The newly introduced virtual object may be determined to likely attract an attention of the end user. The virtual object may be in a new position in the frame relative to a position in at least one previous frame. Or, the virtual object may be in a new position as presented to the end user relative to a previous position of the virtual object as previously presented to the end user.

The method may further comprise selecting the virtual object based on input indicative of an attention of the end user to the virtual object. The input indicative of the attention of the end user to the virtual object may be based at least in part on an appearance of the virtual object in a new position as presented to the end user relative to a position of the virtual object as previously presented to the end user. Or, the input indicative of the attention of the end user to the virtual object may be based at least in part on how quickly a position of the virtual object as presented to the end user changes relative to the position of the virtual object as previously presented to the end user.

The adjusting of the presentation of the at least one subsequent frame may include presenting the at least one subsequent frame with a center of the at least one subsequent frame shifted toward the determined location of appearance of the virtual object in the field of view of the end user. Or, the adjusting of the presentation of the at least one subsequent frame may include presenting the at least one subsequent frame with a center of the at least one subsequent frame shifted to the determined location of appearance of the virtual object in the field of view of the end user.

The method may further comprise predicting an occurrence of a head movement of the end user based at least in part on the determined location of appearance of the virtual object in the field of view of the end user. The method may further comprise estimating at least one value indicative of an estimated speed of the predicted head movement of the end user, determining at least one value that at least partially compensates for the estimated speed of the predicted head movement of the end user, and rendering the at least one subsequent frame based at least in part on the determined value.

The method may further comprise estimating at least one change in the speed in the predicted head movement of the end user, wherein the at least one change in the speed occurs between a start of the predicted head movement and an end of the predicted head movement, and wherein estimating the at least one value indicative of the estimated speed of the predicted head movement includes estimating the at least one value indicative of the estimated speed that at least partially accommodates for the estimated changes in the speed in the predicted head movement of the end user.

The estimating of the at least one change in the speed in the predicted head movement of the end user may include estimating the at least one change between a first defined time after the start of the predicted head movement and a second defined time before the end of the predicted head movement.

The method may further comprise estimating at least one value indicative of an estimated acceleration of the predicted head movement of the end user, determining at least one value that at least partially compensates for the estimated acceleration of the predicted head movement of the end user, and rendering the at least one subsequent frame based at least in part on the determined value.

The method may further comprise receiving information indicative of an identity of the end user, and retrieving at least one user specific historical attribute for the end user based on the received information indicative of the identity of the end user, wherein the user specific historical attribute is indicative of at least one of a previous head movement speed for the end user, a previous head movement acceleration for the end user, and a previous eye movement to head movement relationship for the end user.

The virtual object may be at least one of a virtual text object, a virtual numeric object, a virtual alphanumeric object, a virtual tag object, a virtual field object, a virtual chart object, a virtual map object, a virtual instrumentation object or a virtual visual representation of a physical object.

Another embodiment is directed to a method of operation in an augmented reality system, the method comprising receiving information indicative of an identity of the end user, retrieving at least one user specific historical attribute for the end user based at least in part on the received information indicative of the identity of the end user, and providing frames to the end user based at least in part on the retrieved at least one user specific historical attribute for the end user. The received information may be image information indicative of an image of at least a portion of an eye of the end user.

The retrieved at least one user specific historical attribute for the end user may be at least one attribute that provides an indication of at least one head movement attribute for the end user, wherein the head movement attribute is indicative of at least one previous head movement of the end user. Or the retrieved at least one user specific historical attribute for the end user may be at least one attribute that provides an indication of at least one previous head movement speed for at least one previous head movement for the end user. Or, the retrieved at least one user specific historical attribute for the end user may be at least one attribute that provides an indication of variation in a head movement speed across at least part of a range of at least one previous head movement by the end user. Or, the retrieved at least one user specific historical attribute for the end user may be at least one attribute that provides an indication of at least one previous head movement acceleration for at least one previous head movement by the end user. Or, the retrieved at least one user specific historical attribute for the end user may be at least one attribute that provides an indication of a relationship between at least one previous head movement and at least one previous eye movement by the end user. Or, the retrieved at least one user specific historical attribute for the end user may be at least one attribute that provides an indication of a ratio between at least one previous head movement and at least one previous eye movement by the end user.

The method may further comprise predicting at least an end point of a head movement of the end user, and providing frames to the end user based at least in part on the retrieved at least one user specific historical attribute for the end user includes rendering at least one subsequent frame to at least one image buffer, the at least one subsequent frame shifted toward the predicted end point of the head movement.

The method may, further comprise rendering a plurality of subsequent frames that shift toward the predicted end point of the head movement in at least partial accommodation of at least one head movement attribute for the end user, the head movement attribute indicative of at least one previous head movement of the end user.

The head movement attribute indicative of at least one previous head movement of the end user may be a historical head movement speed, a historical head movement acceleration for the end user or a historical ratio between head movement and eye movement for the end user.

The method may further comprise predicting an occurrence of a head movement of the end user based at least in part on a location of appearance of the virtual object in the field of view of the end user. The location of appearance of the virtual object may be determined in the same manner described above.

Another embodiment is directed to detecting an indication that a spacing as presented to an end user between some pixels in a frame will differ from a spacing between other pixels in the frame, adjusting a first set of pixels based on the detected indication, and providing at least a portion of at least one subsequent frame with the adjusted first set of pixels to at least partially compensate for the difference in spacing as presented to the end user. The pixel characteristics (e.g., size, intensity, etc.) may be perceptible to the end user.

The method may further comprise selecting a first set of pixels of the frame based on a direction of the detected head movement, wherein the direction of the first set of pixels is the same as the direction of the detected head movement, and increasing a size of the first set of pixels of the at least one subsequent frame. The method may further comprise selecting a first set of pixels of the frame based on a direction of the detected head movement wherein the direction of the first set of pixels is the same as the direction of the detected head movement, and increasing an intensity of the first set of pixels of the at least one subsequent frame in response to the detected head movement.

The method may further comprise selecting a first set of pixels of the frame based on a direction of the detected head movement wherein the direction of the first set of pixels is the opposite as the direction of the detected head movement, and decreasing a size of the first set of pixels of the at least one subsequent frame in response to the detected head movement.

The method may further comprise selecting a first set of pixels of the frame based on a direction of the detected head movement wherein the direction of the first set of pixels is the opposite as the direction of the detected head movement, and decreasing an intensity of the first set of pixels of the at least one subsequent frame in response to the detected head movement.

Another embodiment is directed to a method of operation in a virtual image presentation system, the method comprising rendering a first complete frame to an image buffer, wherein the first complete frame includes pixel information for sequential presentation of pixels to form an image of a virtual object, starting a presentation of the first complete frame, and dynamically interrupting the presenting of the first complete frame before completion of the presentation of the first complete frame by a presentation of an update to the first complete frame in which a portion of the pixel information has changed from the first complete frame.

Another embodiment is directed to a method of operation in a virtual image presentation system, the method comprising rendering a first complete frame having a first field and a second field to an image buffer, wherein the first field includes at least a first spiral scan line and the second field includes at least a second spiral scan line, the second spiral scan line interlaced with at least the first spiral scan line, reading out of the frame buffer which stores the first complete frame, and dynamically interrupting the reading out of the first complete frame before completion of the reading of the first complete frame by a reading out of an update to the first complete frame in which a portion of the pixel information has changed from the first complete frame. The dynamic interruption of the reading out may be based on a detected head movement of an end user, wherein the detected head movement exceeds a nominal head movement value.

Another embodiment is directed to a method of operation in a virtual image presentation system, the method comprising rendering a first complete frame having a first field and a second field to an image buffer, wherein the first field includes at least a first Lissajous scan line and the second field includes at least a second Lissajous scan line, the second Lissajous scan line interlaced with at least the first Lissajous scan line, reading out of the frame buffer which stores the first complete frame, and dynamically interrupting, based on a detected head movement of an end user exceeding a nominal head movement value, the reading out of the first complete frame before completion of the reading of the first complete frame by a reading out of an update to the first complete frame in which a portion of the pixel information has changed from the first complete frame. The method may further comprise phase shifting the Lissajous scan lines to interlace the Lissajous scan lines.

Another embodiment is directed to a method of operation in a virtual image presentation system, the method comprising for each of a plurality of frames, determining a respective resolution for each of at least two portions of the respective frame in response to a detected head movement of an end user, and presenting the virtual objects based on the determined respective resolutions of the at least two portions of the respective frame. The portion of the respective frame may be at least one of a field of the frame, a line of the frame, a pixel of the frame. The method may further comprise adjusting a characteristic of a drive signal between presenting a first portion of a frame and a second portion of the frame to create a variable resolution in the image of the virtual object. The characteristic of the drive signal may be at least one of an amplitude of the drive signal and a slope of the drive signal.

The method may further comprise assessing a point of attention in at least a first image for the end user, based on at least one of a processed eye tracking data, a determined location of appearance of a virtual object in a field of view of the end user relative to an end user frame of reference, a determined location of appearance of the virtual object when newly introduced in the field of view of the end user, and a determined location of appearance of the virtual object in a new position in an image relative to a position of the virtual object in at least one previous image.

The method may further comprise increasing the resolution in at least one subsequent image in a portion of the at least one subsequent image that is at least proximate to the assessed point of attention relative to other portions of the at least one subsequent image. The method may further comprise decreasing the resolution in at least one subsequent image in a portion of the at least one subsequent image that is distal to the assessed point of attention relative to other portions of the at least one subsequent image.

Another embodiment is directed to a method of operation in a virtual image presentation system, the method comprising displaying at least one virtual object to an end user, and temporarily blanking a portion of the display of the at least one virtual object when at least one of a detected head movement exceeds a nominal head movement value and a predicted head movement is predicted to exceed a head movement value. The method may further comprise processing head tracking data supplied via at least one transducer to determine the at least one of the detected head movement and the predicted head movement, wherein the head tracking data indicative of at least an orientation of a head of the end user.

Another embodiment is directed to a projector apparatus to project at least virtual images in an augmented reality system, the projector apparatus comprising a projector element, a support that supports the projector element with the projector element moveable in at least one axis of freedom, at least one actuator coupled to selectively move the projector element, and a control subsystem communicatively coupled to control the actuator such that the projector element is moved in response to at least one of a detection of a head movement of an end user that exceeds a nominal head movement value and a prediction of a head movement of the end user that is predicted to exceed the nominal head movement value. The projector element may further comprise at least a first optical fiber, the first optical fiber having a back end and a front end, the back end coupled to receive images, the front end positioned to transmit images therefrom.

The support element may comprise a piezoelectric collar that receives at least the first optical fiber is proximate to but spaced rearward from the front end of the first optical fiber such that a portion of the first optical fiber proximate to the front end thereof extends from the piezoelectric collar and is free to oscillate with a defined resonance frequency.

The at least one control subsystem of a projector apparatus is communicatively coupled to receive head tracking data supplied via at least one transducer, the head tracking data indicative of at least an orientation of a head of the end user. The control subsystem, for each of at least some of a plurality of images presented to the end user, determines a location of appearance of a virtual object in a field of view of the end user relative to an end user frame of reference, assesses whether the determined location requires the end user to turn a head of the end user, and predicts the occurrence of the head movement based on the assessment.

Another embodiment is directed to a method of operation in a virtual image presentation system, the method comprising over-rendering a frame for a defined field of view such that a pixel information for a set of pixels of the frame exceeds the maximum area of display at the maximum resolution, determining a portion of the frame to present to the end user based on at least one of a detected head movement and a predicted head movement, and selectively reading out only the determined portion of the frame.

Another embodiment is directed to a user display device, comprising a housing frame mountable on a head of a user, a lens mountable on the housing frame, and a projection subsystem coupled to the housing frame to determine a location of appearance of a display object in a field of view of the user based at least in part on at least one of a detection of a head movement of the user and a prediction of a head movement of the user, and to project the display object to the user based on the determined location of appearance of the display object. The location of appearance of the display object may be moved in response to the at least one of the detection of the head movement of the user or prediction of the head movement of the user that exceeds or it predicted to exceed a nominal head movement value. The prediction of the head movement of the user may be based on a prediction of a user's shift in focus or on a set historical attributes of the user.

The user display device may further comprise a first pair of cameras mountable on the housing frame to track a movement of the user's eyes and estimate a depth of focus of the user's eyes based on the tracked eye movements. The projection subsystem may project the display object based on the estimated depth of focus.

The user display device may further comprise a second pair of cameras mountable on the housing frame to capture a field of view image as seen by the user's eyes, wherein the field of view image contains at least one physical object. The projection sub system may project the display object in a manner such that the display object and the physical object captured through the second pair of cameras are intermixed and appear together in the same frame. The location of appearance may be based at least in part on the physical object. The display object and the physical object may have a predetermined relationship. The captured field of view image may be used to gather information regarding movements of the head of the user, wherein the information regarding movements of the head of the user comprises a center of attention of the user, an orientation of the head of the user, a direction of the head of the user, a speed of movement of the head of the user, an acceleration of the head of the user and a distance of the head of the user in relation to a local environment of the user.

The lens may comprise at least one transparent surface to selectively allow a transmission light such that the user is able to view a local environment. The projection subsystem may project the display object in a manner such that the user views both the display object and the local environment as viewed through the transparent surface of the lens.

The user display device may further comprise at least one intertial transducer to capture a set of intertial measurements indicative of movement of the head of the user, wherein the set of intertial measurements comprises a speed of movement of the head of the user, an acceleration of movement of the head of the user, a direction of movement of the head of the user, a position of the head of the user and an orientation of the head of the user.

The user display device may further comprise at least one light source to illuminate at least one of the head of the user and a local environment of the user.

The projection sub system may adjust at least one of a perceived size, an intensity and a resolution of a set of pixels associated with the display object to compensate for the at least one of the detected head movement and the predicted head movement. The display object may be one of a virtual object and an augmented virtual object.

Additional and other objects, features, and advantages of the invention are described in the detail description, figures and claims.

BRIEF DESCRIPTION OF THE DRAWINGS

FIG. 36B illustrates an example of a distortion of a raster scan pattern during vertical upward movement of the end user's head.

DETAILED DESCRIPTION

The description that follows relates to display systems and methods to be used in virtual reality and/or augmented reality systems. However, it is to be understood that the while the invention lends itself well to applications in virtual reality, the invention, in its broadest aspects, may not be so limited.

Figure 38:
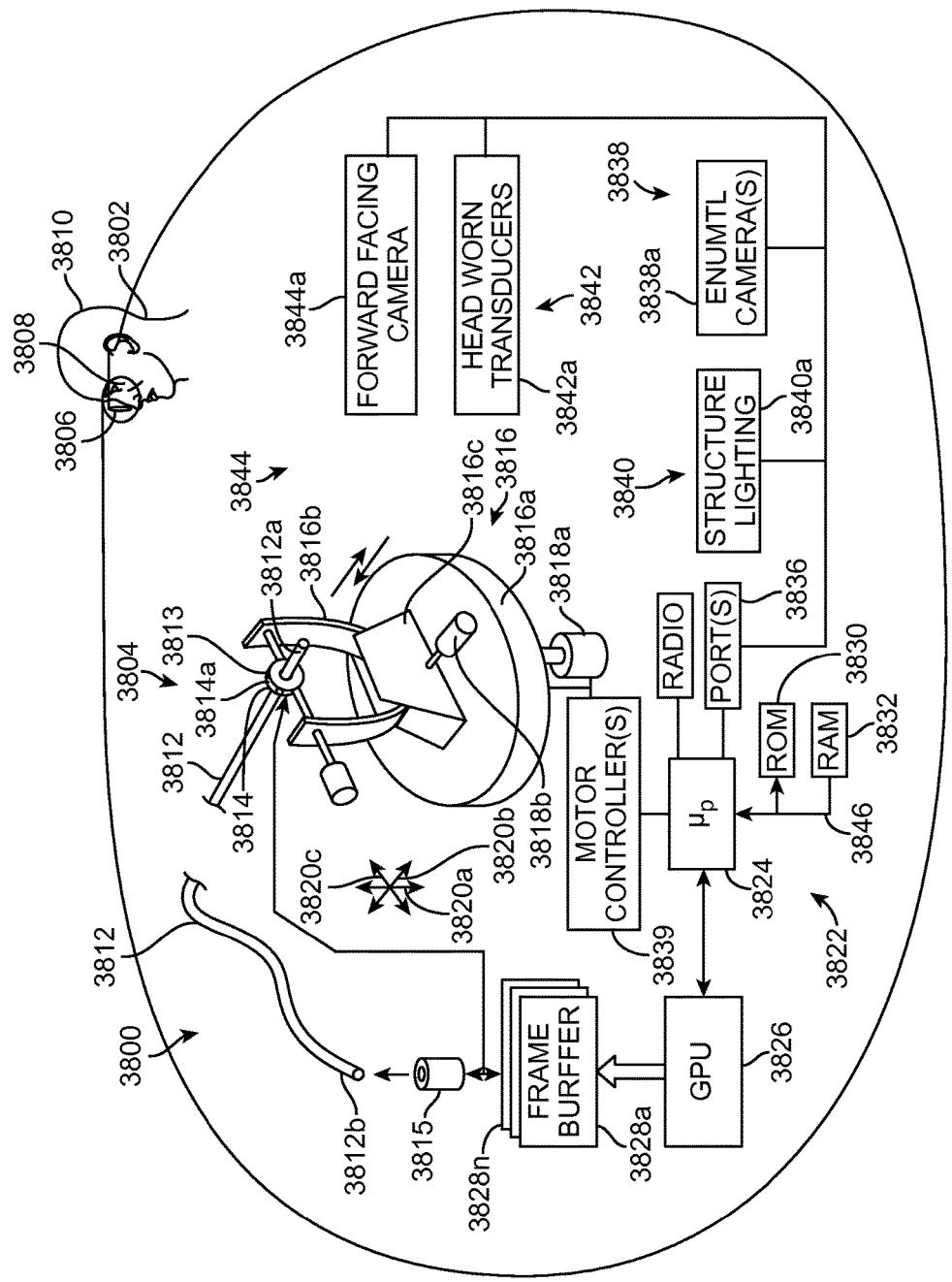
FIG. 38 illustrates an overview of the virtual image generation system.

Referring first to FIG. 38, FIG. 38 shows a virtual image generation system 3800 which may operate to provide virtual images to an end user 3802, according to one illustrated embodiment.

The virtual image generation system 3800 may be operated as an augmented reality system, providing images of virtual objects intermixed with physical objects in a field of view of the end user. There are two fundamental approaches when operating the virtual image generation system 3800 as an augmented reality system. A first approach employs one or more imagers (e.g., cameras) to capture images of the ambient environment. The virtual image generation system 3800 may inter-mix the virtual images into the data representing the images of the ambient environment. A second approach employs one or more at least partially transparent surfaces through which the ambient environment can be seen and on to which the virtual image generation system 3800 produces images of virtual objects. As will be apparent to those of skill in the art, at least some of the aspects described herein are particularly suited to augmented reality systems.

The virtual image generation system 3800 may be operated as a virtual reality system, providing images of virtual objects in a virtual environment.

The virtual image generation system 3800, and the various techniques taught herein, may be employed in applications other than augmented reality and virtual reality systems. For example, various techniques may be applied to any projection or display system. For example, the various techniques described herein may be applied to pico projectors where movement may be movement of an end user's hand rather than head movement. Thus, while often described herein in terms of an augmented reality system, the teachings should not be limited to such systems or such uses.

At least for augmented reality applications, it may be desirable to spatially position various virtual objects relative to respective physical objects in a field of view of an end user 3802. Virtual objects, also referred to herein as virtual tags or tag or call outs, may take any of a large variety of forms, basically any variety of data, information, concept or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object or a virtual visual representation of a physical object.

Head tracking accuracy and latency have been problems for virtual reality and augmented reality systems. Tracking inaccuracies and latency produce inconsistency between the end user's visual system and vestibular system. Such may lead to queasiness and discomfort. Such is particularly problematic in display systems that fill a large portion of the end user's field of view. Approaches to addressing such may include increasing frame rate or effective frame rate, for instance via strobing or flashing or via other techniques. As described herein, predictive head tracking may be employed to address such, for instance by reducing latency. Predictive head tracking may rely on any of a large variety of factors or approaches, including historical data or attributes for a specific end user. Also as described herein, blanking of display or presentation may be effectively employed, for instance blanking during rapid head movements.

At least for augmented reality applications, placement of virtual objects in spatial relation to physical objects (e.g., presented to appear spatially proximate to a physical object in two- or three-dimensions) may be a nontrivial problem. For example, head movement may significantly complicated placement of virtual objects in a view of an ambient environment. Such is true whether the view is captured as an image of the ambient environment and then projected or displayed to the end user 3802, or whether the end user 3802 perceives the view of the ambient environment directly. For instance, head movement will like cause a field of view of the end user 3802 to change, which will likely require an update to where various virtual objects are displayed in the field of view of the end user 3802. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as a ending point is reached, obtaining a maximum speed somewhere between the starting and ending points of the head movement. Rapid head movements may even exceed the ability of the particular display or projection technology to render images that appear uniform and/or as smooth motion to the end user 3802.

In the embodiment illustrated in FIG. 38, the virtual image generation system 3800 includes a projection subsystem 3804 operable to project images on a partially transparent display surface 3806 which is positioned in the end user's 3802 field of view between the eyes 3808 of the end user 3802 and an ambient environment. The virtual image generation system 3800 may be worn or mounted on a head 3810 of the end user 3802, for example incorporated into a pair of glasses or a visor.

In the illustrated embodiment, the projection subsystem 3804 includes one or more optical fibers 3812 (e.g., single mode optical fiber) which have a back or distal end 3812a into which light is received and a front or proximate end 3812b from which light is provided to the partially transparent display surface 3806 or projected directly into the eyes 3808 of the end user 3802. The projection subsystem 3804 may also include one or more light sources 3815 that produces the light (e.g., emits light of different colors in defined patterns), and communicatively couples the light to the back or distal end 3812a of the one or more optical fibers 3812. The light source(s) 3815 may take any of a large variety of forms, for instance a set of RGB lasers (e.g., laser diodes capable of outputting red, green and blue light) operable to respectively produce red, green and blue coherent collimated light according to a defined pixel patterns specified in respective frames of pixel information or data. Laser light provides high color saturation and are highly energy efficient.

While FIG. 38 shows a single optical fiber 3812, some implementations may employ two or more optical fibers 3812, breaking the light up into multiple channels. In such implementations, the optical fibers 3812 may have staggered tips or beveled and polished tips to bend the light, reducing optical spacing between the channels. The optical fibers 3812 may be conveniently packaged as a ribbon cable. Suitable optics may produce a conjugate of the respective images produced by each of the channels.

The one or more optical fibers 3812 may be supported by a yoke 3814 with a portion of the front or proximate end 3812b extending therefrom. The yoke 3814 may be operable to set the front or proximate end 3812b in oscillatory motion. For example, the yoke 3814 may comprise a tube of a piezoelectric transducer 3814a (only one shown in FIG. 38). A number of electrodes 3813 (e.g., four illustrated, only one called out) are radially arranged about the piezoelectric transducer 3814a. Applying control signals, e.g., via frame buffer 3828, to respective electrodes 3813 associated with the piezoelectric transducer 3814a can cause the front or proximate end 3812b of the optical fiber(s) 3812 to oscillate vibrate in a first resonance mode. A size of vibrations or amount of travel off center is controllable via the applied drive signals to obtain any of a variety of at least bi-axial patterns. Patterns may, for instance, include a raster scan pattern, spiral or volute scan pattern, or a Lissajous or FIG. 8 scan pattern.

Figure 31:
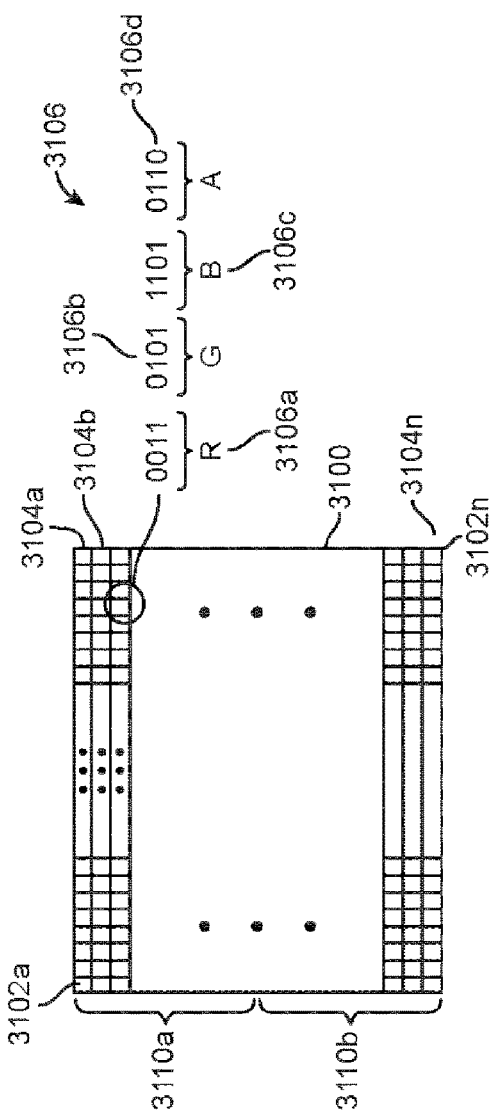
FIG. 31 illustrates an example of a frame having pixel information.

FIG. 31 shows a frame 3100 of pixel information or data that specifies pixel information or data to present an image, for example, an image of one or more virtual objects, according to one illustrated embodiment. The frame 3100 is schematically illustrated with a cell 3102a-3102n (only two called out, collectively 3102), each a pixel. Sequences of cells arranged in rows or lines 3104a, 3104b-3104n (three called out, collectively 3104), illustrated as extending horizontally across the drawing sheet in FIG. 31. The frame 3100 includes a plurality of lines 3104. FIG. 31 employs ellipses to represent missing information, such as cells or lines that have been omitted for clarity of illustration.

Each cell 3102 of the frame 3100 may specify values (collectively 3106) for each of a plurality of colors for the respective pixel to which the cell corresponds and/or intensities. For instance, the frame 3100 may specify one or more values for red 3106a, one or more values for green 3106b and one or more values for blue 3106c for each pixel. The values 3106 may be specified as binary representations for each of the colors, for instance a respective 4 bit number for each color. Each cell 3102 of the frame 3100 may additionally include an amplitude or radial value 3106d that specifies an amplitude or radial dimension for each pixel, for example where the frame 3100 may be used with a spiral scan line pattern based system or with a Lissajous scan line pattern based system.

The frame 3100 may include one or more fields, collectively 3110. The frame 3100 may consist of a single field. Alternatively, the frame 3100 may comprise two, or even more fields 3110a-3110b. The frame 3100 illustrated in FIG. 31 shows two fields 3110a-3110b. The pixel information for a complete first field 3110a of the frame 3100 may be specified before the pixel information for the complete second field 3110b, for example occurring before the pixel information for the second field 3110b in an array, an ordered list or other data structure (e.g., record, linked list). A third or even a fourth field may follow the second field 3110b, assuming a presentation system is configured to handle more than two fields 3110a-3110b.

Figure 32:
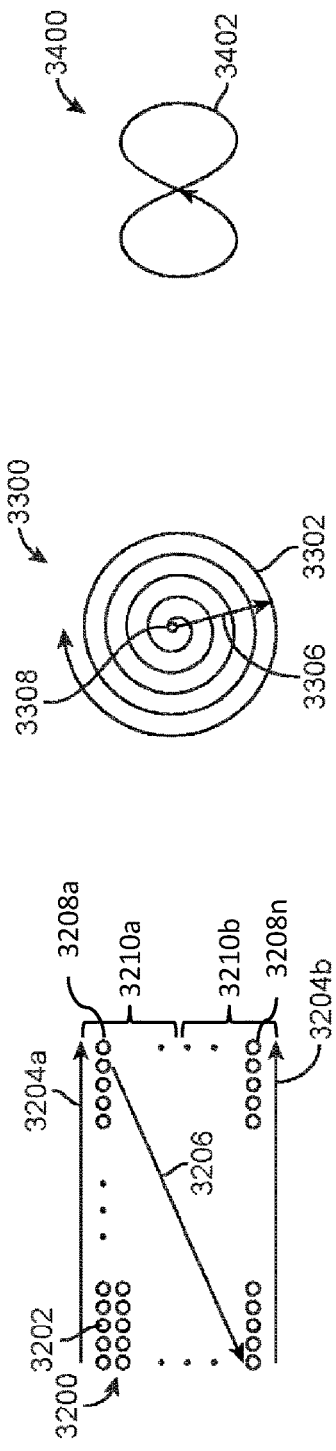
FIG. 32 illustrates an example of a raster scan pattern.

FIG. 32 schematically represents a raster scan pattern 3200. In the raster scan pattern 3200, pixels 3202 (only one called out) are sequentially presented. The raster scan pattern 3200 typically presents pixels from left to right (indicated by arrows 3204a, 3204b, then from top to bottom (indicated by arrow 3206). Thus, the presentation may start at the upper right corner and traverse left across a first line 3208a until the end of the line is reached. The raster scan pattern 3200 typically then starts from the left in a next line down. The presentation may be temporarily blacked out or blanked which returning from the end of one line to the start of the next line. This process repeats line-by-line until the bottom line 3208n is completed, for example at the bottom right most pixel. With the frame 3100 being complete, a new frame is started, again returning the right of the top most line of the next frame. Again, the presentation may be blanked while returning from the bottom left to the top right to present the next frame.

Many implementations of raster scanning employ what is term as an interlaced scan pattern. In interlaced raster scan patterns, lines from the first and the second fields 3110a, 3110b are interlaced. For example, when presenting lines of the first field 3110a, the pixel information for the first field 3110a may be used for the odd numbered lines only, while the pixel information for the second field 3110b may be used for the even numbered lines only. Thus, all of the lines of the first field 3210a of the frame 3100 (FIG. 31) are typically presented before the lines of the second field 3110b. The first field 3110a may be presented using the pixel information of the first field 3110a to sequentially present line 1, line 3, line 5, etc. Then the second field 3110b of the frame 3100 (FIG. 31) may be presented following the first field 3210a, by using the pixel information of the second field 3110b to sequentially present line 2, line 4, line 6, etc.

Figure 33:
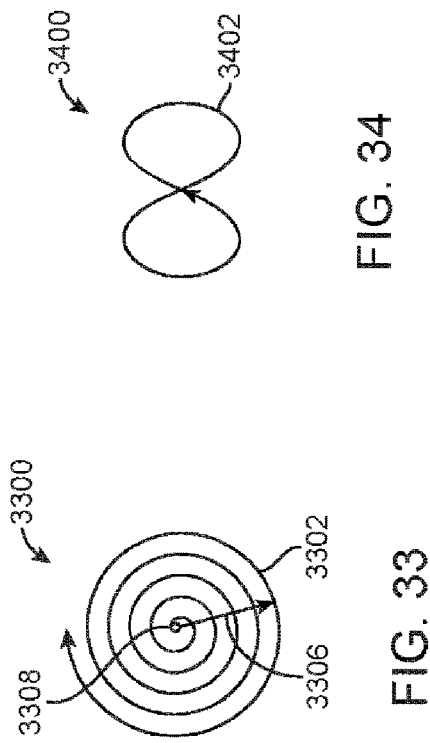
FIG. 33 illustrates an example of a spiral scan pattern.

FIG. 33 schematically represents a spiral scan pattern 3300, according to one illustrated embodiment. The spiral scan pattern 3300 may consist of a single spiral scan line 3302, which may include one or more complete angular cycles (e.g., 360 degrees) which may be denominated as coils or loops. The pixel information is used to specify the color and/or intensity of each sequential pixel, as the angle increments. An amplitude or radial value specifies a radial dimension 3306 from a starting point 3308 of the spiral scan line 3302.

Figure 34:
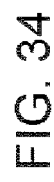
FIG. 34 illustrates an example of a Lissajous scan pattern.

FIG. 34 schematically represents a Lissajous scan pattern 3400, according to one illustrated embodiment. The Lissajous scan pattern 3400 may consist of a single Lissajous scan line 3402, which may include one or more complete angular cycles (e.g., 360 degrees) which may be denominated as coils or loops. Alternatively, the Lissajous scan pattern 3400 may include two or more Lissajous scan lines 3402, each phase shifted with respect to one another to nest the Lissajous scan lines 3402. The pixel information is used to specify the color and/or intensity of each sequential pixel, as the angle increments. An amplitude or radial value 3208 (FIG. 31) specifies a radial dimension from a starting point of the Lissajous scan line 3402.

Figure 35:
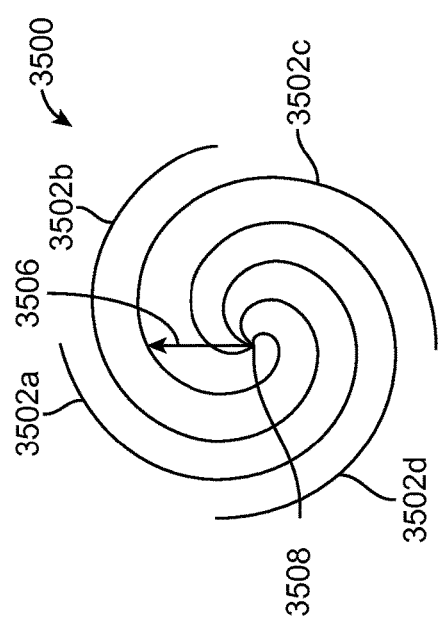
FIG. 35 illustrates an example of a multi-field spiral scan pattern.

FIG. 35 schematically represents a multi-field spiral scan pattern 3500, according to one illustrated embodiment. The multi-field spiral scan pattern 3500 includes two or more distinct spiral scan lines, collectively 3502, FIG. 35 illustrating four spiral scan lines 3502a-3502d. The pixel information for each spiral scan 3502 line may be specified by a respective field (e.g., 3110a, 3110b) of a frame 3100 (FIG. 31). Advantageously, multiple spiral scan lines 3502 may be nested simply by shifting a phase between each successive ones of the spiral scan lines 3502. The phase difference between spiral scan lines 3502 should be a function of the total number of spiral scan lines 3502 which will be employed. For example, four spiral scan lines 3502a-3502d may be separate by a 90 degree phase shift. An exemplary embodiment may operate at a 100 Hz refresh rate with 10 distinct spiral scan lines (i.e., subspirals). Similar to the embodiment of FIG. 33, one or more amplitude or radial values 3306 specify a radial dimension 3506 from a starting point 3508 of the spiral scan lines 3502.

As is evident from FIGS. 34 and 35, relative spacing between adjacent pixels may vary throughout an image. It may be advantageous to at least partially accommodate or compensate for this non-uniformity. For example, it may be advantageous to adjust pixel size, for instance increasing perceived pixel size for pixels that are spaced farther apart than other pixels. Such may, for instance, be implemented via selective blurring (e.g., variable focus lens, variable diffuser, jitter) to increase Gaussian spot size. Additionally or alternatively, it may be advantageous to adjust intensity for pixels that are spaced farther apart than other pixels.

Returning to FIG. 38, driving the piezoelectric transducer 3814a with sine wave drive signals at a resonant frequency about a first axis and at a resonance frequency about a second axis, perpendicular to the first axis, produces a spiral scan pattern. The spiral scan pattern may be characterized by a radial dimension that varies as an angular dimension varies. For example, a radial dimension may vary linearly, or nonlinearly, while the radial dimension varies from 0 degrees to, or through, 360 degrees. In appearance, the spiral scan line may appear as a continuous spiral, starting at a start point and sweeping radially outward while rotating in a plane. Each complete angular cycle may be described as constituting a coil or loop. Spiral scan lines may be defined has having any desired number of coils or loops before starting over at the start point. A refresh period in which display or presentation is blanked may occur between an end of a temporally first spiral scan pattern and a stat of a next temporally successive spiral scan pattern. An outer most radial dimension of the spiral scan pattern may be set by amplitude modulating of the sine wave drive signal. Amplitude modulation of a spiral scan line pattern adjusts the radial dimension without affecting the angular dimension. Thus, amplitude modulation will not affect the frequency of cycles (e.g., number of coils or loops) or number of cycles in a given time for a given scan line. The position of the front or proximate end 3812b in the pattern is synchronized with the output of the light source(s) 3815 to form two- or three-dimensional images.

While not illustrated, the projection subsystem 3804 may include one or more optical components (e.g., lenses, filters, gratings, prisms, reflectors, dichroic reflectors, defractors) that direct the output from the front or proximate end 3812b of the one or more optical fibers 3812 directly or indirectly toward the eyes 3808 of the end user 3802, for example via partially transparent display surface 3806. While not illustrated, the projection subsystem 3804 may include one or more optical components that modulate a depth of Z-axis position of pixel data. Such may, for example, take the form of a flexible reflective (e.g., nitride sputter coated with aluminum) membrane and one or more electrodes operated to cause deflection of the flexible reflective membrane. The flexible reflective membrane is positioned to reflect and focus light emitted from the front or proximate end 3812b of the one or more optical fibers 3812. The flexible reflective membrane is selectively operable based on depth map for the pixel data or information to focus light in the Z-dimension or axis. The flexible reflective membrane may employ Gaussian spots to produce an appearance of depth, certain virtual objects in an image appearing in focus while others appearing out of focus. Additionally or alternatively, the system may employ one or more Kerr effect lens.

While not necessary to a head worn embodiment, the optical fibers 3812, and optionally the yoke 3814, may be supported for movement in one or more directions. For example, the optical fibers 3812, and optionally the yoke 3814, may be supported via gimbals 3816 for 2, 3 or more degrees of freedom of movement. The gimbals 3816 may include a turntable 3816a, a first actuator 3818a (e.g., electric motor, solenoid, piezoelectric transducer) operable to pivot or rotate about a first axis 3820a. The gimbals 3816 may include a bracket 3816b supported by a frame 3816c on the turntable 3816a, a second actuator 3818b (e.g., electric motor, solenoid, piezoelectric transducer) operable to pivot or rotate about a second axis 3820b. The gimbals 3816 may include a shaft 3816d pivotally supported by the bracket 3816b, a third actuator 3818c (e.g., electric motor, solenoid, piezoelectric transducer) operable to pivot or rotate about a third axis 3820c. The first, second and third axes (collectively 3820) may be orthogonal axes.

In the embodiment illustrated in FIG. 38, the virtual image generation system 3800 includes a control subsystem 3822. The control subsystem 3822 may take any of a large variety of forms, one of which is illustrated in FIG. 38.

The control subsystem 3822 includes a number of controllers, for instance one or more microcontrollers, microprocessors or central processing units (CPUs) 3824, digital signal processors (DSPs), graphics processing units (GPUs) 3826, other integrated circuit controllers such as application specific integrated circuits (ASICs), programmable gate arrays (PGAs) for instance field PGAs (FPGAs), and/or programmable logic controllers (PLUs). In the embodiment illustrated in FIG. 38, the microprocessor 3824 controls overall operation, while the GPU 3826 renders frames (e.g., sets of pixel data) to one or more frame buffers 3828a-3828n (collectively 3828). While not illustrated, one or more additional integrated circuits may control the reading into and/or reading out of frames from the frame buffer(s) 3828 and operation of the piezoelectric transducers or electrodes 3814a, synchronizing both to produce two- or three dimensional images. Reading into and/or out of the frame buffer(s) 3828 may employ dynamic addressing, for instance where frames are over rendered.

The control subsystem 3822 includes one or more non-transitory computer- or processor-readable media to store instructions and data. The nontransitory computer- or processor-readable media may for example include the frame buffer(s) 3828. The nontransitory computer- or processor-readable media may, for example, include one or more nonvolatile memories, for instance read only memory (RAM) 3830 or flash memory. The nontransitory computer- or processor-readable media may, for example, include one or more volatile memories, for instance random access memory (RAM) 3832. The control subsystem 3822 may include other volatile and nonvolatile memory, include spinning media storage as well as solid state storage devices.

In implementations where the actuators (collectively 3818) are employed, the control subsystem 3822 may optionally include one or more dedicated motor controllers 3839 communicatively coupled to drive the actuators 3818 via motor control signals.

The control subsystem 3822 may optionally include one or more communications ports 3836a, 3836b (collectively 3836) that provide communications with various other systems, components or devices. For example, the control subsystem 3822 may include one or more wired interfaces or ports 3836a which provide wired or optical communications. Also for example, the control subsystem 3822 may include one or more wireless interfaces or ports such as one or more radios (i.e., wireless transmitter, receiver, transceiver) 3836b which provide wireless communications.

As illustrated, the wired interfaces or ports 3836a provide wired or optical communications with an environmental imaging system 3838 include one or more cameras 3838a positioned and oriented to capture images of an environment in which the end user 3802 is located. Such may be used to sense, measure or collect information about the end user 3802 and/or the environment. For instance, such may be used to detect or measure movements and/or positions of the end user 3802 or parts of the end user's 3802 body, such as the head 3810. As illustrated, the wired interfaces or ports 3836a may optionally provide wired or optical communications with a structure lighting system 3840 which includes one or more light sources 3840a positioned and oriented to illuminate the end user 3802, a portion of the end user 3802 such as the head 3810 and/or the environment in which the end user 3802 is located.

As illustrated, the wireless interfaces or ports 3836b provide wireless (e.g., RF, microwave, IR) communications with one or more head worn transducer system 3842 that includes one or more inertial transducers 3842a to capture inertial measures indicative of movement of the head 3810 of the end user 3802. Such may be used to sense, measure or collect information about head movements of the end user 3802. For instance, such may be used to detect or measure movements, speeds, acceleration, and/or positions of the head 3810 of the end user 3802. As illustrated, the wired interfaces or ports 3836a may optionally provide wired or optical communications with an imaging system 3842 including, for example, one or more forward facing imagers or cameras 3842a. Such may be used to capture information about the environment in which the end user 3802 is located. Such may be used to capture information indicative of distance and orientation of the end user 3802 with respect to that environment and specific objects in that environment.

When head worn, the forward facing imagers or cameras 3842a are particularly suited to capture information indicative of distance and orientation of the end user's head 3810 with respect to the environment in which the end user 3802 is located and specific objects in that environment. Such may, for example be employed to detect head movement, speed and/or acceleration of head movements. Such may, for example, be employed to detect or infer a center of attention of the end user 3802, for example based at least in part on an orientation of the end user's head 3810. Orientation may be detected in any direction (e.g., up/down, left/right with respect to reference frame of end user).

In some implementations all communications may be wired, while in other implementations all communications may be wireless. In still further implementations the choice of wired and wireless communications may be different from that illustrated in FIG. 38. Thus, the particular choice of wired or wireless communications should not be considered limiting.

Various components of the control subsystem 3822, for example the microprocessor 3824, GPU 3826, frame buffer(s) 3828, ROM 3830, RAM 3832, and/or optionally dedicated motor controller(s) 3834 may be communicatively coupled via one or more communications channels, for instances one or more buses 3846 (only one illustrated). The buses 3846 may take a variety of forms including instruction buses, data buses, address buses, other communications bus, and/or power buses.

The ability to predict head movements allows a virtual image generation system 3800 (FIG. 38), such as an augmented reality system, to quickly update the presentation of images and/or to accommodate or compensate for head movement. For example, subsequent frames may be rendered or read out earlier than would be possible if only sensed head movements were employed. As will be apparent from the discussions herein, accommodation or compensation may take a variety of forms. For example, subsequent frames may be rendered or read out with a shifted field of view or a center that is shifted toward or to an area of attention or focus of the end user. Also for example, subsequent frames may be rendered or read out to accommodate or compensate for variation resulting from the head movement. For instance, in certain display or projection technologies (e.g., "flying pixel" technologies where pixels are displayed sequentially, such as raster scan, spiral scan, Lissajous scan), rapid head movement may cause a change in spacing between pixels as a frame is presented to the end user. The accommodation or compensation may include accommodating or compensating for this variation in pixel spacing. For instance, a size or perceived size of some pixels may be adjusted relative to other pixels. Also for instance, an intensity or perceived brightness of some pixels may be adjusted relative to other pixels. As a further example, subsequent frames may be rendered or read out with a variable resolution between different portions of a resulting image. Other accommodation or compensation techniques will be apparent from the this discussion. In other aspects, many of these same techniques may be employed for purposes other than accommodation or compensation, and may be employed independently of predictive head tracking, sensed head tracking, and/or with display or projection technologies that are not "flying pixel" based.

End user movement, for example head movements may have a substantial effect on images. As the augmented reality system attempts to render subsequent frames consistent with the head movement, the resulting images of virtual objects may become compressed, expanded or otherwise distorted.

This is at least partially the result of the fact that for many display or presentation technologies (i.e., "flying pixel" technologies), complete images for any given frame are not presented or displayed simultaneously, but rather are presented or displayed pixel by pixel. Thus, there is not a true instantaneous field of view for these display or presentation technologies. Such may occur, in different forms, across many different types of image generation technologies, for instance raster scan, spiral scan or Lissajous scan approaches. One or more "white" or blank frames or images may alleviate some of the effects of rapid head movement.

Figure 36A:
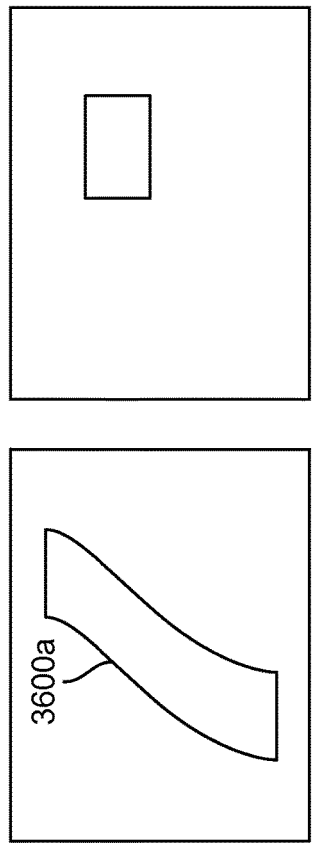
FIG. 36A illustrates an example of a distortion of a raster scan pattern during rapid lateral movement of the end user's head.

For example, FIG. 36A shows an exemplary distortion in a raster scan 3600a produced during rapid lateral movement of an end user's head. The distortion is likely to be nonlinear since head motion may speed up after initiation and slow down prior to termination. The distortion is a function of the direction, speed and acceleration of head movement and the direction of raster scan pixel generation (e.g., right to left, top to bottom).

Also for example, FIG. 36B shows an exemplary distortion in a raster scan 3600 produced during vertically upward movement of an end user's head. The distortion is likely to be nonlinear since head motion may speed up after initiation and slow down prior to termination. The distortion is a function of the direction, speed and acceleration of head movement and the direction of raster scan pixel generation (e.g., right to left, top to bottom).

Figure 37B:
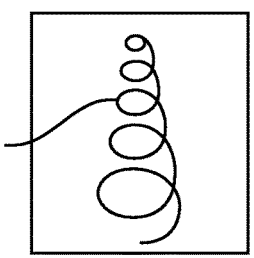
FIG. 37B illustrates an example of a distortion of a spiral scan line during very rapid lateral movement of the user's head to the left.
Figure 37A:
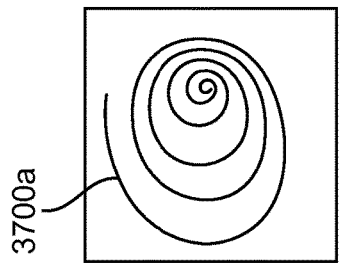
FIG. 37A illustrates an example of a distortion of a spiral scan line during rapid lateral movement of the end user's head to the left.

As yet another example, FIG. 37A shows an exemplary distortion in a spiral scan line 3700a produced during rapid lateral movement of an end user's head to the left. The distortion is likely to be nonlinear since head motion may speed up after initiation and slow down prior to termination. The distortion is a function of the direction, speed and acceleration of head movement and the direction of spiral scan pixel generation (e.g., clockwise, increasing radius). As illustrated spacing between successive loops or coils of the spiral scan line 3700a increases in the direction of the head movement (e.g., to the left in the drawing sheet), and decreases in the diametrically opposed direction (e.g., to the right in the drawing sheet).

As yet a further example, FIG. 37B shows an exemplary distortion in a spiral scan line 3700b produced during very rapid lateral movement of an end user's head to the left. The distortion is likely to be nonlinear since head motion may speed up after initiation and slow down prior to termination. In fact, the distortion may be highly elliptical and de-centered as illustrated in FIG. 37B. The distortion is a function of the direction, speed and acceleration of head movement and the direction of spiral scan pixel generation (e.g., clockwise, increasing radius). As illustrated spacing between successive loops or coils of the spiral scan line 3700b increases in the direction of the head movement (e.g., to the left in the drawing sheet). Where the head movement is too rapid for the system, the left most portion of each loop or coil may be located in the same direction as the head movement relative to a starting point of the spiral scan line 3700b, as illustrated in FIG. 37B.

One advantage of employing spiral scan patterns is that the transformation to address into the image buffer is independent of the direction of movement (e.g., movement of head, movement of hand for handheld pico projector).

Figure 1:
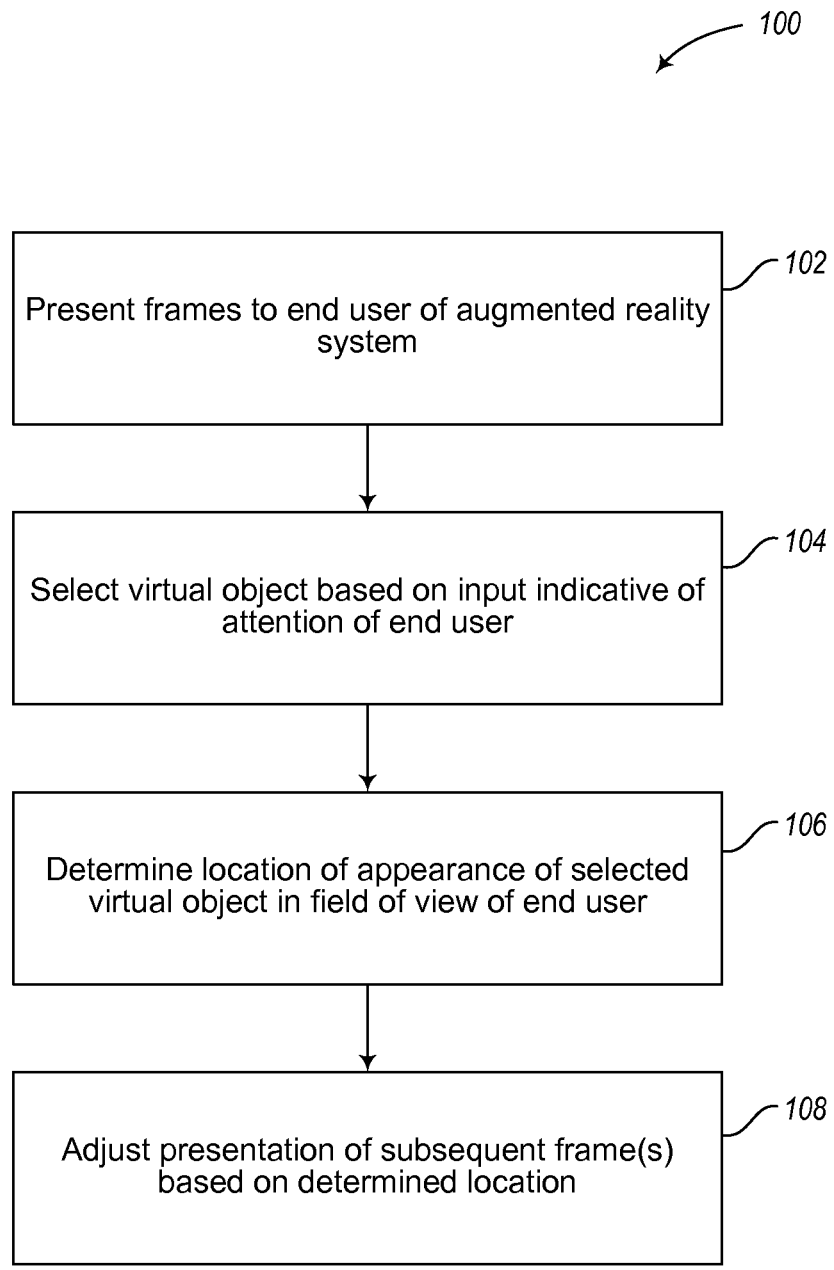
FIG. 1 illustrates an example of using predictive head tracking for rendering frames to an end user.

The system above is used in all the embodiments described below. In one embodiment, the system may be used for predictive head tracking based on predicting a user's shift in focus. FIG. 1 shows a method 100 of operation in an augmented reality system employing predictive head tracking, according to one illustrated embodiment.

At 102, the augmented reality system (e.g., a controller subsystem and/or processor thereof) presents a plurality of frames as images to an end user of the augmented reality system. The frames will typically include pixel information specifying information for producing one or more virtual objects in a field of view. As previously noted, the virtual objects may take any of a wide variety of virtual object forms or formats, which may visual represent physical objects or may represented information, data or logical constructions. Non-limiting examples of virtual objects may include: a virtual text object, a virtual numeric object, a virtual alphanumeric object, a virtual tag object, a virtual field object, a virtual chart object, a virtual map object, a virtual instrumentation object or a virtual visual representation of a physical object.

At 104, the augmented reality system selects one or more virtual objects based at least on input indicative of attention of the end user.

The input may be an actual selection by the end user. The selection may be made in real time or may have been previously designated by the end user. Thus, an end user may select a certain set of virtual instruments as being a type of virtual object the end user typically focuses or pays attention to over other objects.

The input may be inferred from a variety of sources. The input may be related to the virtual objects themselves. The input may be additionally or alternatively be related to physical objects in a field of view of the end user or in the field of view of a display or projector. The input may be additionally or alternatively be related to the end user themselves, for example a position and/or orientation of the end user and/or a portion of end user (e.g., head, eyes), or historical attributes. The historical attributes may be end user specific, or more generalized or generic. The historical attributes may be indicative of a set of defined end user characteristics. End user characteristics may, for example, include head movement speed, head movement acceleration, and/or relationship between head movement and eye movement (e.g., ratio of one to the other. The end user characteristics tracked by historical attributes may even include indications of a tendency of a given end user to pay attention to certain virtual objects. Such may be specified by virtual object type (e.g., text, charts), by recentness of virtual object (e.g., newly appearing objects), movement of a virtual object (e.g., large shifts from image to image, fast or rapidly movement, direction of movement), and/or characteristics of the virtual object (e.g., color, brightness, size).

At 106, for each of at least some of a plurality of frames being presented to an end user, the augmented reality system (e.g., a controller subsystem and/or processor thereof) determines a location of appearance of a virtual object in a field of view of the end user relative to an end user frame of reference. For example, the augmented reality system may determine a location of a newly introduced virtual object, a virtual object of a defined type, a virtual object moving rapidly or over a large distance, or a virtual object that has historically been a point of attention for the end user.

At 108, the augmented reality system adjusts a presentation of at least one subsequent frame based at least in part on the determined location of appearance of the virtual object in the field of view of the end user. Numerous ways of adjusting appearance of the virtual object in the field of view are discussed herein, including non-exhaustively accommodation or compensation, adjusting pixel size, adjusting pixel intensity, adjusting resolution, windowing, and/or blanking or strobing.

Figure 2:
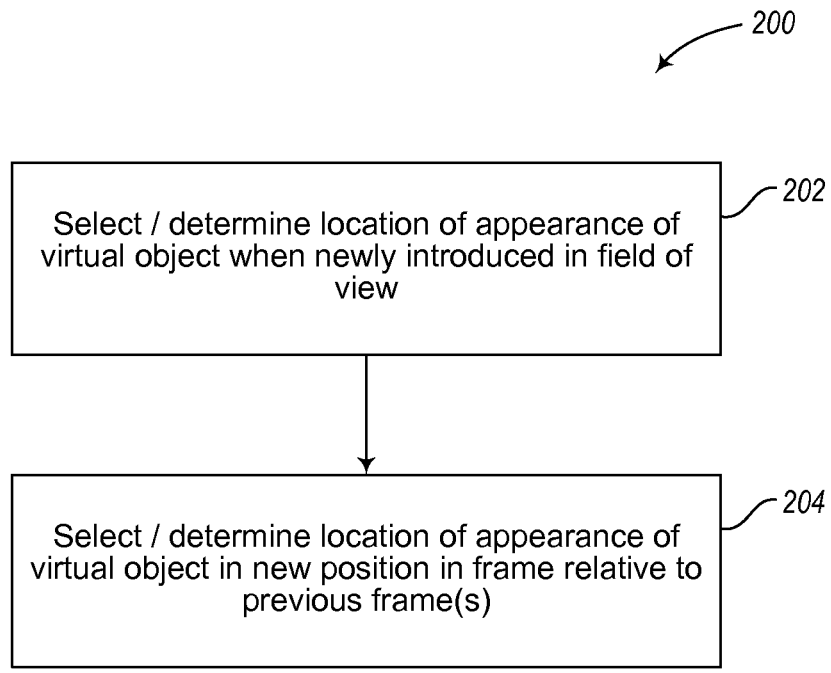
FIG. 2 illustrates an example of a technique that predicts head movement based on characteristics of virtual objects presented to the end user.

FIG. 2 shows another method 200 of operation in an augmented reality system, according to one illustrated embodiment. The method 200 may be employed in executing acts 104 and/or 106 of the method 100 of FIG. 1.

The method 200 employs techniques that predict head movement based on characteristics of virtual objects that are or will be presented to the end user. For example, anticipating that a newly introduced virtual object or a virtual object who's movement (e.g., due to suddenness, speed, and/or distance) will likely attract the end user's attention, resulting in a head movement to bring the particular virtual object into or proximate to a center of the end user's field of view. Additionally, or alternatively the augmented reality system may rely on other characteristics of the virtual objects in assessing which are most likely to attract attention. For example, highly attractive (e.g., flashing, shimmering), large, fast moving, or bright virtual objects may be more likely to attract attention than other virtual objects.

Focusing on the case of a newly introduced virtual object, the augmented reality system (e.g., a controller subsystem and/or processor thereof) selects and/or determines the location of appearance of a virtual object when newly introduced in the field of view of the end user at #AB02. A virtual object is considered newly introduced when not appearing in previous (temporally) related frames presented to the end user. In particular, the augmented reality system relies on the fact that newly introduced virtual objects are like to attract the attention of the end user relative to virtual objects that appear in immediately preceding frames. Additionally, or alternatively the augmented reality system may rely on other characteristics of the virtual objects in assessing which are most likely to attract attention, for example to select or prioritize among multiple newly introduced virtual objects. For example, highly attractive (e.g., flashing, shimmering), large, fast moving, or bright virtual objects may be more likely to attract attention than other virtual objects.

Focusing on the case of a moving virtual object, the augmented reality system (e.g., a controller subsystem and/or processor thereof) selects and/or determines a location of an appearance of a virtual object in a new position in a frame relative to a position of the same virtual object in at least one previous frame at 204. Thus, a sudden shifting, a quick shifting, and/or a spatially large shifting of a position of a virtual object from one frame to one or more subsequent frames may be likely to attract the attention or focus of the end user. Additionally, or alternatively the augmented reality system may rely on other characteristics of the virtual objects in assessing which are most likely to attract attention, for example to select or prioritize among multiple newly introduced virtual objects. For example, highly attractive (e.g., flashing, shimmering), large, or bright virtual objects may be more likely to attract attention than other virtual objects.

Figure 3:
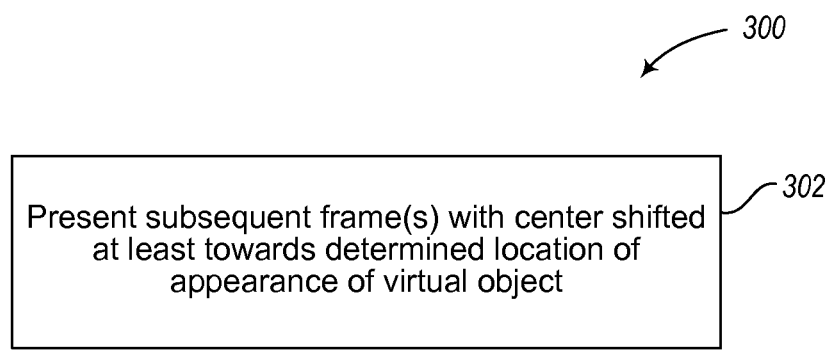
FIG. 3 illustrates an example where a center of the frame is shifted.

FIG. 3 shows a method 300 of operation in an augmented reality system, according to one illustrated embodiment. The method 300 may be employed in executing act 108 of the method 100 of FIG. 1.

At 302, the augmented reality system (e.g., a controller subsystem and/or processor thereof) presents the at least one subsequent frame with a center of the at least one subsequent frame shifted at least towards, if not centered on, the determined location of appearance of the virtual object in the field of view of the end user. The center of the subsequent frame(s) or image(s) may be shifted to be co-located with the location of the selected virtual object that is predicted to attract the end user's attention. Alternatively, the center of the subsequent frame(s) may be shifted to be proximate to the location of the selected virtual object that is predicted to attract the end user's attention. Such may be performed in two-dimensions or in three-dimensions. For example, the two dimensional or three dimensional position of the virtual object may be used to adjust a field of view of subsequent images(s) in two- or three-dimensions, respectively. The shifted subsequent frame(s) or image(s) are preferably timed with the predicted head movement of the end user. Thus, the shifted subsequent frame(s) or image(s) should be presented to the end user as close in timing with the actual head movement as possible. As discussed herein, such may account for speed, acceleration, and variations in speed and acceleration.

Figure 4:
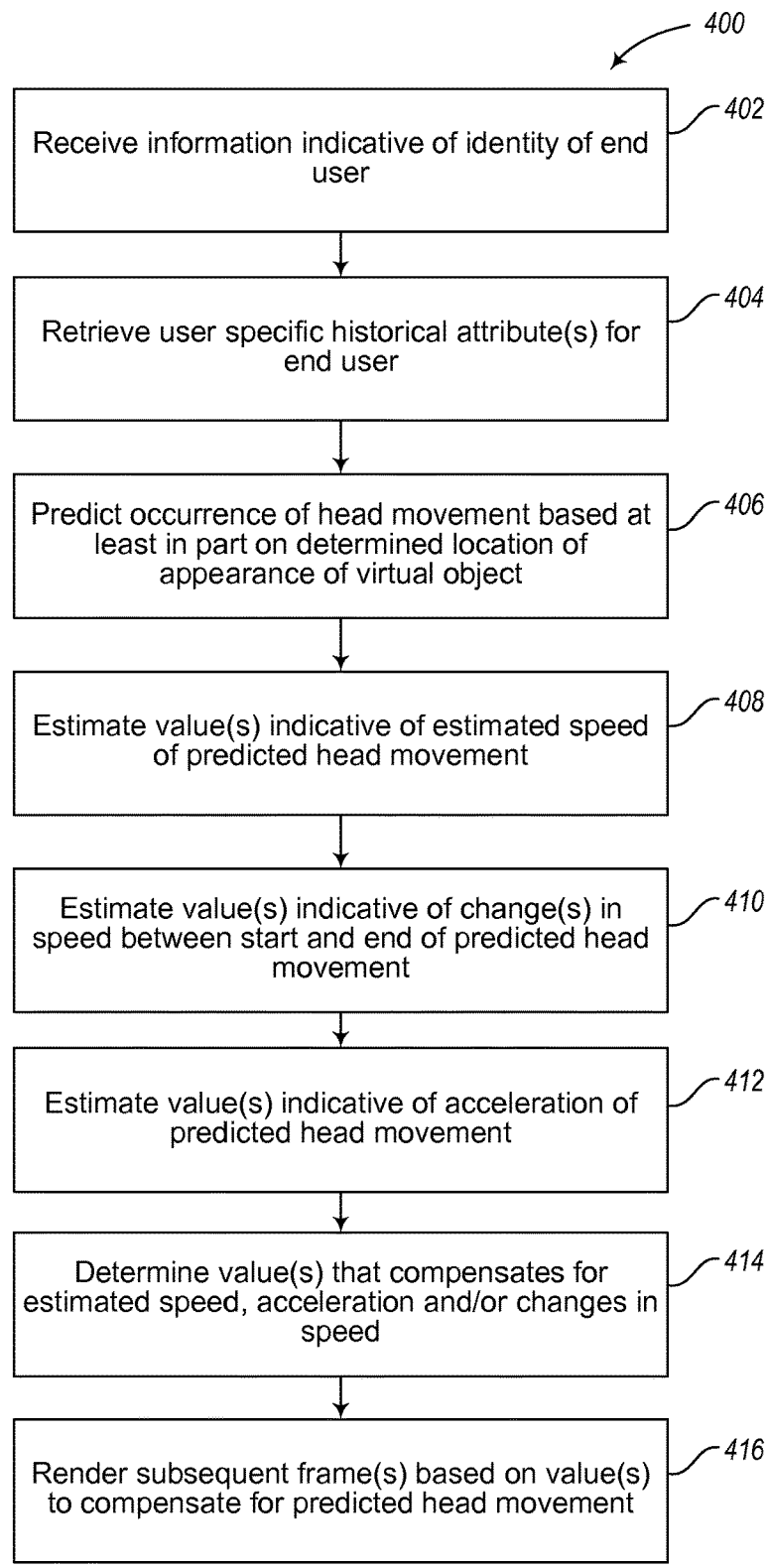
FIG. 4 illustrates an example of a technique that predicts head movement based on a set of historical attributes of the end user.

FIG. 4 shows a method 400 of operation in an augmented reality system, according to one illustrated embodiment. The method 400 may be employed in performing the method 100 of FIG. 1.

Optionally at 402, the augmented reality system receives information indicative of an identity of the end user. The information may take any of a large variety of forms. For example, the information may be a user name or other user identifier entered by the end user (e.g., keyed) or read from a transponder, magnetic stripe, or machine-readable symbol associated with the end user. For example, the information may include biometric information indicative of one or more physical characteristics of the end user. In one particularly advantageous implementation, the augmented reality system may receive image data that represents a portion (e.g., retina) of one or both eyes of the end user. For instance, the augmented reality system may project light, for example via one or more optical fibers, into one or both eyes of an end user. The light may be modulated, for example to increase a signal to noise ratio and/or limit heating of the eye. An image sensor may capture an image of the portion of the eye, for example via the one or more optical fibers that project the light, the optical fiber(s) providing a bi-directional path. Alternatively, a dedicated optical fiber may be employed. As a further alternative an image sensor may be positioned proximate to the eye, eliminating the use of the optical fiber(s) as a return path to the image sensor. Certain portions of the human eye (e.g., vasculature of retina) may be considered sufficiently distinctive to serve as a unique end user identifier.

Optionally at 404, the augmented reality system retrieves at least one user specific historical attribute for the end user based in the received information indicative of the identity of the end user. The user specific historical attribute(s) may be indicative of at least one of: a previous head movement speed for the end user, previous head movement acceleration for the end user, previous eye movement to head movement relationship for the end user, tendencies of end user to pay attention to virtual objects of certain types or with certain characteristics.

At 406, the augmented reality system (e.g., a controller subsystem and/or processor thereof) predicts an occurrence of a head movement of the end user based at least in part on the determined location of appearance of the virtual object in the field of view of the end user. Again, the augmented reality system may rely on an attractiveness of a virtual object in predicting head movements, for example on an end user by end user basis.

The augmented reality system may employ estimated speed and/or estimated changes in speed or estimated acceleration to at least partially synchronize image presentation with the predicted head movement of the end user. The estimated change in the speed in the predicted head movement may be based on a range extending between a first defined time after the start of the predicted head movement and a second defined time before the end of the predicted head movement.

At 408, the augmented reality system estimates at least one value indicative of an estimated speed of the predicted head movement of the end user. The augmented reality system may estimate speed based on one or more values, parameters or characteristics. For example, the augmented reality system may rely on a range of movement required to move to the end user's head to a new position to observe the selected or identified virtual object. The augmented reality system may rely on average speed for a sampling of humans, or may rely on historical head movement speeds for the particular end user. The augmented reality system may rely on historical attributes for the particular end user. Speeds may be represented in angular velocities.

At 410, the augmented reality system estimates at least one change in the speed in the predicted head movement of the end user which occurs over a range of head movement, between a start of the predicted head movement and an end of the predicted head movement. The changes in speed may occur at different increments throughout some portion of the predicted range of movement.

At 412, the augmented reality system estimates at least one value indicative of an estimated acceleration of the predicted head movement of the end user. The estimated acceleration may be over an entire range of the head movement or over only a portion thereof. The estimated acceleration may be over discrete intervals of the range of head movement. Estimates of acceleration may be determined for one or more intervals at some defined duration after the start of head movement. Estimates for acceleration may be determined for one or more intervals at some defined duration before the end of head movement. Estimating spaced from the start and/or end points may avoid large variation in acceleration measurements.

Optionally at 414, the augmented reality system determines at least one value that at least partially accommodates or compensates for the estimated speed of the predicted head movement of the end user. For example, the augmented reality system may determine values with respect a total number of frames to present in a given time and/or values that specify where and/or how quickly one or more virtual objects should move across a scene in a series of images to be rendered and/or presented. Such may be used to render subsequent frames.

Optionally at 416, the augmented reality system renders the at least one subsequent frame based at least in part on the at least one value that at least partially compensates for the estimated speed of the predicted head movement of the end user. For example, the augmented reality system may determine values with respect a total number of frames to present in a given time and/or values that specify where and/or how quickly one or more virtual objects should move across a scene in a series of images to be rendered and/or presented. Such may be used to render subsequent frames.

Figure 5:
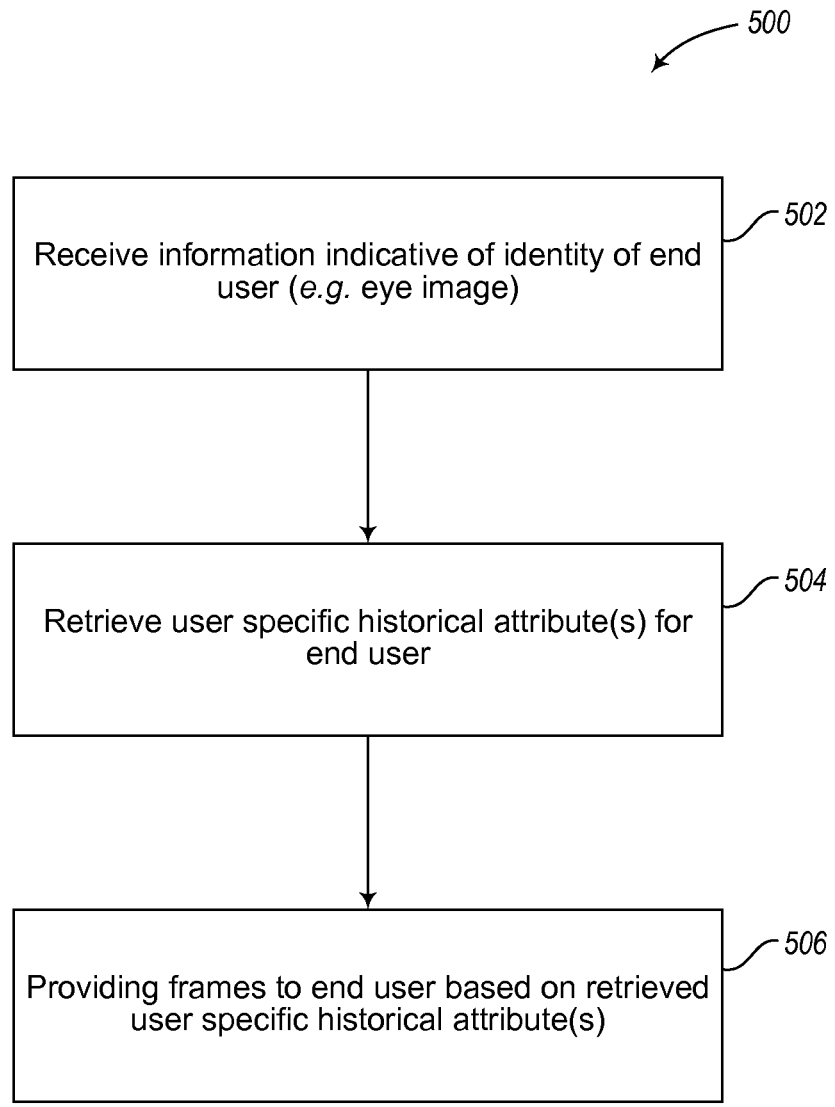
FIG. 5 illustrates another example of the technique that predicts head movement based on historical attributes.

In another embodiment, the system may be used for predictive head tracking based on a user's historical attributes. FIG. 5 shows a method 500 of operation in an augmented reality system employing predictive head tracking, according to one illustrated embodiment.

The augmented reality system may employ historical attributes in performing predictive head tracking. The historical attributes may be end user specific, or more generalized or generic. The historical attributes may be indicative of a set of defined end user characteristics. End user characteristics may, for example, include head movement speed, head movement acceleration, and/or relationship between head movement and eye movement (e.g., ratio of one to the other. The end user characteristics tracked by historical attributes may even include indications of a tendency of a given end user to pay attention to certain virtual objects.

At 502, the augmented reality system receives information indicative of an identity of the end user. The information may take any of a large variety of forms, for example information actively provided be the end user, read from nontransitory storage media, read from the user (e.g., biometric data or characteristics), or inferred from end user actions.

At 504, the augmented reality system retrieves at least one user specific historical attribute for the end user based at least in part on the received information indicative of the identity of the end user. The identity information may be received, produced or determined in any of a large variety of ways.

At 506, the augmented reality system provides frames to the end user based at least in part on the retrieved at least one user specific historical attribute for the end user. For example, the augmented reality system may provide frames from a frame buffer to a projector or display device (e.g., light source paired with one or more optical fibers), or may render frames to a frame buffer. The augmented reality system may provide light via at least one optical fiber which is moveable at least bi-axially. The augmented reality system may receive image information indicative of an image of at least a portion of an eye of the end user via the at least an optical fiber which also provides the frames to the end user.

Figure 6:
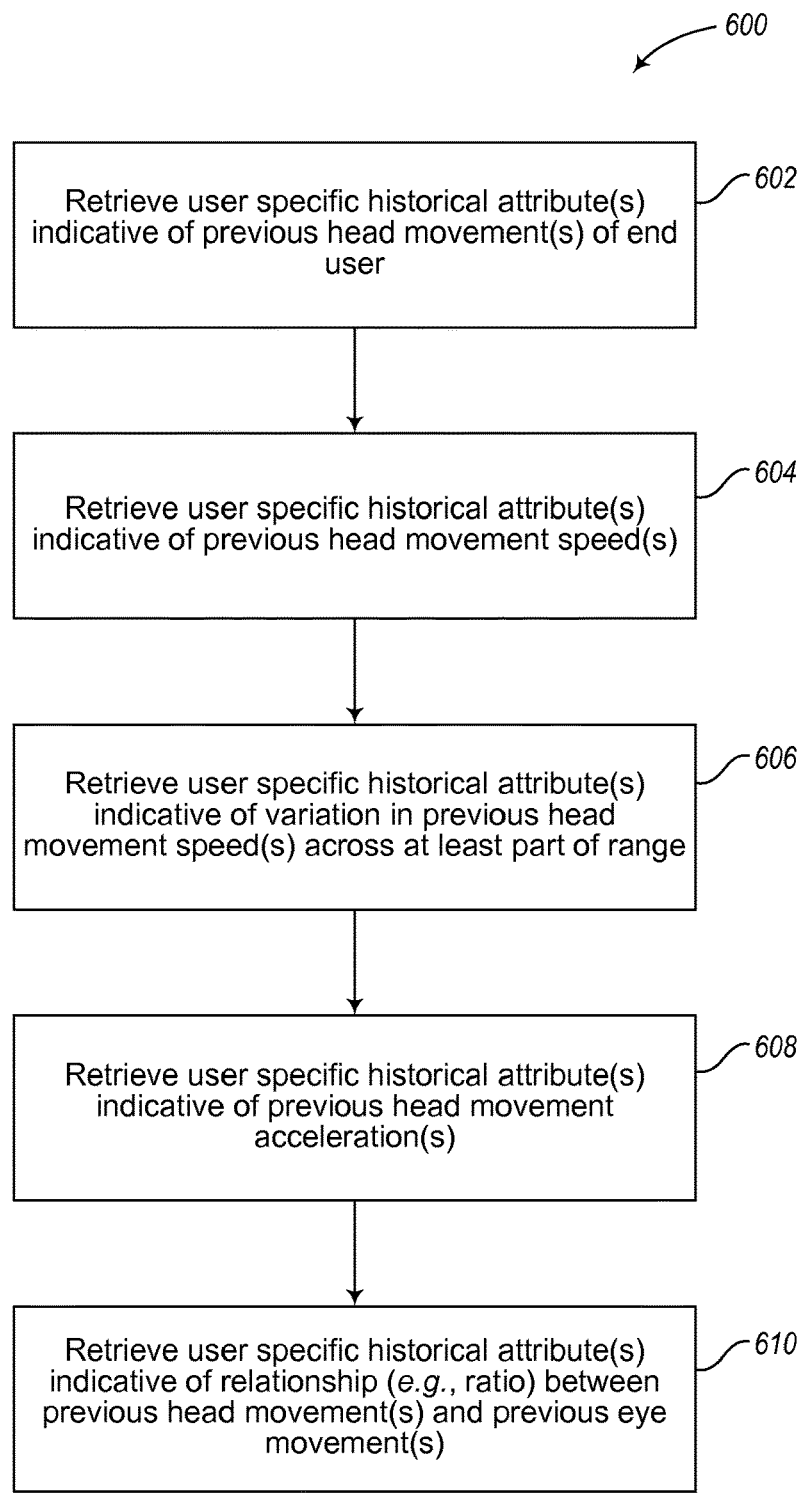
FIG. 6 illustrates an example of retrieving various historical attributes of the user

FIG. 6 shows a method 600 of operation in an augmented reality system employing predictive head tracking, according to one illustrated embodiment. The method 600 may be employed in executing act 504 of the method 500 of FIG. 5.

At 602, the augmented reality system retrieves at least one historical attribute that provides an indication of at least one head movement attribute for the end user. The head movement attribute(s) is or are indicative of at least one previous head movement of the end user. The historical attributes may be stored in nontransitory media, for example in a database or other logical construct.

At 604, the augmented reality system retrieves at least one historical attribute that provides an indication of head movement speed for at least one previous head movement for the end user.

At 606, the augmented reality system retrieves at least one historical attribute that provides an indication of variation in a head movement speed across at least part of a range of at least one previous head movement by the end user.

At 608, the augmented reality system retrieves at least one historical attribute that provides an indication of head movement acceleration for at least one previous head movement by the end user.

At 610, the augmented reality system retrieves at least one historical attribute that provides an indication of a relationship between head movement and eye movement for at least one previous head and eye movement combination by the end user. The relationship may, for example, be represented as a ratio of a head movement value representative of at least one previous head movement and a value representative of at least one previous eye movement by the end user. The values may be representative of an amount of movement the head and eyes, respectively, for example represented as an angular change. The ratio may be a ratio of historical averages of head movements and historical averages of eye movements by the end user. Additionally or alternatively, other relationships between head and eye movement may be employed, for example speed or acceleration.

Figure 7:
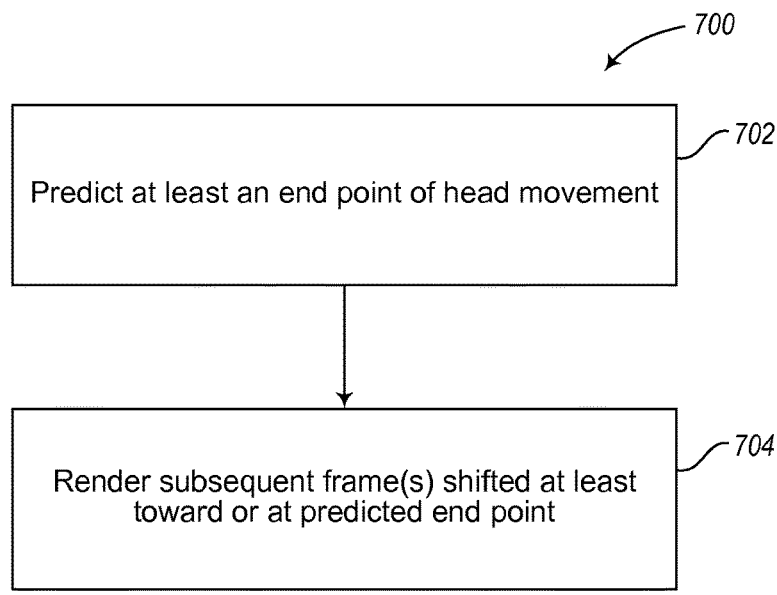
FIG. 7 illustrates an example of rendering a subsequent frame based on a predicted end point.

FIG. 7 shows a method 700 of operation in an augmented reality system employing predictive head tracking, according to one illustrated embodiment. The method 700 may be employed in executing act 506 of the method 500 of FIG. 5.

At 702, the augmented reality system predicts at least an end point of a head movement of the end user. For example, where the appearance of a virtual object is used to predict the head movement, the relative location of the particular virtual object may be used as the end point.

At 704, the augmented reality system renders at least one subsequent frame to at least one image buffer. The at least one subsequent frame is shifted at least towards, or even all the way to, the predicted end point of the head movement.

Figure 8:
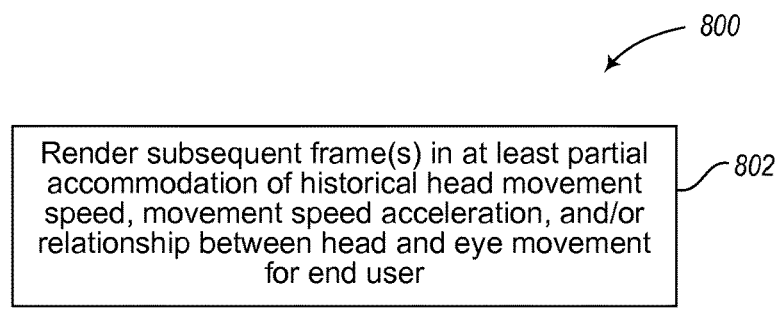
FIG. 8 illustrates another example of rendering the subsequent frame.

FIG. 8 shows a method 800 of operation in an augmented reality system employing predictive head tracking, according to one illustrated embodiment. The method 800 may be employed in executing act 704 of the method 700 of FIG. 7.

At 802, the augmented reality system renders a plurality of subsequent frames that are shift at least toward the predicted end point of the head movement in at least partial accommodation of at least one head movement attribute for the end user. The head movement attributes may be indicative of various physical traits of head movement, particularly historical physical traits of head movement of the end user. The head movement attribute(s) may, for example, include one or more of: a historical head movement speed for the end user, a historical head movement acceleration for the end user, and/or a historical relationship (e.g., ratio) between head movement and eye movement for the end user. Shifting may be implemented by rendering subsequent frames with the corresponding image shifted or a center of the corresponding image shifted relative to images corresponding to a previous frame.

Figure 9:
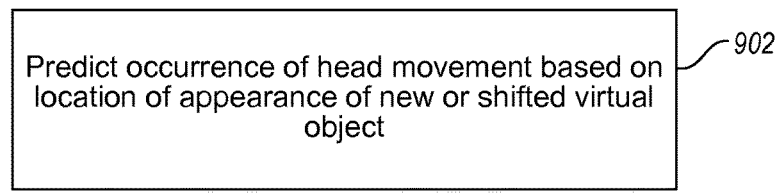
FIG. 9 illustrates an example of predicting an occurrence of head movement.

FIG. 9 shows a method 900 of operation in an augmented reality system employing predictive head tracking, according to one illustrated embodiment. The method 900 may be employed in executing act 703 of the method 700 of FIG. 7.

At 902, the augmented reality system predicts an occurrence of a head movement of the end user based at least in part on an appearance of a virtual object in the field of view of the end user.

The appearance may be an appearance of a new virtual object when newly introduced in the field of view as presented to the end user, temporally, relative to previous frames presented as images to the end user. Alternatively or additionally, the appearance may be an appearance of a virtual object in a new position in the field of view as presented to the end user, relative to a position of the virtual object as previously presented to the end user. The prediction may, for example take into account of factors. For example, the prediction may be based in part on a size or prominence of the virtual object, an amount or percentage of change in position, speed, suddenness acceleration or other change in the position of the virtual object.

Figure 10:
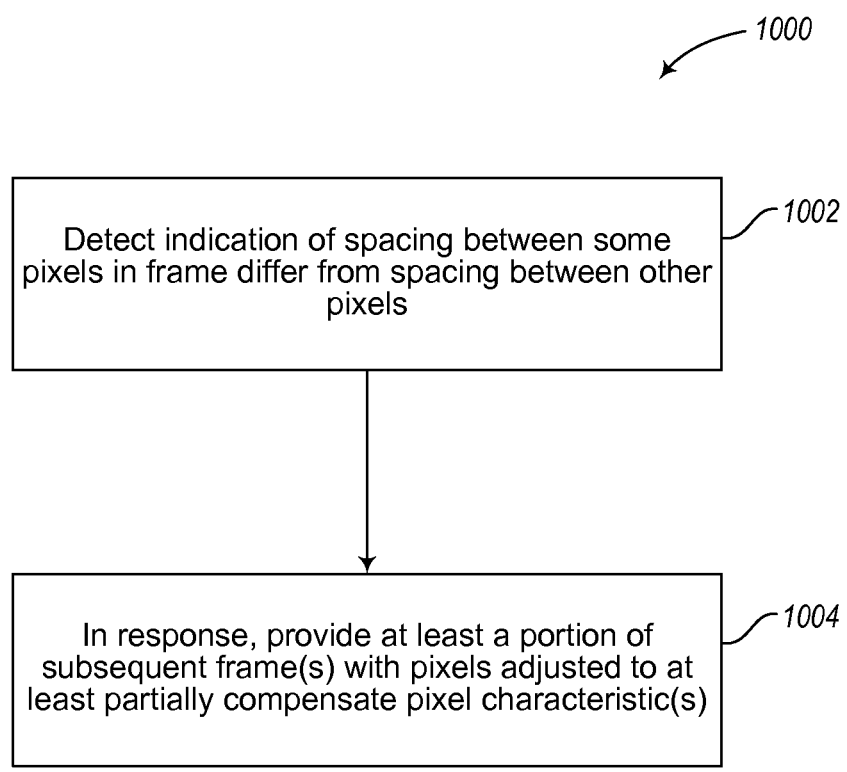
FIG. 10 illustrates an example of adjusting pixels based on head movement.

The system may also be used for dynamic control of pixel characteristics FIG. 10 shows a method 1000 of operation in an augmented reality system, according to one illustrated embodiment.

At 1002, the augmented reality system (e.g., a controller subsystem and/or processor thereof) detects an indication that spacing as presented to an end user between some pixels in a frame will differ from the spacing between other pixels in the same frame. For example, the augmented reality system may detect an indication that the spacing as presented to the end user between pixels of a first set of pixels in the frame will differ from the spacing as presented to the end user between pixels of at least a second set of pixels in the frame. For instance, where pixels of a frame are sequentially presented (e.g., read out of the frame buffer) over a period of time (e.g., "flying pixel" patterns such as raster scan pattern, spiral scan pattern, Lissajous scan pattern), rapid head movement may cause a variation in pixel spacing between different portions of an image or frame.

In response to a detection that the spacing between some pixels in the frame will differ as presented to the end user from the spacing of other pixels in the frame, the augmented reality system provides at least a portion of at least one subsequent frame with at least a first set of pixels adjusted to at least partially compensate at least one pixel characteristic, perceptible by an end user, of the pixels of the first set at 1004. Such may at least partially compensate for a difference in spacing between pixels in different portions of an image as presented to the end user.

Figure 11:
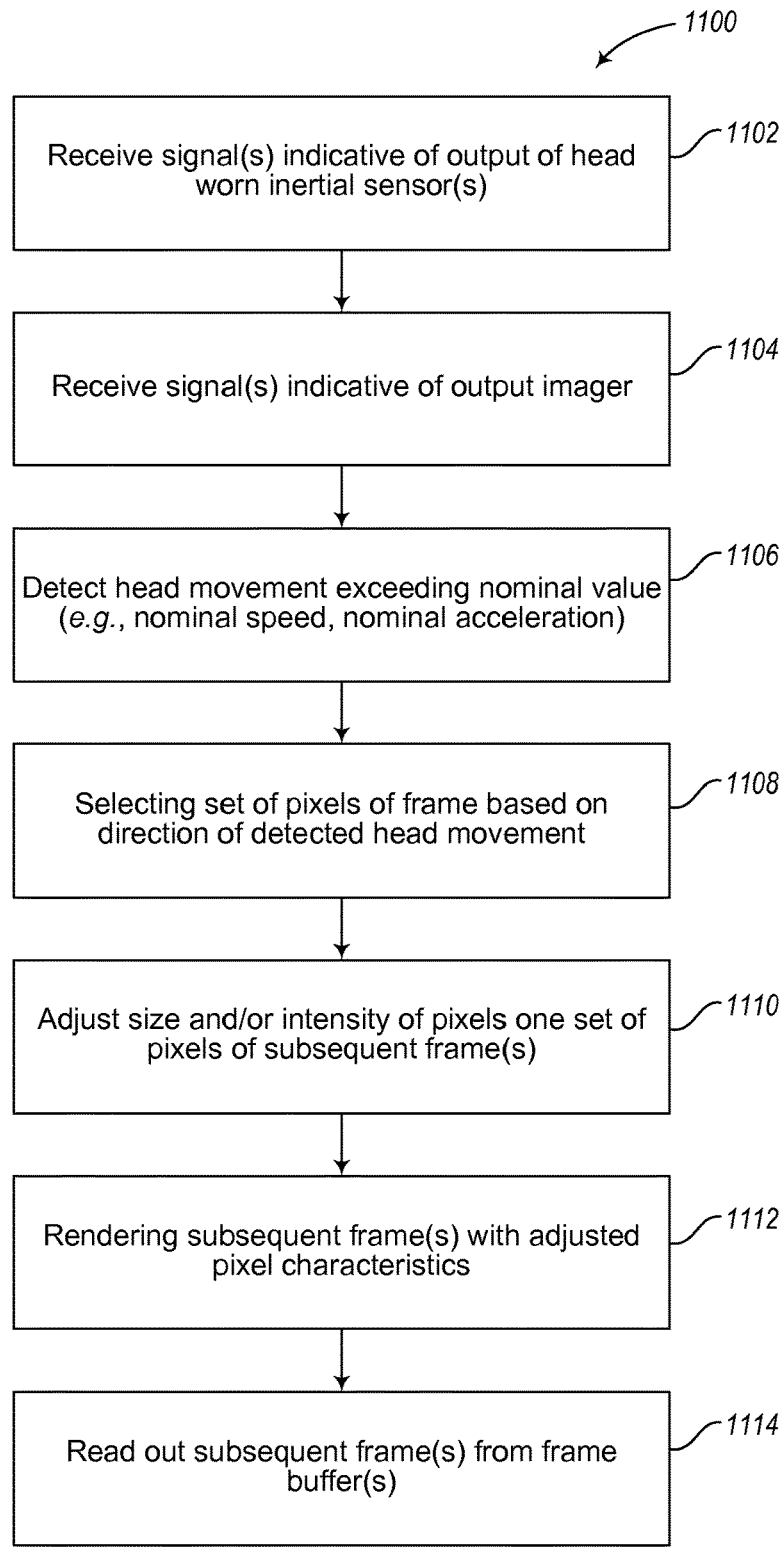
FIG. 11 illustrates an example of rendering frames with adjusted pixels.

FIG. 11 shows a method 1100 of operation in an augmented reality system, according to one illustrated embodiment. The method 1100 may be employed in executing the method 1000 of FIG. 10.

Optionally at 1102, the augmented reality system (e.g., a controller subsystem and/or processor thereof) receives signals indicative of an output of at least one head worn inertial sensor worn by the end user. The inertial sensors may take a variety of forms, for example gyroscopic sensors or acceleration sensors. Inertial sensors may be single axis or multi-axis devices. The inertial sensors may take the form of MEMS devices.

Optionally at 1104, the augmented reality system receives signals indicative of an output of at least one head worn imager worn by the end user. The imager may, for example, take the form of a digital camera or other image capture device. Such may be a forward facing camera, to capture a field of view that at least approximates a field of view of the end user.

Optionally at 1106, the augmented reality system detects a head movement exceeding a nominal head movement value. For example, the augmented reality system may detect a head movement exceeding a nominal speed and/or a nominal acceleration. The augmented reality system may employ signals from the inertial sensors to detect movement, and in particular acceleration. The augmented reality system may employ signals from the head mounted camera to detect changes in position of physical objects in the ambient environment, particularly fixed physical objects such as wall, floors, ceilings. The augmented reality system may employ any number of image processing techniques. The detected change in position allows the augmented reality system to determine a change in position of the head, speed of movement and acceleration. The augmented reality system may employ other information in addition or in place of the inertial sensor and head worn imager information. For example, the augmented reality system may employ signals from a system that monitors the ambient environment and is not worn by the user, but rather tracks the user. Such a system may employ one or more imager, for instance digital cameras, to monitor the ambient environment. The imager(s) detect movement of the end user and parts of the end user such as the head. Again, various image processing techniques may be employed. Such a system may be advantageously paired with a structured light system. Alternatively, the method may be executed independently of detected or even predicted head movement.

At 1108, the augmented reality system selects a first set of pixels of the frame, for example based on a direction of the detected head movement. The augmented reality system may additionally select the first set of pixels of the frame based on other criteria, for example a speed of the detected head movement.

At 1110, the augmented reality system adjusts at least one of a size and/or an intensity of at least some of the pixels of the first set of pixels of at least one subsequent frame. The adjustment may be designed to at least accommodate or at least partially compensate for undesired variation in the frame or image that result from the head movement.

Optionally at 1112, the augmented reality system renders the at least one subsequent frame. The rendered subsequent frame includes adjusted pixel information to at least partially accommodate or at least partially accommodate or compensate for undesired variation in the frame or image that result from the head movement.

Optionally at 1114, the augmented reality system reads out the at least one subsequent frame from at least one frame buffer that stores one or more subsequent frames. For example, the augmented reality system may selectively read out the at least one subsequent frame from at least one frame buffer. Such may take advantage of over rendering where frames are over rendered relative to the size of the image area or field of view. The system, particularly when head mounted, will in most instances be dedicated to a fixed display surface having a known area and known resolution. This is in contrast to computers and other devices which are intended to supply signals to displays of a wide variety of sizes and resolutions. Thus, the augmented reality system selectively reads into or out of the frame buffer(s) rather than reading in or reading out the entire frame from the frame buffer. Over rendering may prevent running the GPU as excessively as might otherwise be required if a new frame were rendered to create subsequent images to show those portions that are outside of a previous image. For instance, without over rendering, the augmented reality system would need to render a new frame each time the end user's head was moved. With over rendering, a dedicated set of electronics may be employed for selecting or reading out the desired portions of the over rendered frames, essentially moving a window within a previously rendered frame.

Figure 12:
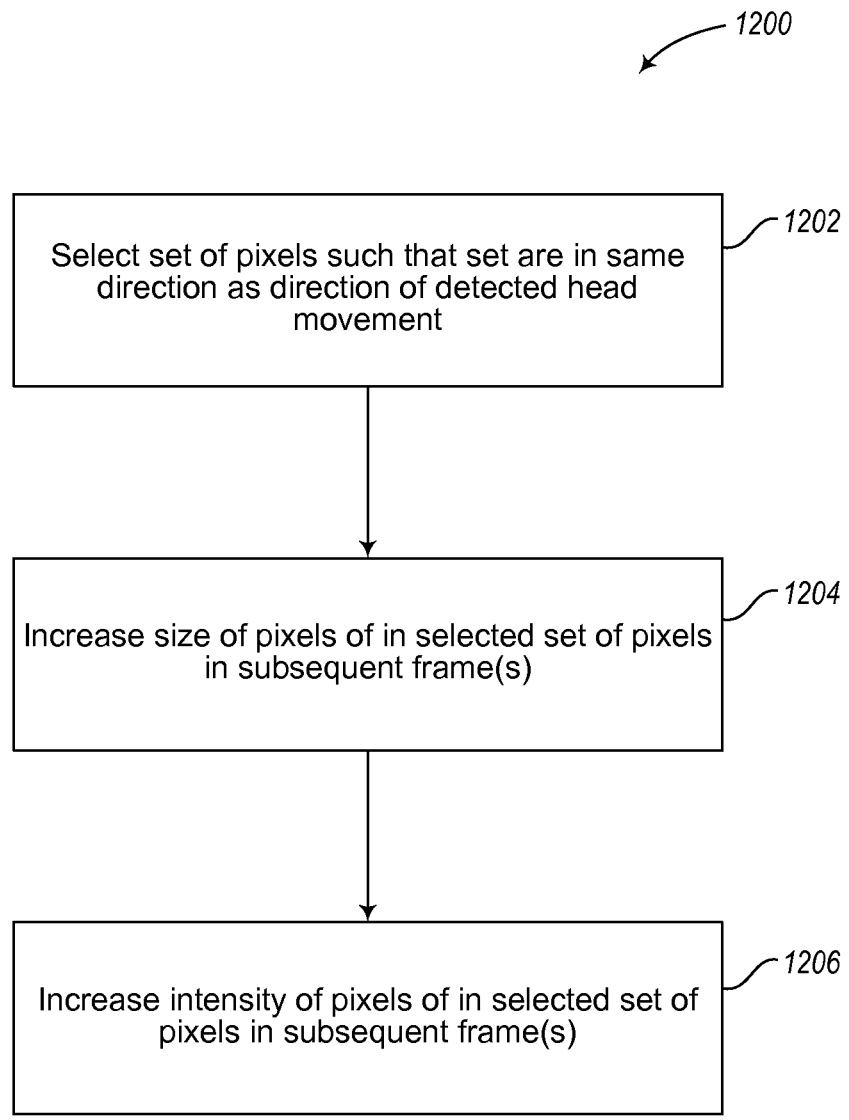
FIG. 12 illustrates an example of increasing a size and/or intensity of pixels.

FIG. 12 shows a method 1200 of operation in an augmented reality system, according to one illustrated embodiment. The method 1200 may be employed in executing acts 1108 and 1110 of the method 1100 of FIG. 11.

At 1202, the augmented reality system (e.g., a controller subsystem and/or processor thereof) selects at least a first set of pixels of the frame such that the first set of pixels are in a given direction (e.g., same direction, opposite direction) with respect to a direction of a detected head movement.

At 1202, the augmented reality system adjusts a size of pixels of the selected set(s) as presented to the user of the pixels of the first set of pixels of the at least one subsequent frame.

For example, the augmented reality system may select a first set of pixels of the frame such that the first set of pixels are positioned in a same direction as a direction of the detected head movement, relative to other pixels. For instance, the first set of pixels may be oriented relatively toward a left in an image relative to a second set of pixels oriented generally to a right in the image. For instance, the first set of pixels may be oriented relatively toward a top in an image relative to a second set of pixels oriented generally to a bottom in the image. The augmented reality system may provide one or more subsequent frames or images at 1204 where the pixels of the first set have an increased size, relative to some other pixels in the subsequent frame(s). Such can at least partially accommodate or at least partially compensate for a spreading between pixels that may result from rapid head movement which the augmented reality system cannot keep up with.

For example, the augmented reality system may select a first set of pixels of the frame such that the first set of pixels are positioned in an opposite direction from a direction of the detected head movement, relative to other pixels. The augmented reality system may provide one or more subsequent frames or images where the pixels of the first set have a decreased size, relative to some other pixels in the subsequent frame(s). Such can at least partially accommodate or at least partially compensate for a spreading between pixels that may result from rapid head movement which the augmented reality system cannot keep up with.

Adjusting (e.g., increasing, decreasing) a size of the pixels of selected set(s) may include adjusting a variable focus element. Adjusting (e.g., increasing, decreasing) a size of the pixels of selected set(s) may include adjusting a variable size source. Adjusting (e.g., increasing, decreasing) a size of the pixels of selected set(s) may include adjusting a jitter.

As a further example, the augmented reality system may select a first set of pixels of the frame such that the first set of pixels are positioned in a same direction as a direction of the detected head movement relative to other pixels. The augmented reality system may provide one or more subsequent frames or images at 1206 where the pixels of the first set have an increased intensity, relative to some other pixels in the subsequent frame(s). Such can at least partially accommodate or at least partially compensate for a spreading between pixels that may result from rapid head movement which the augmented reality system cannot keep up with.

As yet an even further example, the augmented reality system may select a first set of pixels of the frame such that the first set of pixels are positioned in an opposite direction as a direction of the detected head movement. The augmented reality system may provide one or more subsequent frames or images where the pixels of the first set have a decreased intensity, relative to some other pixels in the subsequent frame(s). Such can at least partially accommodate or at least partially compensate for a spreading between pixels that may result from rapid head movement which the augmented reality system cannot keep up with.

As noted above, the augmented reality system may adjust only the size of the selected pixels, only the intensity of the selected pixels, or both the size and intensity of selected pixels. Further, the augmented reality system may adjust intensity of some pixels, the size of other pixels, the intensity and size of yet even other pixels, and/or not adjust either the intensity or size of yet further pixels.

Figure 13:
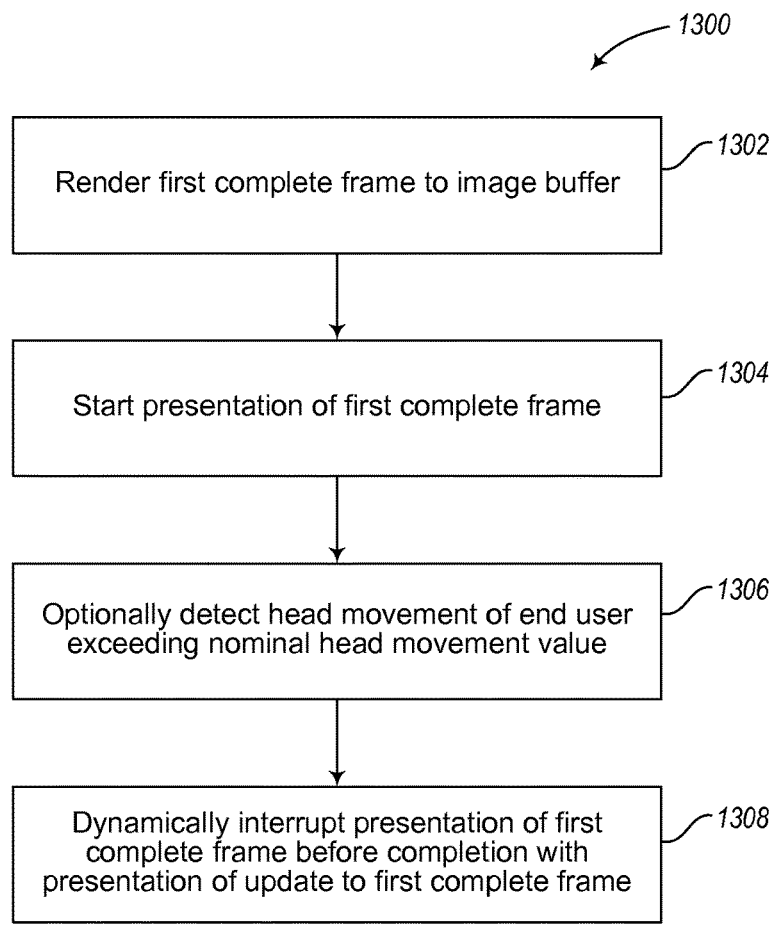
FIG. 13 illustrates an example of dynamically interrupting a presentation of a frame.

The system may also be used for dynamically updating on less than whole frame by whole frame basis, as illustrated below. FIG. 13 shows a method 1300 of operation in an augmented reality system, according to one illustrated embodiment.

At 1302, the augmented reality system (e.g., a controller subsystem and/or processor thereof) renders a first complete frame to an image buffer. The first complete frame comprises pixel information for sequential presentation of pixels to form an image of a number of virtual objects. The first complete frame may take a variety of forms suitable for various display technologies. For example, a complete frame may include pixel information suitable for forming a complete raster scan frame, which may be an interlaced raster scan frame with two fields. Each field of the interlaced raster scan may include a plurality of lines, a first field comprising the odd lines and a second field comprising the even lines. The odd and even lines may be interlaced at least as displayed to the end user. A particularly advantageous technology employs spiral scan lines. The spiral scan approach may employ a single field per frame, for instance consisting of a single spiral trace. Alternatively, the spiral scan approach may employ two or more fields per frame, for instance consisting of two or more spiral traces, presented sequentially. The spiral traces may advantageously be interlaced or nested simply by introducing a phase shift between each field of the frame. Another technology employs a Lissajous scan approach. The Lissajous scan approach may employ a single field per frame, for instance consisting of a single Lissajous trace. Alternatively, the Lissajous scan approach may employ two or more fields per frame, for instance consisting of two or more Lissajous traces, presented sequentially. The Lissajous traces may advantageously be interlaced or nested simply by introducing a phase shift between each field of the frame.

At 1304, the augmented reality system starts a presentation of the first complete frame. Such may include reading out of the frame buffer(s), for example to drive a light source(s) and end of one or more optical fibers. The reading out may include dynamically determining which portions of the frame buffer to read out.

Optionally at 1306, the augmented reality system detects a head movement of an end user exceeding a nominal head movement value. Such may employ any of the various approaches previously discussed.

At 1308, the augmented reality system dynamically interrupts the presentation of the first complete frame before completion of the presentation of the entire first complete frame. In particular, the augmented reality system starts presentation of an update to the first complete frame. At least a portion of the pixel information in the update to the complete frame has changed from the first complete frame. For example, in an interlaced raster scan based system, the augmented reality system may present all or part of a first field, replacing the second field with an update second field. Also for example, in an interlaced spiral scan based system, the augmented reality system may present all or part of a first field (e.g., a first spiral scan line or trace), replacing the second field with an update second field (e.g., an updated second spiral scan line or trace, different from the original second spiral scan or trace). Similarly, in an interlaced Lissajous scan based system, the augmented reality system may present all or part of a first field (e.g., a first Lissajous scan line or trace, i.e., a complete FIG. 8 cycle), replacing the second field with an update second field (e.g., an updated second Lissajous scan line or trace, different from the original second spiral scan or trace). While examples are given in terms of fields, such is not limited to entire fields. The presentation may be interpreted during a presentation of a field, for example during presentation of the first or second, or even a tertiary field. Presentation may be interpreted during presentation of any given line (e.g., row of a raster scan, complete cycle of a spiral or a Lissajous scan).

Figure 14:
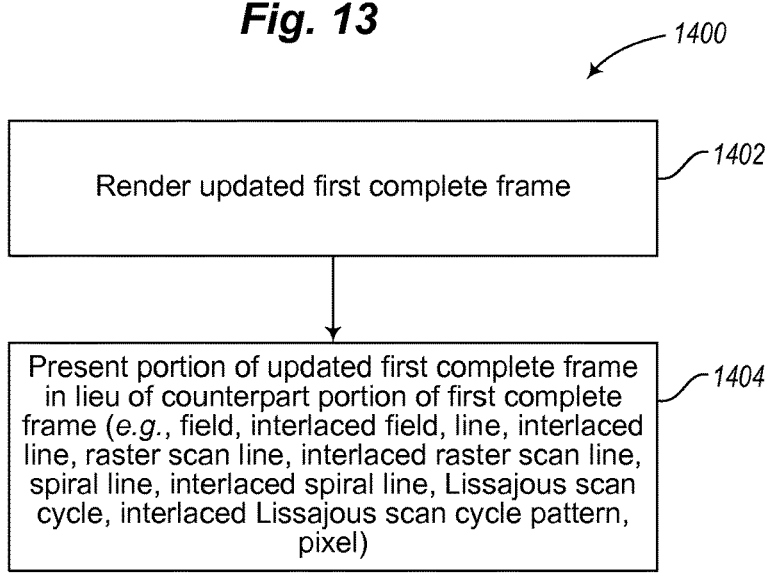
FIG. 14 illustrates an example of presenting a portion of an updated frame.

FIG. 14 shows a method 1400 of operation in an augmented reality system, according to one illustrated embodiment. The method 1400 may be employed in executing the method 1300 of FIG. 13.

At 1402, the augmented reality system (e.g., a controller subsystem and/or processor thereof) renders an updated first complete frame. The updated first complete frame includes pixel information that is different in at least one respect from the pixel information of the first complete frame.

Rendering an updated first complete frame may include rendering the update complete frame with a first field and at least a second field. The second field may be interlaced with the first field, typically by presenting sequentially following presentation of the first field. For instance, the first field may consist of even numbered lines in a raster scan while the second field consists of odd number lines. Also for example, a first field may consist of a first spiral scan line or a first Lissajous scan line, while the second field consists of a second spiral scan line or a second Lissajous scan line. Thus, rendering an updated first complete frame may include rendering the updated complete frame with a first field and at least a second field, the second field interlaced with at least the first field.

At 1404, the augmented reality system presents a portion of the updated first complete frame in lieu of a counterpart portion of the first complete frame. Thus, a portion of the updated frame is substitute for all or a portion of the first complete frame following the interruption of the original not updated first complete frame.

For example, the augmented reality system may present a second field of the updated first complete frame in lieu of a second field of the original (i.e., not updated) first complete frame. Also for example, the augmented reality system may present a second portion of a first field along with a second field of the updated first complete frame in lieu of a corresponding portion of a first field and the entire second field of the first original (i.e., not updated) first complete frame.

Also for example, the augmented reality system may present a portion (e.g., line, part of line, set of pixels, pixel) of a field of the updated first complete frame in lieu of a counterpart portion of a counterpart field of the first complete frame. For instance, the augmented reality system may present a portion of a field of the updated first complete frame of a raster scan frame in lieu of a counterpart portion of a counterpart field of the original (i.e., not updated) first complete frame of the raster scan frame.

As another example, the augmented reality system may present a line of the updated first complete frame in lieu of a counterpart line of the original (i.e., not updated) first complete frame. As yet another example, the augmented reality system may present a spiral line of the updated first complete frame in lieu of a counter spiral line of the original (i.e., not updated) first complete frame. As a further example, the augmented reality system may present a portion of a line of the updated first complete frame in lieu of a counterpart portion of a counterpart line of the original (i.e., not updated) first complete frame. As yet a further example, the augmented reality system may present at least one pixel of the updated first complete frame in lieu of a counterpart at least one pixel of the original (i.e., not updated) first complete frame. As still an additional example, the augmented reality system may present one full cycle of a Lissajous pattern scan of the updated first complete frame in lieu of a counter part one full cycle of a Lissajous pattern scan of the original (i.e., not updated) first complete frame.

Figure 15:
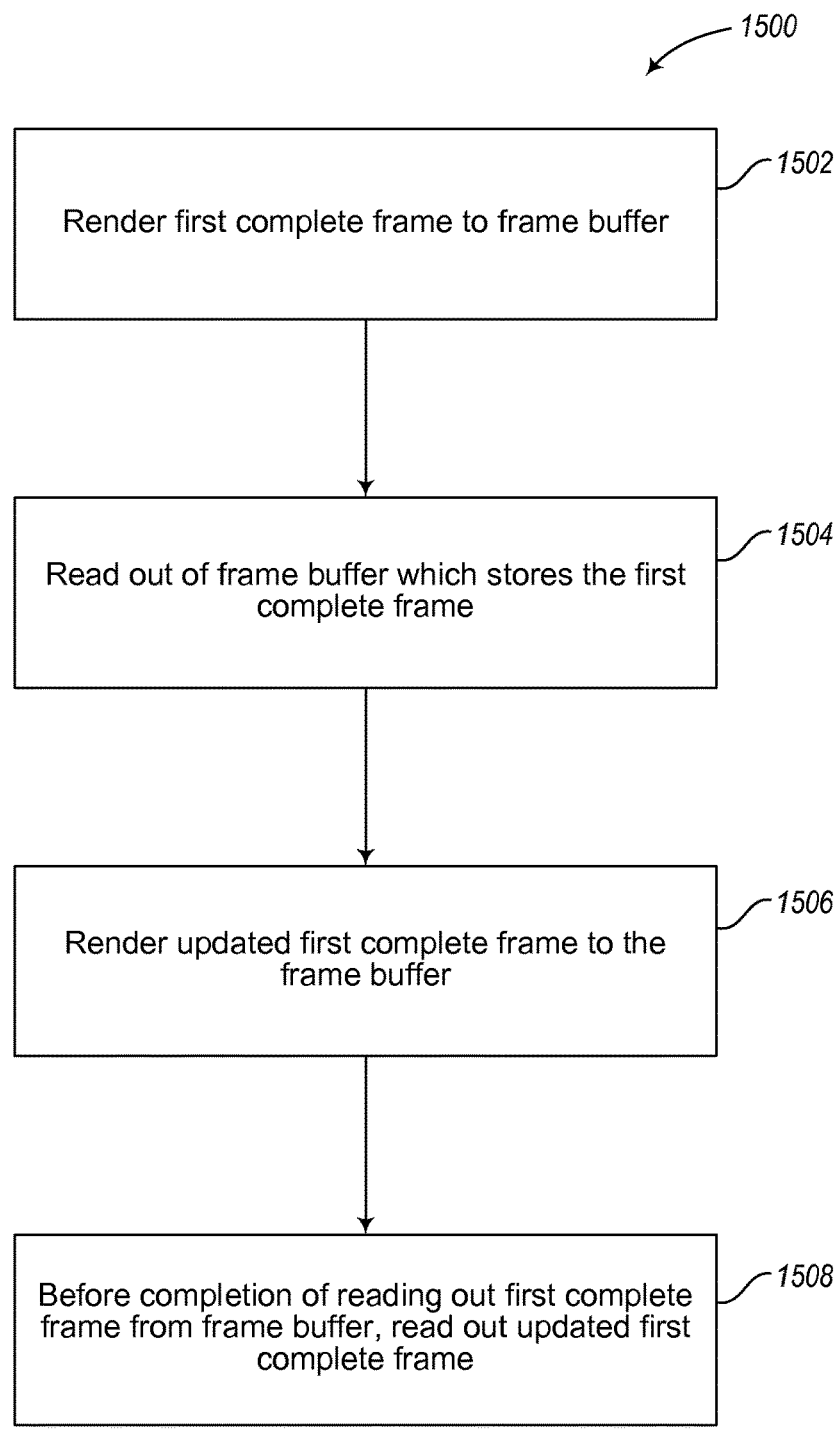
FIG. 15 illustrates an example of reading an update frame.

FIG. 15 shows a method 1500 of operation in an augmented reality system, according to one illustrated embodiment. The method 1500 may be employed in executing the method 1300 of FIG. 13.

At 1502, the augmented reality system (e.g., a controller subsystem and/or processor thereof) renders a first complete frame to a frame buffer. The first complete frame may, for example, include a first field and at least a second field. The first field may, for example, include pixel information for at least a first spiral scan line and the second field may include pixel information for at least a second spiral scan line. The scan line(s) of the second field may be interlaced with the scan line(s) of the first field. The first field may, for example, include pixel information for at least a first Lissajous scan line and the second field may include pixel information for at least a second Lissajous scan line. The scan line(s) of the second field may be interlaced with the scan line(s) of the first field. Interlacing of scan lines for both spiral and Lissajous scan patterns may be efficiently achieved with phase shifts. The number of fields or scan lines can be greater than two, for example three, four, eight, sixteen or more.

At 1504, the augmented reality system starts to read out of the frame buffer, which stores the first complete frame. The augmented reality system may drive the light sources and a yoke or other device or structure to generate an image based on the pixel data specified in the frame from the image buffer.

At 1506, the augmented reality system renders an updated first complete frame to the frame buffer. The updated first complete frame includes pixel information that specifies a frame, a portion of which has changed from the information specified by the original (i.e., not updated) first complete frame At 1508, the augmented reality system starts to read out the updated first complete frame before completion of the reading out of the first complete frame from the frame buffer, thereby interrupting presentation of the original (i.e., not updated) first complete frame. Some implementations may take advantage of having two or more frame buffers, allowing rendering to one frame buffer while a frame is being read out of the other frame buffer. Such should not be considered limiting in the various implementations of augmented reality systems may employ one, two, three or even more frame buffers.

Figure 16:
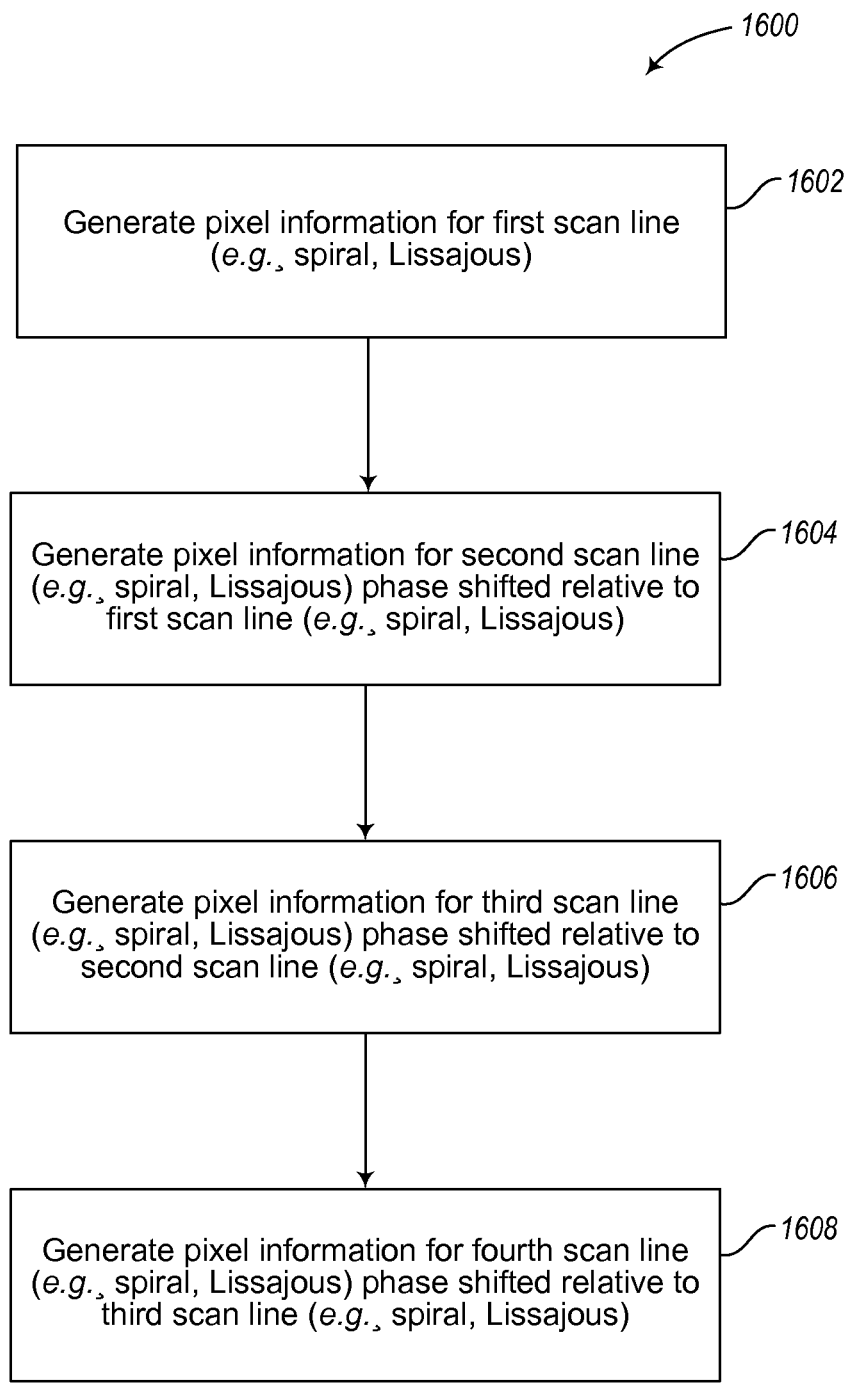
FIG. 16 illustrates an example of phase shifting.

FIG. 16 shows a method 1600 of operation in an augmented reality system, according to one illustrated embodiment. The method 1600 may be employed in executing the method 1300 of FIG. 13.

At 1602, the augmented reality system (e.g., a controller subsystem and/or processor thereof) generates pixel information for a first scan line (e.g., spiral, Lissajous).

Optionally at 1604, the augmented reality system generates pixel information for a second scan line (e.g., spiral, Lissajous) phase shifted relative to the first scan line (e.g., spiral, Lissajous). Phase shifting advantageously interfaces or nests the second scan line with the first scan line for spiral and Lissajous scan lines.

Optionally at 1606, the augmented reality system generates pixel information for a third scan line (e.g., spiral, Lissajous) phase shifted relative to the second scan line (e.g., spiral, Lissajous). Phase shifting advantageously interfaces or nests the third scan line with the first and the second scan lines for spiral and Lissajous scan lines.

Optionally at 1608, the augmented reality system generates pixel information for a fourth scan line (e.g., spiral, Lissajous) phase shifted relative to the third scan line (e.g., spiral, Lissajous). Phase shifting advantageously interfaces or nests the fourth scan line with the first, the second, and the third scan lines for spiral and Lissajous scan lines.

Figure 17:
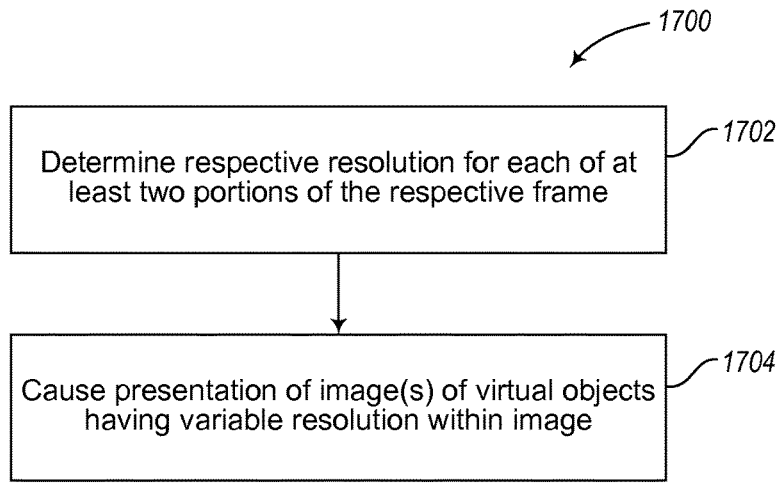
FIG. 17 illustrates an example of causing variable resolution within an image.

FIG. 17 shows a method 1700 of operation in an augmented reality system, according to one illustrated embodiment.

At 1702, for each of a plurality of frames the augmented reality system (e.g., a controller subsystem and/or processor thereof) determine a respective resolution for each of at least two portions of the respective frame. Portions may be fields, lines, other subdivision, or even individual pixels.

At 1704, the augmented reality system causes a presentation of images of virtual objects based on the plurality of frames, at least some of the images having a variable resolution within the image as presented to an end user. For example, spacing between adjacent pixels may differ from one portion to another.

Figure 18:
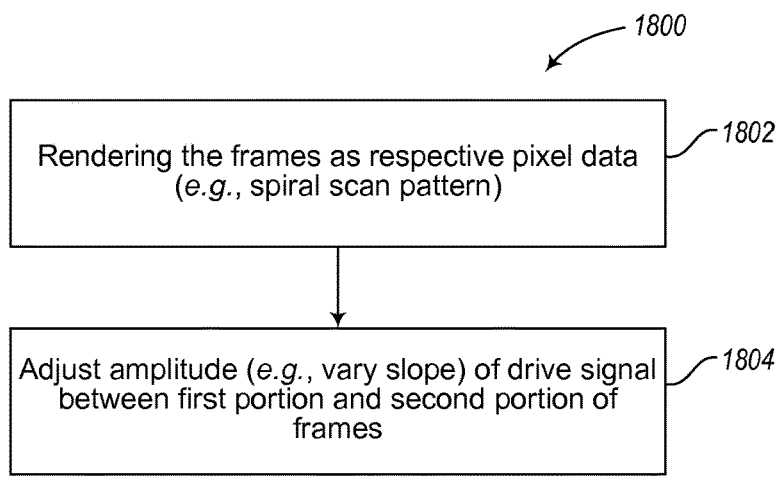
FIG. 18 illustrates an example of adjusting an amplitude of a drive signal.

FIG. 18 shows a method 1800 of operation in an augmented reality system, according to one illustrated embodiment. The method 1800 may be employed in executing the method 1700 of FIG. 17.

At 1802, the augmented reality system (e.g., a controller subsystem and/or processor thereof) render frames as respective pixel data for a spiral scan pattern.

At 1804, the augmented reality system adjusts the amplitude of a drive signal between the time of presenting a first portion of a first one of the frames and presenting a second portion of the first one of the frames. This change in amplitude results in the variable resolution in the image that corresponds to the first one of the frames. The augmented reality system may for example vary a slope or ramp of the drive signal. Such is particularly useful where used with a spiral scan pattern. For instance, a first field of a frame may have one slope or ramp which the second field has a different slope or ramp, thereby changing the effective resolution with a single frame. The higher resolution or pixel density may be employed at or proximate to locations of end user interest or attraction, while lower resolution or pixel density may be used away from such locations. Where a center or image is shifted toward a center of an end user's attraction or focus, the high resolution may appear around the center of an image, while surround portions appear at lower resolutions. Such essentially implements what can be denominated a foveated display, with steerable pixels.

Figure 19:
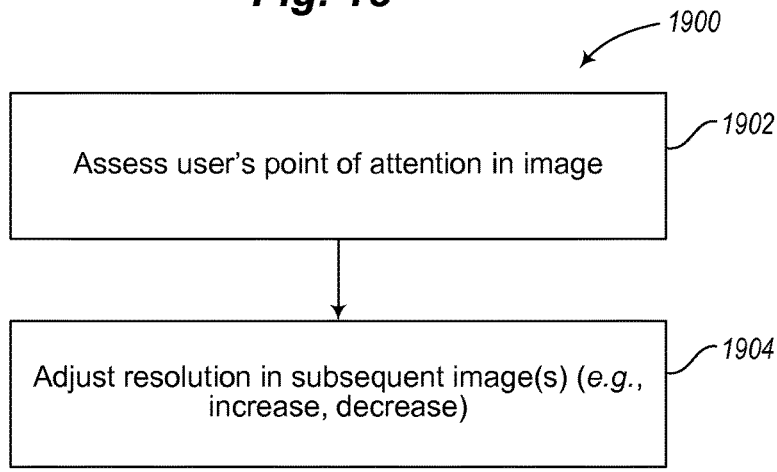
FIG. 19 illustrates an example of adjusting a resolution in a subsequent image based on the end user's point of attention.

FIG. 19 shows a method 1900 of operation in an augmented reality system, according to one illustrated embodiment. The method 1800 may be employed in conjunction or as part of executing the method 1700 of FIG. 17.

At 1902, the augmented reality system (e.g., a controller subsystem and/or processor thereof) assesses a point of attention in a least a first image for the end user. The augmented reality system may use any of the previously described techniques for assessing such. For example, determining whether and where a new virtual object will appear, or where a virtual object will move to within a field of view of the end user. Also for example, the augmented reality system may assess a relative attractiveness of the virtual objects (e.g., speed, color, size, brightness, shimmer). Such may also employ eye tracking information, indicative of a location in a field of view which the eyes of the end user are tracking or focused on.

Eye tracking information may, for example, be supplied via one or more head worn transducers, for instance head worn cameras. Such eye tracking information may, for example, be discerned by projecting light at the end user's eyes, and detecting the return or reflection of at least some of that projected light. For instance, a projection subsystem that creates or projects the images may project a pixel, dot or other element of light from the at least one optical fiber to create a glint off the end user's cornea. Eye tracking may employ, one, two, three or even more spots or dots of light. The more spots or dots of light, the more information may be discerned. The light sources (e.g., laser diodes) may be pulsed or modulated, for example in synchronization with a frame rate of a camera or image sensor. In which case, spots or dots may appear as lines as eyes move. A direction of the lines as the lines trace across a sensor may indicate a direction of the eye movement. Orientation of the lines (e.g., vertical, horizontal, diagonal) indicates orientation of the eye movement. A length of a line is indicative of speed of eye movement.

For eye tacking, the light may be modulated (e.g., temporally, intensity) to increase the signal to noise ratio. Additionally or alternatively, the light may be of a specific wavelength (e.g., near-IR), allowing such to be distinguished from background light or even the light that forms the image that the end user is watching. The light may be modulated to reduce a total amount of energy (e.g., heat) that the augmented reality system is providing to the eye(s). The glint may be returned via the same, or another, optical fiber to a sensor. The sensor may, for example take the form of a two-dimensional image sensor, for instance a CCD sensor or a CMOS sensor.

Thus, the augmented reality system may detect and track relative movements of the eyes, providing an indication of a point or location of the end user's attention or focus. The augmented reality system may logically associate a virtual object or virtual event (e.g., appearance or movement of a virtual object) with the identified point or location of the end user's attention or focus. For example, the augmented reality system may designate a virtual object that appears at or at least proximate to the point or location of the end user's attention or focus as an attractive virtual object to the end user.

At 1904, the augmented reality system adjusts (e.g., increases, decreases) resolution in at least one portion of at least one subsequent image. The augmented reality system may employ any of the various techniques described herein, as well as other techniques to adjust resolution of a portion of a subsequent page relative to other portions of the same subsequent page.

Figure 20:
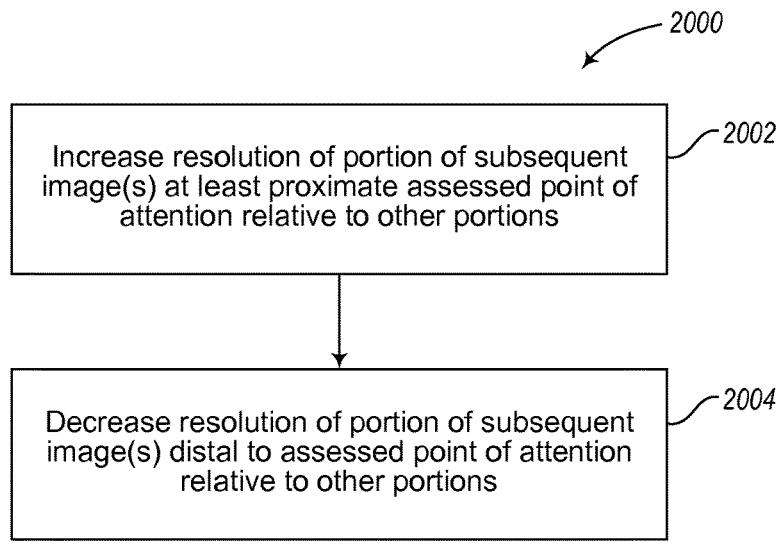
FIG. 20 illustrates another example of adjusting the resolution.

FIG. 20 shows a method 2000 of operation in an augmented reality system, according to one illustrated embodiment. The method 2000 may be employed in executing act 1904 of the method 1900 of FIG. 19.

At 2002, the augmented reality system (e.g., a controller subsystem and/or processor thereof) increases a resolution in a portion of the at least one subsequent image that is at least proximate to the assessed point of attention relative to other portions of the at least one subsequent image. As previously explained, resolution may be adjusted for spiral scan patterns by controlling a magnitude or amplitude (e.g., current, voltage) of the drive signal. The resolution may be adjusted by adjusting a slope of the drive signal. Resolution may thus be increased by increasing the amplitude of the drive signal, while the phase is left unchanged.

At 2004, the augmented reality system decreases a resolution in a portion of the at least one subsequent image that is distal to the assessed point of attention relative to other portions of the at least one subsequent image. Resolution may be decreased by decreasing the amplitude of the drive signal, while the phase is left unchanged.

In some implementations the resolution is only increased in some portions while neither increased nor decreased in other portions. In other implementations the resolution is only decreased in some portions while neither increased nor decreased in other portions. In yet still other implementations resolution is both increased in some portions while decreased in other portions.

Figure 21:
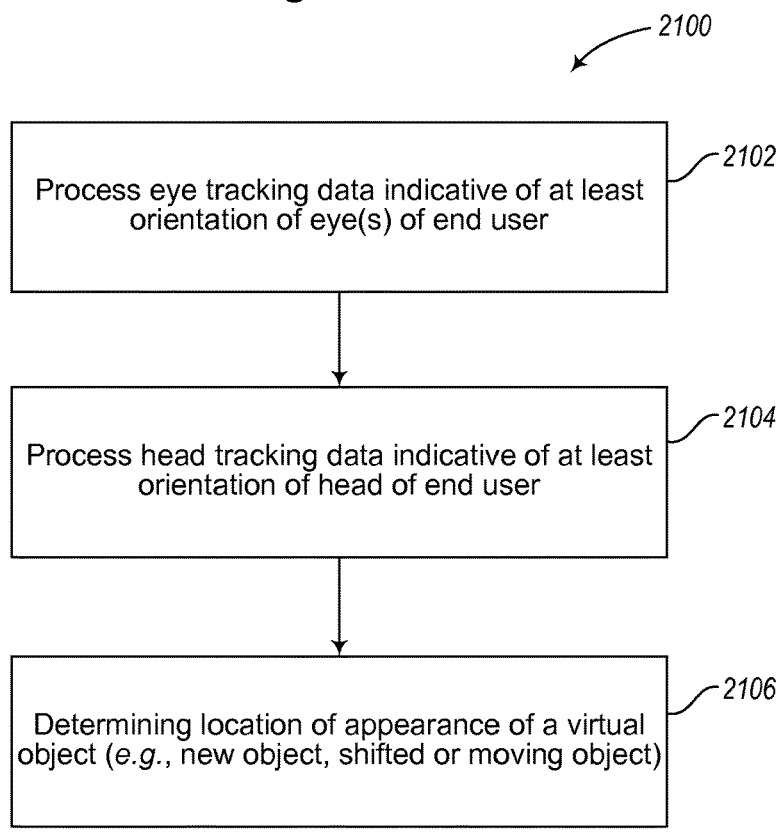
FIG. 21 illustrates an example of determining a location of appearance of a virtual object.

FIG. 21 shows a method 2100 of operation in an augmented reality system, according to one illustrated embodiment. The method 2100 may be employed in conjunction with the method 1700 of FIG. 17.

At 2102, the augmented reality system (e.g., a controller subsystem and/or processor thereof) processes eye tracking data. The eye tracking data is indicative of at least an orientation of at least one eye of the end user. The eye tracking data is supplied via at least one transducer. For example, the eye tracking data may be supplied via a head worn transducer. In some implementations, eye tracking data is collected via an optical fiber, with a transducer positioned at or proximate to a distal end thereof. For instance, the optical fiber may collect light reflected from a portion of the end user's eye(s), which may be a glint. The optical fiber may be the same optical fiber as used to create the image for display or projection to the end user.

At 2104, the augmented reality system processes head tracking data. The head tracking data is indicative of at least an orientation of a head of the end user. The head tracking data may be supplied via at least one transducer.

For example, one or more head worn or mounted transducers such as inertial sensors (e.g., gyroscopic sensors, accelerometers). Head movement tracking may be implemented using one or more head worn or head mounted light sources and at least one sensor. Head tracking may employ, one, two, three or even more spots or dots of light. The more spots or dots of light, the more information may be discerned. The light sources (e.g., laser diodes) may be pulsed or modulated, for example in synchronization with a frame rate of a camera or image sensor (e.g., front facing camera). The laser source(s) may be modulated at a frequency that is lower than the frame rate of the camera or image sensor. In which case, spots or dots may appear as lines as the head move. A direction of the lines as the lines trace across a sensor may indicate a direction of the head movement. Orientation of the lines (e.g., vertical, horizontal, diagonal) indicates orientation of the head movement. A length of a line is indicative of speed of head movement. Reflected light may also provide information regarding objects in the ambient environment, such as distance and/or geometry (e.g., planar, curved) and/or orientation (e.g., angled or perpendicular). For instance, one laser bean may produce information regarding direction and velocity (e.g., length of dash or line). A second laser beam may add information regarding depth or distance (e.g., Z-axis). A third laser beam may add information about the geometry and/or orientation of a surface in the ambient environment. Lasers or other light sources may be pulsed during head movement or during part of the head movement.

Additionally or alternatively, the head tracking data may be supplied via transducers that are not head worn. For example, a camera or imager system may image the end user, including the head of the end user, tracking movement thereof. Such may, for example, track movement relative to some external reference frame, for instance a reference frame defined by the tracking system or a room in which the tracking system is located.

At 2106, the augmented reality system determines a location of appearance of a virtual object in a field of view of the end user relative to an end user frame of reference. The appearance may be an appearance of a new virtual object, when newly introduced in a field of view of the end user. The appearance may be an appearance of a virtual object in a new position in an image relative to a position of the virtual object in at least one previous image. The augmented reality system may employ any of the numerous techniques described elsewhere herein to determine the location of appearance of the virtual object.

The system may also use blanking to improve end user perception.

Figure 22:
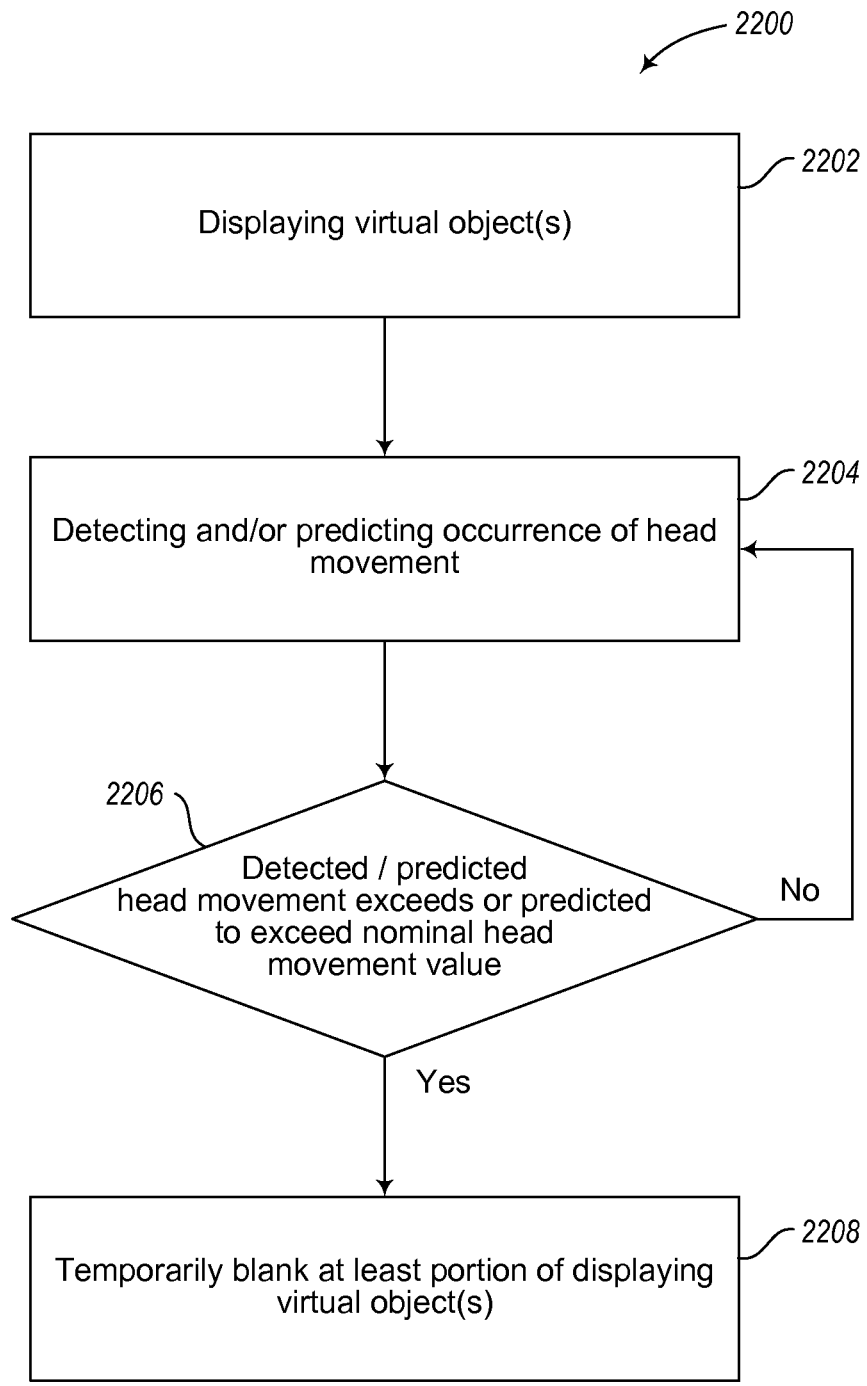
FIG. 22 illustrates an example of blanking a portion of displaying a virtual object.

FIG. 22 shows a method 2200 of operation in an augmented reality system, according to one illustrated embodiment. The method 2200 effectively employs blanking to improve end user perception experience.

At 2202, the augmented reality system (e.g., a controller subsystem and/or processor thereof) displays at least one virtual object to an end user. The augmented reality system may render frames to a frame buffer, read out the frames to drive one or more light sources and/or yoke or other system to produce an at least bi-axial movement or trace of the light.

At 2204, the augmented reality system detects and/or predicts an occurrence of a head movement of the end user. The augmented reality system may employ any of the numerous techniques described elsewhere herein to detect and/or predict an occurrence of a head movement. Without limitation, those techniques include directly sensing head movement, for example via inertial transducers or sensor, or via images from a head worn imager or an environmental imager that images an area in which the end user is present and visible. Those techniques also include indirectly predicting head movement, for instance by determining where a new virtual object will appear, where an existing virtual object will move, or where particularly attractive virtual objects are positioned in the image.

At 2206, the augmented reality system assesses whether the detected and/or the predicted head movement exceeds or is predicted to exceed a nominal head movement value. The augmented reality system may employ any of the numerous techniques described elsewhere herein to assesses whether the detected and/or the predicted head movement exceeds or is predicted to exceed a nominal head movement value. Such may include simple comparison of detected or predicted speed to a nominal speed. Such may include simple comparison of detected or predicted acceleration to a nominal acceleration. Such may include simple comparison of detected or predicted range to a nominal range. Such may include more complicated comparisons, including averages or integrations of speed, acceleration or range over multiple times during a movement. Such may even employ historical attributes or other information.

At 2208, the augmented reality system temporarily blanks at least a portion of the display of the at least one virtual object to the end user. For example, the augmented reality system may stop reading from the frame buffer. Additionally or alternatively, the augmented reality system may turn off an illumination or light source. Such may include temporarily turning off a back light of an LCD display.

Figure 23:
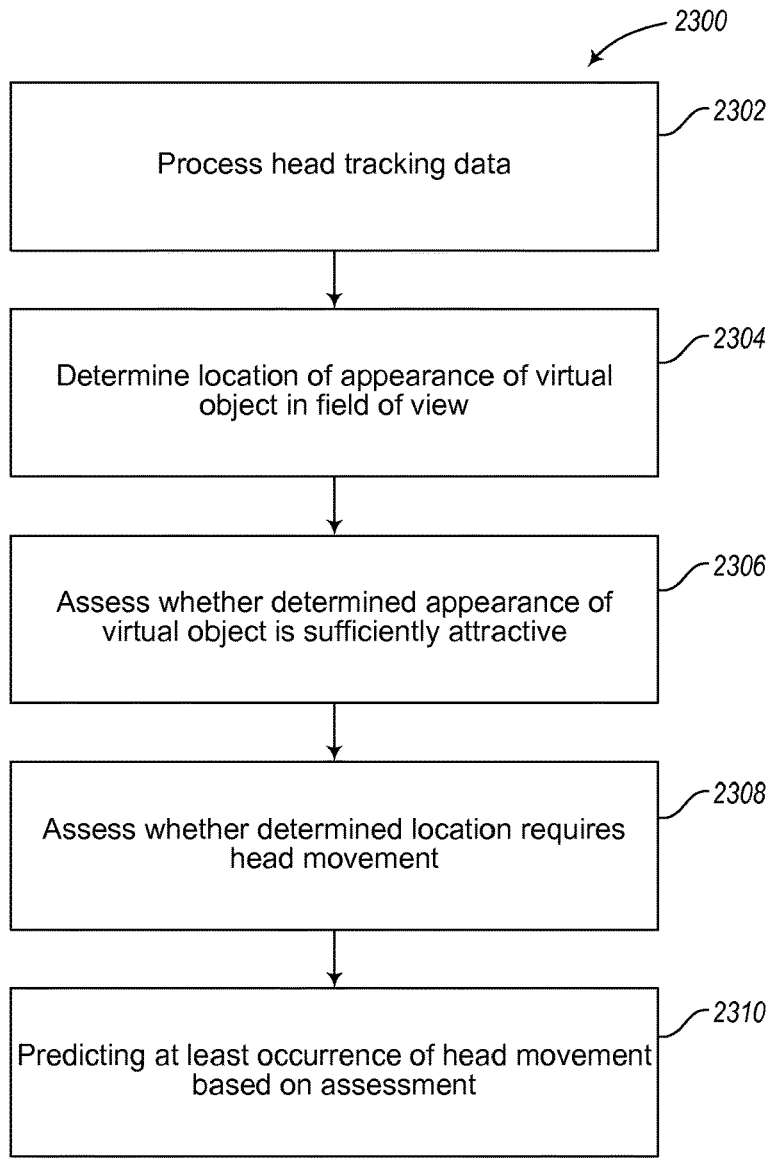
FIG. 23 illustrates an example of predicting head movement based on attractiveness of virtual object.

FIG. 23 shows a method 2300 of operation in an augmented reality system, according to one illustrated embodiment. The method 2300 may be employed in performing the method 2200 of FIG. 22.

At 2302, the augmented reality system (e.g., a controller subsystem and/or processor thereof) processes head tracking data. The head tracking data is indicative of at least an orientation of a head of the end user. The head tracking data may be supplied via at least one transducer, which may or may not be head worn by the end user. The augmented reality system may employ any of the numerous techniques described elsewhere herein to process the head tracking data.

At 2304, for each of at least some of the images presented to the end user, the augmented reality system (e.g., a controller subsystem and/or processor thereof) determines a location of appearance of a virtual object in a field of view of the end user relative to an end user frame of reference. The determining a location of appearance of a virtual object when newly introduced in a field of view of the end user. The determining a location of appearance of a virtual object in a new position in an image relative to a position of the virtual object in at least one previous image. The augmented reality system may employ any of the numerous techniques described elsewhere herein to determine a location of appearance of a virtual object.

At 2306, the augmented reality system assesses whether determined appearance of virtual object is sufficiently attractive. For example, the augmented reality system may assess a relative visual attractiveness of the virtual objects (e.g., speed, color, size, brightness, shimmer, transparency, special optical effects). Also for example, the augmented reality system may assess the relative interest attractiveness (e.g., newness, recentness, previous attention, previous identification by the end user, previous interaction with by the end user).

At 2308, the augmented reality system assesses whether the determined location requires the end user to turn the end user's head relative to a current position of the end user's head. The augmented reality system may employ a current position and/or orientation of the end user's head and a relative position and/or orientation of the virtual object. The augmented reality system may determine a distance, for example angular distance between a current focus of the end user and the position and/or orientation of the virtual object. The augmented reality system may determine whether the determined distance is within a range of eye movement, or whether the end user must also turn their head. If the end user must turn their head, the system may assess how far the end user must turn their head. For example, the augmented reality system may employ information that specifies a relationship between eye movement and head movement for the end user. Such may indicate to what extent the end user will shift their gaze via eye movements alone, before turning their heads. Notably, the relationship between eye movement and head movement may be specified for various different directions, for instance a) up to down, b) down to up, c) left to right, d) right to left, e) diagonally from lower left to upper right, f) diagonally from lower right to upper left, g) diagonally from upper left to lower right, or h) diagonally from upper right to lower left.

At 2310, the augmented reality system predicting the occurrence of the head movement based on the assessment. The augmented reality system may use one or more factors form the assessment in predicting whether head movement will occur, a direction and/or orientation of the head movement, and/or speed or acceleration of the head movement. The augmented reality system may employ historical data either end user specific or more generic to a group of end users. The augmented reality system may implement one or more machine learning algorithms to increase the accuracy of head movement prediction.

Figure 24:
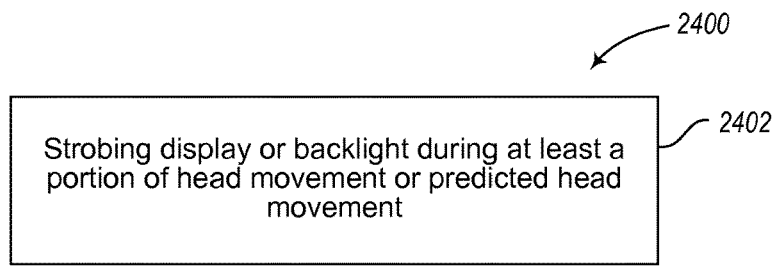
FIG. 24 illustrates an example of strobing.

FIG. 24 shows a method 2400 of operation in an augmented reality system, according to one illustrated embodiment. The method 2400 may be employed in performing act 2208 of the method 2200 of FIG. 22.

At 2402, the augmented reality system (e.g., a controller subsystem and/or processor thereof) strobes or flashes a display or a backlight of a display. The strobing or flashing occur over all or a portion of the detected head movement or predicted head movement. Such may advantageously effectively reduce the perception of inconsistencies in a frame or presentation of virtual objects. Such may also effectively increase perceived frame rate.

Figure 25:
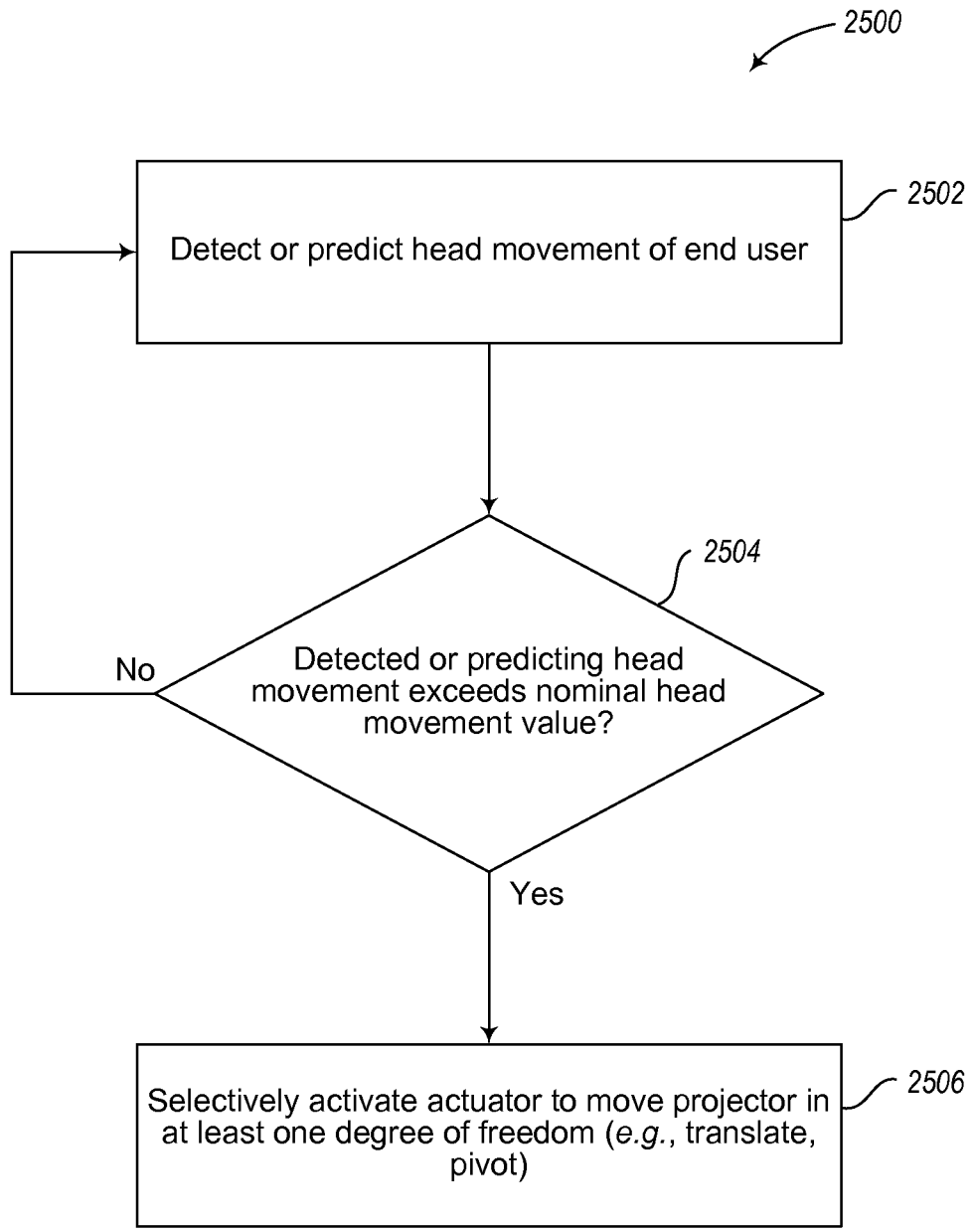
FIG. 25 illustrates an example of selectively activating an actuator to move a projector element.

FIG. 25 shows a method 2500 of operation in an augmented reality system, according to one illustrated embodiment.

At 2502, the augmented reality system (e.g., a controller subsystem and/or processor thereof) detects and/or predicts an occurrence of a head movement of an end user. For example, the augmented reality system may process head tracking data indicative of at least an orientation of a head of the end user. Additionally or alternatively, the augmented reality system may determining a location of appearance of a virtual object in a field of view of the end user relative to an end user frame of reference, assess whether the determined location requires the end user to turn a head of the end user, and predict an occurrence of the head movement based on the assessment. The augmented reality system may employ any of the numerous techniques described elsewhere herein to detect and/or predict an occurrence of a head movement.

At 2504, the augmented reality system determines whether the detected or the predicted head movement exceeds a nominal head movement value. The augmented reality system may employ any of the numerous techniques described elsewhere herein to determine whether the detected or the predicted head movement exceeds a nominal head movement value.

At 2506, in response to determining that the detected or the predicting head movement exceeding the nominal head movement value, the augmented reality system selectively activates an actuator to move the projector in at least one degree of freedom. Moving the projector may include translating the first optical fiber along at least one axis. Moving the projector may include pivoting the first optical fiber about at least one axis.

Figure 26:
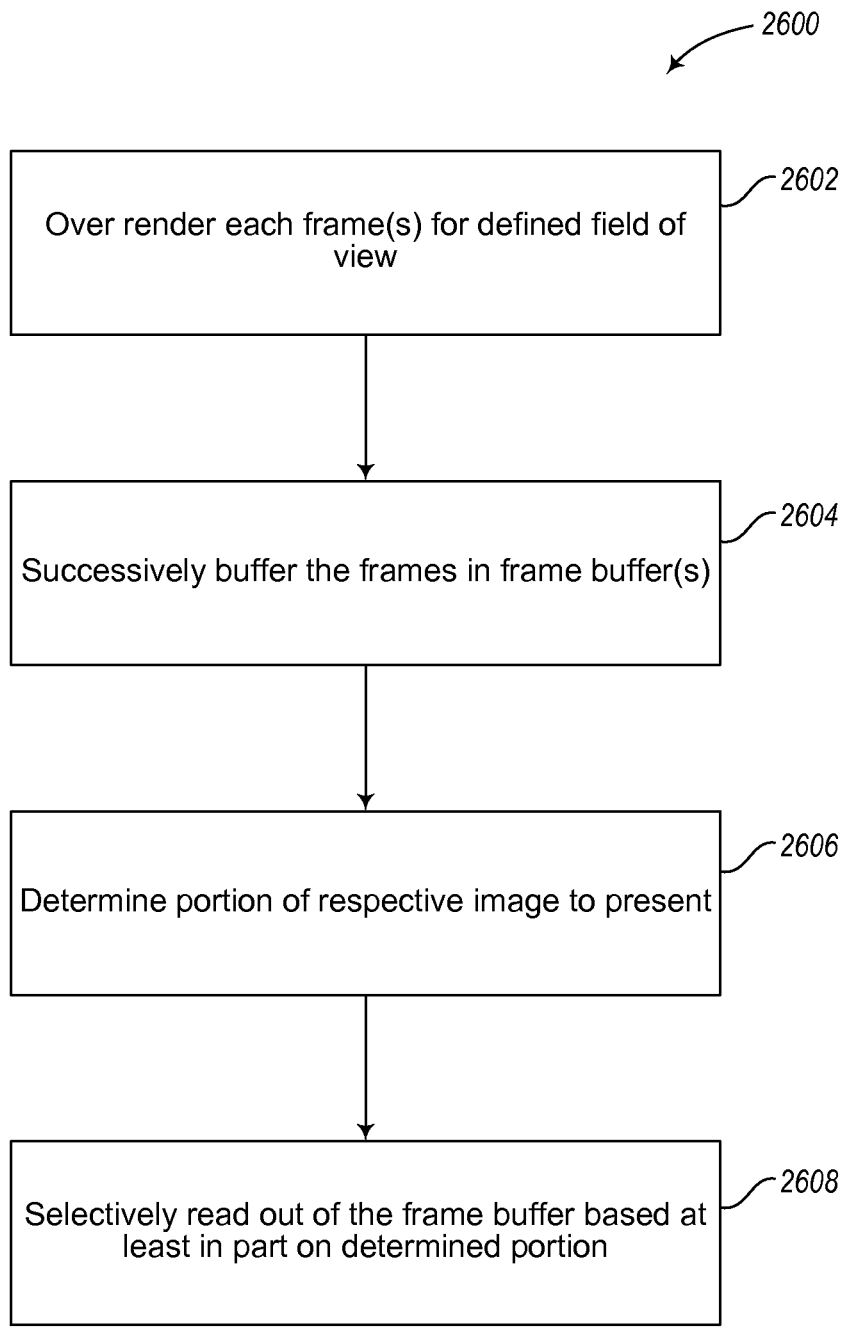
FIG. 26 illustrates an example of selectively reading out portions of a frame.

FIG. 26 shows a method 2600 of operation in an augmented reality system, according to one illustrated embodiment.

The augmented reality system may over render frames, producing frames that are much larger than need for a maximum area and maximum resolution of a given display technology. For example, in a head worn or mounted augmented reality system the area available for display or projection may be set by the various parameters of the equipment. Likewise, while the augmented reality system may be capable of operating at multiple distinct resolutions, the equipment will set an upper end or maximum resolution. An over rendered frame includes pixel information for a set of pixels that exceeds the maximum area of display at the maximum resolution. Such may advantageously allow the augmented reality system to read out only portions of frames (e.g., a portion of each field of the frame, if not interrupted). Such may allow the augmented reality system to shift an image presented to the user.

At 2602, the augmented reality system (e.g., a controller subsystem and/or processor thereof) over renders each of a plurality of frames for a defined field of view. Such requires generating more pixel information that would otherwise be required for the maximum area at maximum resolution. For example, the area of the frame may be increase by a percentage of the maximum area, for example increasing the pixel information in either a horizontal, vertical or diagonal direction defined by the frame. The larger the frame size the more freedom the augmented reality system will have to shift the boundaries of the images presented to the user.

At 2604, the augmented reality system successively buffers the over rendered frames in at least one frame buffer. The augmented reality system may employ a frame buffer that is larger than the frame size required for the maximum display size at maximum resolution. Some implementations employ multiple frame buffers. Such may facilitate interruption of presentation for frames, as described elsewhere herein.

At 2606, the augmented reality system determines a portion of a respective image to present. The augmented reality system may determine the portion based on any of a variety of factors. For example, the factors may be indicative of a location in an image or scene at which the end user is paying attention to, focusing on or has otherwise attracted the attention of the end user. Again various techniques may be employed, including but not limited to eye tracking. Also for example, the factors may be indicative of a location in an image or scene at which the end user is predicted to pay attention to, focus on or will otherwise attract the attention of the end user. Again various techniques may be employed including but not limited to identifying newly appearing virtual objects, fast or rapidly moving virtual objects, virtual objects that are visually attractive, virtual objects that have been previously designated (e.g., designated by the end user or by previously tracking the end user's interaction) and/or virtual objects that are attractive of attention based on the inherent nature of the vertical virtual object. Virtual objects that are attractive of attention based on the inherent nature of the virtual object may, for example, include a virtual object that visually represents an object or item of concern or suspense to either generalized end users or a specific end user (e.g., imminent threats).

At 2608, the augmented reality system selectively reads out of the portion of the over rendered frame from the frame buffer. The portion is based at least in part on the determined portion of the respective image to present. For example, the portion that is read out may have a center that is shifted to be proximate, or even match or co-align, with the identified location. The identified location may, for example, be a location in a previous image or frame that has attracted an end user's attention. The identified location may, for example, be a location in a subsequent frame which the augmented reality system has predicted will attract the end user's attention.

Figure 27:
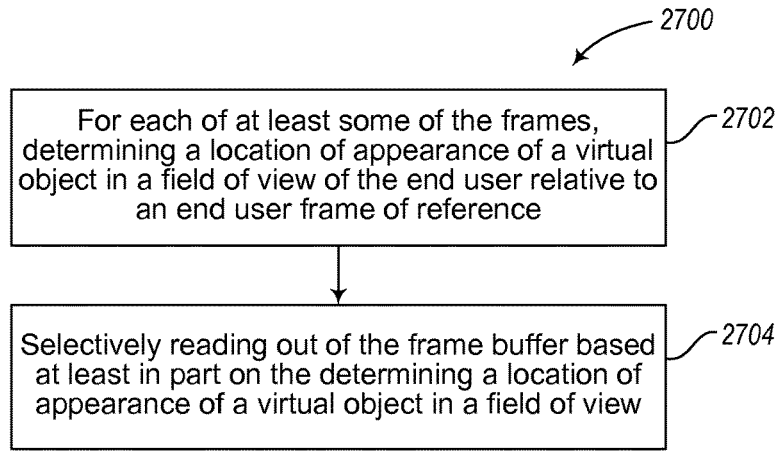
FIG. 27 illustrates an example of selectively reading out portions based on a determined location of a virtual object.

FIG. 27 shows a method 2700 of operation in an augmented reality system, according to one illustrated embodiment. The method 2700 may be employed in performing the method 2600 of FIG. 26. For instance, the method 2700 may be used to predict a location in a subsequent frame or image which will attract the end user's attention.

At 2702, for each of at least some of the frames the augmented reality system (e.g., a controller subsystem and/or processor thereof) determines a location of appearance of a virtual object in a field of view of the end user relative to an end user frame of reference.

At 2704, the augmented reality system selectively reads out of the frame buffer based at least in part on the determining a location of appearance of a virtual object in a field of view. For example, the portion that is read out may have a center that is shifted to be proximate, or even match or co-align, with the identified location. Alternative, the boundaries of the portion that is read out may be shifted to encompass the determined location an immediately surrounding areas, in two- or even three-dimensions. For example, the augmented reality system may select a portion (e.g., 80%) of the entire over rendered frame to be read out of the frame buffer for presentation to the end user. The augmented reality system may select that portion such that the boundaries are shifted relative to a current location of the end user's attention, for instance in images currently being presented to the end user. The augmented reality system may select the boundaries based on a combination of the current location and the predicted location, while setting the boundary such that both locations will be presented to the end user in the subsequently presented image(s).

Figure 28:
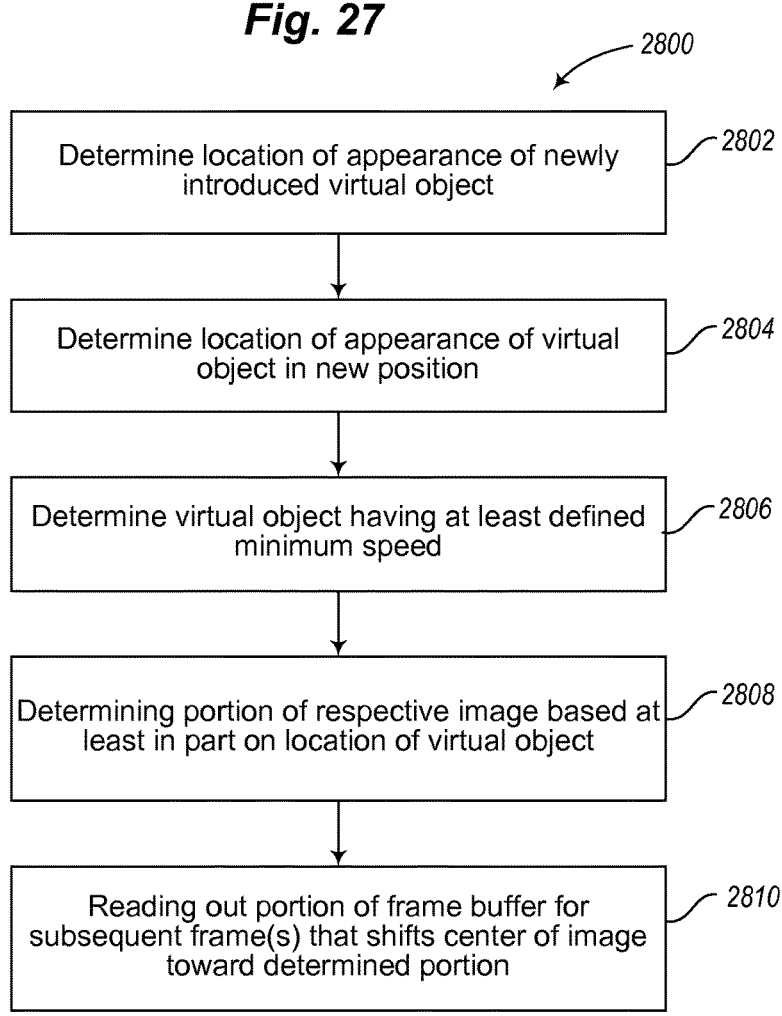
FIG. 28 illustrates another example of selectively reading out portions.

FIG. 28 shows a method 2800 of operation in an augmented reality system, according to one illustrated embodiment. The method 2800 may be employed in performing the method 2600 of FIG. 26. For example, the method 2800 may be employed to determine a location in an image that has attracted or is predicted to attract the attention of the end user.

At 2802, the augmented reality system (e.g., a controller subsystem and/or processor thereof) determines the location of appearance of a new virtual object, when the new virtual is newly introduced in the field of view of the end user. The augmented reality system may employ any of the various techniques described herein to identify the introduction of a virtual object, which is new relative to immediately previous frames or images presented to the end user. Thus, even if a virtual object has previously been presented to the end user at some other portion of a presentation, the virtual object may be identified as newly introduced if a sufficient number of intervening images have been presented to make the reintroduction of the virtual object attract the attention of the end user.

At 2804, the augmented reality system determines the location of appearance of the virtual object in a new position in the frame relative to a position in at least one previous frame. The augmented reality system may employ any of the various techniques described herein to identify the moving of a virtual object to a new or different position in a number of images, which is move relative to immediately previous frames or images presented to the end user. Thus, even if a virtual object has previously been presented to the end user at that some location in some other portion of a presentation, the virtual object may be identified as moved or moving if a sufficient number of intervening images have been presented to make the reappearance of the virtual object at the previous location attract the attention of the end user.

At 2806, the augmented reality system determines a location of a virtual object having at least a defined minimum speed in a field of view of the end user. The augmented reality system may employ any of the various techniques described herein to determine speed of movement of a virtual object from image to image and to compare that speed to a defined or nominal speed. The determined speed may be relative to a fixed reference frame in the image or relative to other virtual objects and/or physical objects that appear in the image.

At 2808, the augmented reality system determines a portion of a respective image to present based at least in part on a location of the virtual object in an image. The augmented reality system may employ any of the various techniques described herein to determine the portion of a respective image to present. The determination may be based on any of a variety of factors. The factors may, for example, include factors or data that is indicative of a location in an image or scene at which the end user is paying attention to, focusing on or has otherwise attracted the attention of the end user. The factors may, for example, include factors or data that is indicative of a location in an image or scene at which the end user is predicted to pay attention to, focus on or will otherwise attract the attention of the end user. The augmented reality system may employ any of the various techniques described elsewhere herein for identifying locations that have attracted the end user's attention, whether via actual detection or via prediction.

At 2810, the augmented reality system reads out a portion of the frame buffer for at least one subsequent frame. The portion that is read out shifts a center of the image at least toward the determined portion of the respective image that will be presented. The augmented reality system may employ any of the various techniques described herein to read out of the frame buffer a portion of a frame that shifts the center or boundaries of the image based on the location of an end user's actual or predicted center of attention.

Figure 29:
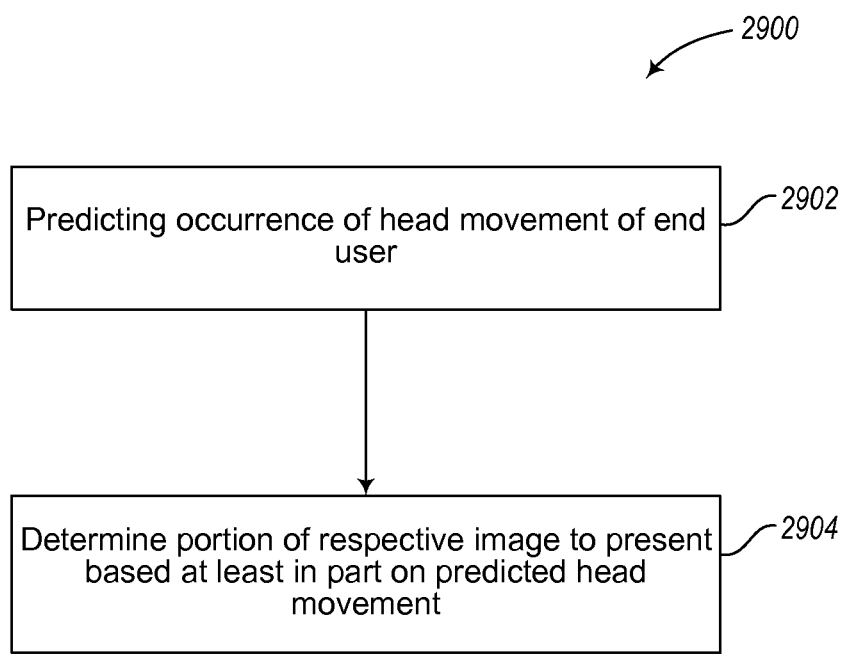
FIG. 29 illustrates an example of determining a portion of an image to present to the end user.

FIG. 29 shows a method 2900 of operation in an augmented reality system, according to one illustrated embodiment. The method 2900 may be employed in performing the method 2600 of FIG. 26. In particular, the method 2900 may be employed to determine a which portion of a frame to read out based on a predicted head movement of the end user.

At 2902, the augmented reality system (e.g., a controller subsystem and/or processor thereof) predicts an occurrence of a head movement of the end user. The augmented reality system may employ any of the various techniques described herein to predict head movement. Such techniques include, but are not limited to, detecting the appearance in images of a new virtual object, a moving virtual object, a virtual objecting moving rapidly, a previously selected virtual object and/or a visually attractive virtual object.

At 2904, the augmented reality system determines a portion of a respective frame or image to present based at least in part on the predicted head movement. The augmented reality system may employ any of the various techniques described herein to determine the portion of the frame to be used. For example, the augmented reality system may select the portion such that the boundaries encompass the location of a predicted end point of the predicted head movement. Where the head movement prediction is predicated on the appearance of a virtual object (e.g., newly introduced, moving, attractive appearance, previously selected by end user), the end point may be coincident with the location of that virtual object in a subsequent frame or image.

Figure 30:
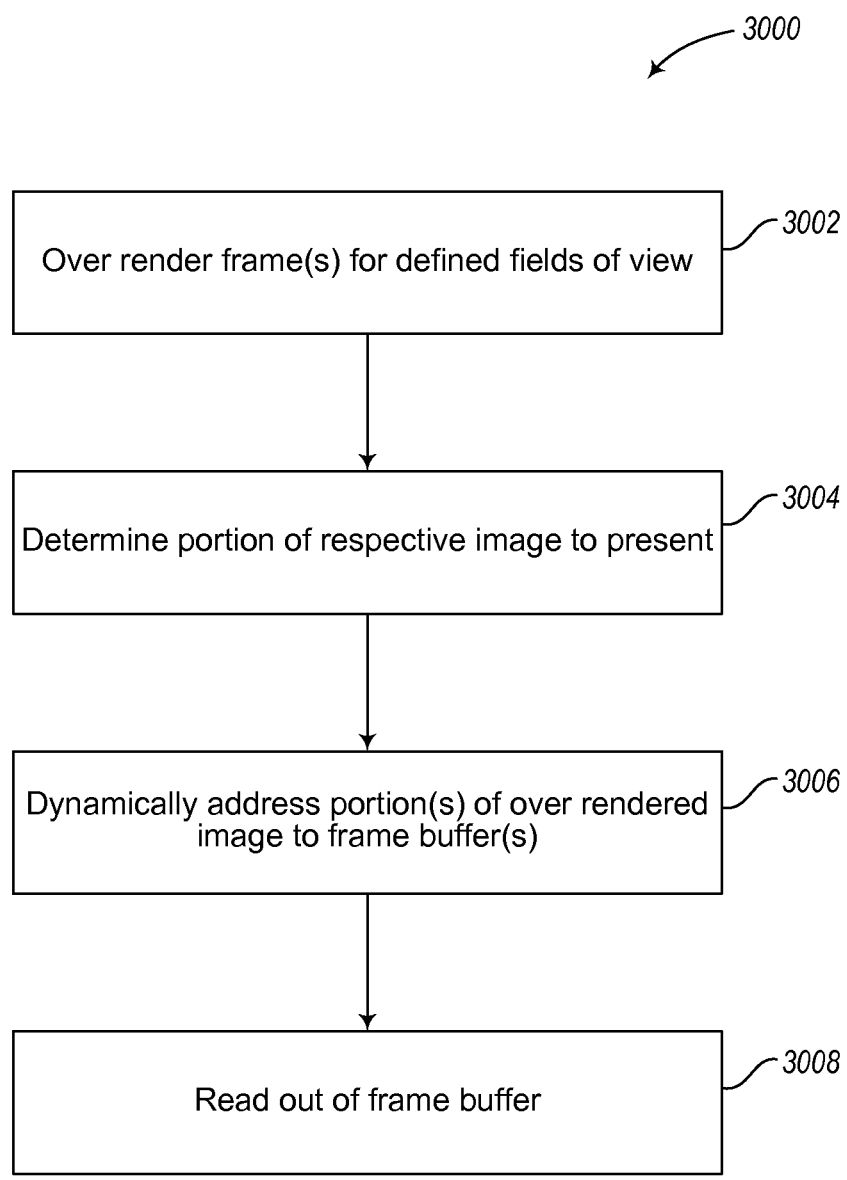
FIG. 30 illustrates an example of dynamically addressing a portion of an over-rendered frame.

FIG. 30 shows a method 3000 of operation in an augmented reality system, according to one illustrated embodiment.

The augmented reality system may over render frames, producing frames that are much larger than need for a maximum area and maximum resolution of a given display technology. For example, in a head worn or mounted augmented reality system the area available for display or projection may be set by the various parameters of the equipment. Likewise, while the augmented reality system may be capable of operating at multiple distinct resolutions, the equipment will set an upper end or maximum resolution. An over rendered frame includes pixel information for a set of pixels that exceeds the maximum area of display at the maximum resolution. Such may advantageously allow the augmented reality system to read out only portions of frames (e.g., a portion of each field of the frame, if not interrupted). Such may allow the augmented reality system to shift an image presented to the user.

At 3002, the augmented reality system (e.g., a controller subsystem and/or processor thereof) over renders each of a plurality of frames for a defined field of view. Such requires generating more pixel information that would otherwise be required for the maximum area at maximum resolution. For example, the area of the frame may be increase by a percentage of the maximum area, for example increasing the pixel information in either a horizontal, vertical or diagonal direction defined by the frame. The larger the frame size the more freedom the augmented reality system will have to shift the boundaries of the images presented to the user.

At 3004, the augmented reality system determines a portion of a respective image to present. The augmented reality system may determine the portion based on any of a variety of factors. For example, the factors may be indicative of a location in an image or scene at which the end user is paying attention to, focusing on or has otherwise attracted the attention of the end user. Again various techniques may be employed, including but not limited to eye tracking. Also for example, the factors may be indicative of a location in an image or scene at which the end user is predicted to pay attention to, focus on or will otherwise attract the attention of the end user. Again various techniques may be employed including but not limited to identifying newly appearing virtual objects, fast or rapidly moving virtual objects, virtual objects that are visually attractive, virtual objects that have been previously designated (e.g., designated by the end user or by previously tracking the end user's interaction) and/or virtual objects that are attractive of attention based on the inherent nature of the virtual object. Virtual objects that are attractive of attention based on the inherent nature of the virtual object may, for example, include a virtual object that visually represents an object or item of concern or suspense to either generalized end users or a specific end user (e.g., imminent threats).

At 3006, the augmented reality system dynamically addresses one or more determined portions of the over rendered frame into the buffer(s). The determined portion(s) may, for example, have a center that is shifted to be proximate, or even match or co-align, with an identified location of an end user's attraction, interest or focus. The identified location may, for example, be a location in a previous image or frame that has attracted an end user's attention. The identified location may, for example, be a location in a subsequent frame which the augmented reality system has predicted will attract the end user's attention. Some implementations employ multiple frame buffers. Such may facilitate interruption of presentation for frames, as described elsewhere herein.

At 3008, the augmented reality system reads out of the determined portion(s) of the over rendered frame from the frame buffer.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method of operation in a virtual image presentation system, the method comprising:
    detecting, at one or more sensors of a head-mount virtual or augmented image presentation system, an indication that indicates a first resolution in a first portion of a frame in a sequence of frames will differ from a second resolution in a second portion of the frame, wherein
        the first resolution corresponds to a first spacing between first adjacent pixels in a first set of pixels in the first portion, and the second resolution corresponds to a second spacing between second adjacent pixels in the second set of pixels in the second portion;

selecting the first set of pixels of the frame for which the first spacing is to be modified based in part or in whole upon a directional characteristic pertaining to the indication, wherein the first set of pixels of the frame is selected based in part or in whole on a direction of head movement of a user detected by one or more transducers, and a direction of the first set of pixels is the same as the direction of the head movement;

adjusting, based at least in part on the indication, a resolution represented by the first set of pixels in the first portion to generate the first resolution represented by an adjusted first set of pixels in the first portion at least by modifying, at one or more modulation subsystems in the virtual image presentation system, respective radial characteristics of a drive signal that drives pixels in the first set of pixels into respective modified radial characteristics of a modified drive signal for a subsequent frame after the frame in the sequence of frames, without affecting a number of coils or loops of the scan pattern; and presenting the subsequent frame including one or more virtual objects to a user using at least the scan pattern at least by starting a presentation of the frame, interrupting the presentation before completion of the presentation, increasing an intensity of the first set of pixels for the subsequent frame in response to the head movement, and replacing the first set of pixels that represents the first portion with the adjusted first set of pixels to at least render the first portion with the first resolution and the second portion in the frame with the second resolution.

2. The method of claim 1, further comprising:
adjusting a set of pixel characteristics that includes at least one of a perceived size or a perceived intensity;
adjusting one or more pixel characteristics that are perceptible to the user; and
detecting a head movement exceeding a nominal head movement value.

3. The method of claim 1, further comprising:
selecting the first set of pixels of the frame based on the direction of a detected head movement, wherein the direction of the first set of pixels is the same as the direction of the detected head movement; and
increasing a size of the first set of pixels of the subsequent frame.

4. The method of claim 1, further comprising adjusting a variable focus element of the first set of pixels or adjusting a variable size source of the first set of pixels.

5. The method of claim 1, the angular characteristics of the scan pattern comprising a number of coils or loops in the scan pattern.

6. The method of claim 1, further comprising adjusting a jitter of the first set of pixels.

7. The method of claim 1, further comprising:
selecting the first set of pixels based in part or in whole on the direction of head movement of the user detected by the one or more transducers, wherein a first direction of the first set of pixels is opposite to the direction of the head movement; and
decreasing a size of the first set of pixels of the subsequent frame in response to the head movement.

8. The method of claim 1, further comprising:
selecting the first set of pixels based in part or in whole on the direction of the head movement of the user detected by the one or more transducers, wherein a first direction of the first set of pixels is opposite to the direction of the head movement; and
decreasing an intensity of the first set of pixels of the at last one subsequent frame in response to the head movement.

9. The method of claim 1, wherein the indication is based in part or in whole on detecting that a head movement attribute of the user has exceeded a nominal value of the head movement attribute.

10. The method of claim 9, wherein the head movement attribute includes at least one of a speed of the head movement or an acceleration of the head movement, and the indication is based in part or in whole on a signal received through an inertial sensor.

11. The method of claim 1, wherein the indication is based in part or in whole on a signal received through an imager.

12. The method of claim 1, wherein the at least one subsequent frame is provided based in part or in whole on at least one of a raster scan type frame, a spiral scan type frame, or a Lissajous scan type frame.

13. A virtual or augmented image presentation system for presenting virtual contents, comprising:
one or more sensors configured to detect an indication that indicates a first resolution corresponding to a first spacing between first adjacent pixels in a first set of pixels in a first portion of a frame in a sequence of frames will differ from a second resolution corresponding to a different spacing between second adjacent pixels in a second set of pixels in a second portion of the frame, wherein
the first set of pixels of the frame is selected based in part or in whole on a direction of head movement of a user detected by one or more transducers, and
a direction of the first set of pixels is the same as the direction of the head movement;
the virtual or augmented image presentation system configured to select the first set of pixels of the frame based in part or in whole upon a directional characteristic pertaining to the indication;
one or more modulation subsystems comprising a projection subsystem and at least one processor in a virtual or augmented image presentation system operatively coupled to the one or more sensors and configured to adjust, based at least in part on the indication, a resolution represented by the first set of pixels in the first portion to generate the first resolution represented by an adjusted first set of pixels in the first portion at least by modifying respective radial characteristics of a drive signal that drives pixels in the first set of pixels into respective modified radial characteristics of a modified drive signal for a subsequent frame after the frame in the sequence of frames, without affecting a number of coils or loops of the scan pattern; and
a head-mount display including one or more projectors operatively coupled to the one or more modulation subsystems and configured to present the subsequent frame including one or more virtual objects to a user at least by starting a presentation of the frame, interrupting the presentation before completion of the presentation, increasing an intensity of the first set of pixels for the subsequent frame in response to the head movement, and replacing the first set of pixels that represents the first portion with the adjusted first set of pixels to at least render the first portion with the first resolution and the second portion in the frame with the second resolution.

14. The virtual or augmented image presentation system of claim 13, wherein the one or more modulation subsystems are further configured to adjust one or more pixel characteristics that are perceptible to the user.

15. The virtual or augmented image presentation system of claim 13, further comprising modifying an electric voltage or an electric current of the drive signal.

16. The virtual or augmented image presentation system of claim 13, further comprising modifying an amplitude of the drive signal.

17. The virtual or augmented image presentation system of claim 13, further comprising the one or more transducers configured to detect the head movement of the user, and the one or more modulation subsystems are further configured to adjust a set of pixel characteristics that include at least one of a perceived size or a perceived intensity.

18. The virtual or augmented image presentation system of claim 13, wherein the virtual or augmented image presentation system is further configured to select the first set of pixels of the frame based on the direction of the head movement, wherein a direction of the first set of pixels is the same as the direction of the head movement and to increase a size of the first set of pixels of the subsequent frame.

19. The virtual or augmented image presentation system of claim 13, wherein the virtual or augmented image presentation system is further configured to adjust a variable focus element for the first set of pixels.

20. The virtual or augmented image presentation system of claim 13, wherein the virtual or augmented image presentation system is further configured to adjust a variable size source for the first set of pixels.

21. The virtual or augmented image presentation system of claim 13, wherein the virtual or augmented image presentation system is further configured to adjust a jitter of the first set of pixels.

22. The virtual or augmented image presentation system of claim 13, further comprising the one or more transducers operatively coupled to a microprocessor that is configured to selecting the first set of pixels based in part or in whole on the direction of the head movement detected by the one or more transducers, wherein a direction of the first set of pixels is opposite to the direction of the head movement, and to decrease a size of the first set of pixels of the subsequent frame in response to the head movement detected by the one or more transducers.

* * * * *